(12) United States Patent
Kerr et al.

(10) Patent No.: US 8,148,913 B2
(45) Date of Patent: Apr. 3, 2012

(54) ACTIVE ENCLOSURE FOR COMPUTING DEVICE

(75) Inventors: Duncan R. Kerr, San Francisco, CA (US); Steve P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 12/533,593

(22) Filed: Jul. 31, 2009

(65) Prior Publication Data

US 2009/0289571 A1 Nov. 26, 2009

Related U.S. Application Data

(60) Division of application No. 10/773,897, filed on Feb. 6, 2004, now Pat. No. 7,766,517, which is a continuation-in-part of application No. 10/075,964, filed on Feb. 13, 2002, now Pat. No. 7,452,098, said application No. 10/773,897 is a continuation-in-part of application No. 10/075,520, filed on Feb. 13, 2002, now Pat. No. 7,113,196.

(60) Provisional application No. 60/315,571, filed on Aug. 28, 2001, provisional application No. 60/298,364, filed on Jun. 15, 2001.

(51) Int. Cl.
*H05B 37/02* (2006.01)

(52) U.S. Cl. .......................... 315/291; 315/250; 315/297

(58) Field of Classification Search .................. 315/247, 315/250, 291, 294, 297, 307, 312; 362/26, 362/27, 29, 31, 99, 249, 561, 800, 812

See application file for complete search history.

(56) References Cited

U.S. PATENT DOCUMENTS

| | | | |
|---|---|---|---|
| 3,131,670 A | 5/1964 | Hardesty |
| 3,161,062 A | 12/1964 | Huston |
| 3,262,224 A | 7/1966 | Hardesty |
| 3,729,626 A | 4/1973 | Thurlow et al. |
| 3,777,222 A | 12/1973 | Harris |
| 4,277,665 A | 7/1981 | Kondo et al. |
| 4,435,713 A | 3/1984 | Gasparaitis et al. |
| 4,584,585 A | 4/1986 | Marko et al. |
| 4,672,513 A | 6/1987 | Von Kohorn et al. |
| 4,789,774 A | 12/1988 | Koch et al. |
| 4,845,481 A | 7/1989 | Havel |
| 4,847,736 A | 7/1989 | Ho |
| 4,980,694 A | 12/1990 | Hines |
| 5,008,870 A | 4/1991 | Vessa |
| 5,072,230 A | 12/1991 | Taniyoshi et al. |
| 5,138,328 A | 8/1992 | Zibrik et al. |

(Continued)

FOREIGN PATENT DOCUMENTS

DE 101 37 919 8/2001

(Continued)

OTHER PUBLICATIONS

Office Action dated Jun. 26, 2009 in U.S. Appl. No. 12/249,764.

(Continued)

*Primary Examiner* — Douglas W Owens
*Assistant Examiner* — Tung X Le
(74) *Attorney, Agent, or Firm* — Beyer Law Group LLP

(57) ABSTRACT

A computing device is disclosed. The computing device includes a housing having an illuminable portion. The computing device also includes a light device disposed inside the housing. The light device is configured to illuminate the illuminable portion.

18 Claims, 39 Drawing Sheets

U.S. PATENT DOCUMENTS

| | | |
|---|---|---|
| 5,222,076 A | 6/1993 | Ng et al. |
| 5,228,562 A | 7/1993 | Burk |
| 5,305,013 A | 4/1994 | Daniels |
| D348,905 S | 7/1994 | Smid |
| 5,339,213 A | 8/1994 | O'Callaghan |
| 5,373,300 A | 12/1994 | Jenness et al. |
| 5,387,901 A | 2/1995 | Hardt |
| 5,388,357 A | 2/1995 | Malita |
| 5,406,729 A | 4/1995 | Bejin |
| 5,422,751 A | 6/1995 | Lewis et al. |
| 5,440,449 A | 8/1995 | Scheer |
| 5,450,221 A | 9/1995 | Owen et al. |
| 5,479,285 A | 12/1995 | Burke |
| 5,490,647 A | 2/1996 | Rice |
| 5,515,244 A | 5/1996 | Levins et al. |
| 5,615,945 A | 4/1997 | Tseng |
| 5,644,320 A | 7/1997 | Rossi |
| 5,666,261 A | 9/1997 | Aguilera |
| 5,668,565 A | 9/1997 | Robinson |
| 5,677,698 A | 10/1997 | Snowdon |
| 5,684,672 A | 11/1997 | Karidis et al. |
| 5,689,400 A | 11/1997 | Ohgami et al. |
| 5,706,168 A | 1/1998 | Erler et al. |
| 5,715,139 A | 2/1998 | Nakajima |
| 5,738,536 A | 4/1998 | Ohgami et al. |
| 5,742,120 A | 4/1998 | Lin |
| 5,748,084 A | 5/1998 | Isikoff |
| 5,774,098 A | 6/1998 | Kawashima et al. |
| 5,777,704 A | 7/1998 | Selker |
| 5,781,406 A | 7/1998 | Hunte |
| 5,825,351 A | 10/1998 | Tam |
| 5,828,341 A | 10/1998 | Delamater |
| 5,867,131 A | 2/1999 | Comp, Jr. et al. |
| 5,870,282 A | 2/1999 | Andre et al. |
| 5,909,194 A | 6/1999 | Umeda et al. |
| 5,914,709 A | 6/1999 | Graham et al. |
| 5,918,396 A | 7/1999 | Jung |
| 5,920,310 A | 7/1999 | Faggin et al. |
| 5,924,784 A | 7/1999 | Chliwnyj et al. |
| 5,926,149 A | 7/1999 | Rummeli et al. |
| 5,929,813 A | 7/1999 | Eggleston |
| 5,936,587 A | 8/1999 | Gudilev et al. |
| 5,938,772 A | 8/1999 | Welch |
| 5,963,421 A | 10/1999 | Moss et al. |
| 5,966,098 A | 10/1999 | Qi et al. |
| 5,966,284 A | 10/1999 | Youn et al. |
| 6,016,038 A | 1/2000 | Mueller et al. |
| 6,018,332 A | 1/2000 | Nason et al. |
| 6,030,088 A | 2/2000 | Scheinberg |
| 6,031,497 A | 2/2000 | Nam |
| 6,035,180 A | 3/2000 | Kubes et al. |
| 6,037,679 A | 3/2000 | Pirillo |
| 6,045,233 A | 4/2000 | Iwai et al. |
| 6,056,425 A | 5/2000 | Appelberg |
| 6,058,634 A | 5/2000 | McSpiritt |
| 6,061,037 A | 5/2000 | Brouwers et al. |
| 6,089,893 A | 7/2000 | Yu et al. |
| 6,096,984 A | 8/2000 | Howell et al. |
| 6,109,760 A | 8/2000 | Salatrik et al. |
| 6,115,762 A | 9/2000 | Bell et al. |
| 6,129,440 A | 10/2000 | Reynolds |
| 6,144,552 A | 11/2000 | Whitcher |
| 6,150,774 A | 11/2000 | Mueller et al. |
| 6,161,944 A | 12/2000 | Leman |
| 6,166,496 A | 12/2000 | Lys et al. |
| 6,167,312 A | 12/2000 | Goedeke |
| 6,190,017 B1 | 2/2001 | Lai |
| 6,211,626 B1 | 4/2001 | Lys et al. |
| 6,217,182 B1 | 4/2001 | Shepaherd et al. |
| 6,224,244 B1 | 5/2001 | Burys |
| 6,259,417 B1 | 7/2001 | Kim et al. |
| 6,285,420 B1 | 9/2001 | Mizumo et al. |
| 6,289,466 B1 | 9/2001 | Bayramoglu et al. |
| 6,292,901 B1 | 9/2001 | Lys et al. |
| 6,313,816 B1 * | 11/2001 | Kojima et al. ............... 345/83 |
| 6,320,941 B1 | 11/2001 | Tyroler |
| 6,340,868 B1 | 1/2002 | Lys et al. |
| 6,357,887 B1 | 3/2002 | Novak |
| 6,370,376 B1 | 4/2002 | Sheath |
| D457,667 S | 5/2002 | Piepgras et al. |
| D457,669 S | 5/2002 | Piepgras et al. |
| D457,974 S | 5/2002 | Piepgras et al. |
| 6,388,627 B1 | 5/2002 | Masaki et al. |
| D458,395 S | 6/2002 | Piepgras et al. |
| 6,441,558 B1 * | 8/2002 | Muthu et al. ............... 315/149 |
| D463,610 S | 9/2002 | Piepgras et al. |
| 6,459,919 B1 | 10/2002 | Lys et al. |
| 6,476,726 B1 | 11/2002 | Pederson |
| 6,486,873 B1 | 11/2002 | McDonough et al. |
| D468,035 S | 12/2002 | Blanc et al. |
| 6,492,908 B1 | 12/2002 | Cheng |
| 6,494,429 B2 | 12/2002 | Tajima |
| 6,494,593 B2 * | 12/2002 | An et al. ............... 362/235 |
| 6,507,338 B1 | 1/2003 | Liao et al. |
| 6,528,954 B1 | 3/2003 | Lys et al. |
| 6,532,152 B1 | 3/2003 | White et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,608,996 B1 | 8/2003 | Laurikka et al. |
| 6,624,597 B2 | 9/2003 | Dowling et al. |
| 6,652,128 B2 | 11/2003 | Misaras |
| 6,690,362 B1 | 2/2004 | Motoyama et al. |
| 6,720,745 B2 | 4/2004 | Lys et al. |
| 6,809,690 B2 | 10/2004 | Tao |
| 6,816,149 B1 | 11/2004 | Alsleben |
| 6,820,990 B2 | 11/2004 | Ewers et al. |
| 6,867,738 B2 | 3/2005 | Birnbaum et al. |
| 6,888,322 B2 | 5/2005 | Dowling et al. |
| 6,933,929 B1 | 8/2005 | Novak |
| 6,977,808 B2 | 12/2005 | Lam et al. |
| 6,992,733 B1 | 1/2006 | Klein |
| 7,113,196 B2 | 9/2006 | Kerr |
| 7,148,875 B2 | 12/2006 | Rosenberg et al. |
| 7,239,503 B2 | 7/2007 | Chen |
| 7,248,239 B2 | 7/2007 | Dowling et al. |
| 7,365,718 B2 * | 4/2008 | Tsuchida et al. ............... 345/82 |
| 7,385,359 B2 * | 6/2008 | Dowling et al. ............... 315/292 |
| 7,427,143 B1 | 9/2008 | Coon |
| 7,452,098 B2 | 11/2008 | Kerr |
| 7,530,714 B2 | 5/2009 | Chen et al. |
| 2002/0101738 A1 | 8/2002 | Misaras |
| 2002/0113555 A1 | 8/2002 | Lys et al. |
| 2002/0145041 A1 | 10/2002 | Muthu et al. |
| 2002/0190975 A1 | 12/2002 | Kerr |
| 2003/0002246 A1 | 1/2003 | Kerr |
| 2003/0057884 A1 | 3/2003 | Dowling et al. |
| 2003/0057890 A1 * | 3/2003 | Lys et al. ............... 315/295 |
| 2003/0076056 A1 | 4/2003 | Schuurmans |
| 2003/0161093 A1 | 8/2003 | Lam et al. |
| 2003/0230991 A1 | 12/2003 | Muthu et al. |
| 2004/0135524 A1 * | 7/2004 | Gunter et al. ............... 315/291 |
| 2004/0141321 A1 | 7/2004 | Dowling et al. |
| 2004/0201573 A1 | 10/2004 | Yu et al. |
| 2005/0036300 A1 * | 2/2005 | Dowling et al. ............... 362/101 |
| 2005/0047132 A1 | 3/2005 | Dowling et al. |
| 2007/0236156 A1 * | 10/2007 | Lys et al. ............... 315/291 |

FOREIGN PATENT DOCUMENTS

| | | |
|---|---|---|
| EP | 0564127 | 6/1993 |
| EP | 1113709 | 7/2001 |
| JP | 10-105313 | 4/1998 |
| JP | 2001147739 | 5/2001 |
| WO | WO00/28510 | 5/2000 |
| WO | WO02/10847 | 2/2002 |
| WO | WO 02/103503 | 12/2002 |
| WO | WO 02/103504 | 12/2002 |

OTHER PUBLICATIONS

Notice of Allowance dated Jun. 11, 2009 in U.S. Appl. No. 10/012,751.
Office Action dated Apr. 27, 2009 in U.S. Appl. No. 11/198,820.
Office Action dated Apr. 20, 2009 in U.S. Appl. No. 11/486,272.
Office Action dated Feb. 24, 2009 in U.S Appl. No. 10/773,897.
Office Action dated Aug. 15, 2008 in Canadian Patent Application No. 2,447,545.

Office Action dated Oct. 20, 2008 in U.S. Appl. No. 11/198,820.
Office Action dated Aug. 19, 2008 in Canadian Patent Application No. 2,447,152.
Final Office Action dated Nov. 19, 2008 in U.S. Appl. No. 11/486,272.
Office Action dated Nov. 13, 2008 in U.S. Appl. No. 10/773,897.
Office Action dated Jun. 3, 2009 in U.S Appl. No. 12/211,698.
Notice of Allowance dated Jul. 30, 2008 in U.S. Appl. No. 10/075,964.
Notice of Allowance dated Aug. 13, 2008 in U.S. Appl. No. 11/198,817.
Examination Report dated Aug. 28, 2006 from Australian Patent Application No. 2002315170 (2 pages).
Office Action dated Sep. 17, 2007 from U.S. Appl. No. 11/198,820.
Office Action dated Aug. 17, 2007 from U.S. Appl. No. 11/198,783.
Office Action dated Dec. 12, 2007 from U.S. Appl. No. 10/773,897.
Office Action dated Apr. 30, 2008 from U.S. Appl. No. 10/773,897.
Written Opinion dated Jul. 28, 2005 from International Patent Application No. PCT/US02/18953 (3 pages).
International Search Report dated Oct. 4, 2005 from International Patent Application No. PCT/US2004/043479 (4 pages).
Written Opinion dated Oct. 4, 2005 from International Patent Application No. PCT/US2004/043479 (4 pages).
Office Action dated Sep. 12, 2007 from U.S. Appl. No. 11/486,272.
Office Action dated Aug. 23, 2007 from U.S. Appl. No. 10/075,964.
Office Action dated Mar. 3, 2008 from U.S. Appl. No. 11/169,608.
Office Action dated Nov. 30, 2007 from Chinese Patent Application No. 200480042692.0.
Office Action dated Jan. 28, 2008 from U.S. Appl. No. 10/075,964.
Office Action dated Jan. 28, 2008 from U.S. Appl. No. 11/198,783.
Office Action dated Dec. 19, 2007 from U.S. Appl. No. 11/198,817.
Final Office Action dated Mar. 26, 2008 in U.S. Appl. No. 11/198,820.
Written Opinion dated Jan. 23, 2008 from corresponding International Application No. PCT/US02/18953.
Website www.jtech.com/products/guest_alert.htm, "GuestAlert Guest Paging Systems", downloaded Jan. 28, 2002.
"ibook: How to Determine Battery Charge Status", Article ID 58417, Apple Care Tech Infor Library, Aug. 25, 1999.
Mahn et al., "HP-PAC: A New Chassis and Housing Concept for Electronic Equipment", Aug. 1994, Hewlett-Packard Journal.
Outpost.com advertisement for "Blue Cold Cathode Tube Light", downloaded Jul. 25, 2003.
Website www.cksauce.com/products/lightorb.htm, "LightOrb" downloaded Jan. 28, 2002.
Website www.cksauce.com/products/lightwand.htm, "LightWand" downloaded Jan. 28, 2002.
Xwebsite www.cksauce.com/products/lightwasher.htm, "LightWasher" downloaded Jan. 28, 2002.
Website www.cksauce.com/products/minilightwand.htm, "MiniLightWand" downloaded Jan. 28, 2002.
Website www.cksauce.com/products/lightsprite.htm, "LightSprite" downloaded Jan. 28, 2002.
Website www.cksauce.com/products/lightsaucer.htm, "LightSaucer" downloaded Jan. 28, 2002.
Website www.colorkinetics.com/products/controllers/index.htm, "Controllers fee the power. it's Herculean", downloaded Apr. 17, 2001.
Website www.colorkinetics.com/products/lights/icolor/index.htm, "iColor Series iWant. iNeed. iHave to have" downloaded Apr. 17, 2001.
Website www.2.consumer.philips.com/global/b2c/ce/catalog/product.jhtml?divId=0&groupID=TV, downloaded Jan. 28, 2002.
Partial European Search Report in EP 10177073 dated Oct. 20, 2010.
European Search Report in EP 10177076 dated Oct. 20, 2010.
Notice of Allowance dated Sep. 7, 2010 in U.S. Appl. No. 11/486,272.
Office Action dated Sep. 7, 2010 in U.S. Appl. No. 12/533,561.
Office Action dated Aug. 9, 2010 in CN Application No. 200910139115.8.
Search Report dated Jun. 9, 2010 from European Patent Application No. 10160717.4.
Office Action dated Jan. 20, 2010 in U.S. Appl. No. 11/486,272.
Notice of Allowance dated Jan. 22, 2010 in U.S. Appl. No. 12/211,698.
Notice of Allowance dated Jan. 13, 2010 in U.S. Appl. No. 10/773,897.
Office Action dated Sep. 10, 2009 in U.S. Appl. No. 10/773,897.
Office Action dated Jul. 16, 2009 in EP Application No. 02 742 114.8.
Office Action dated Sep. 30, 2009 in U.S. Appl. No. 11/486,272.
Office Action dated Oct. 28, 2009 in U.S. Appl. No. 12/211,698.
Notice of Allowance dated Jan. 13, 2010 in U.S. Appl. No. 12/249,764.
Office Action dated Apr. 11, 2011 in U.S. Appl. No. 12/760,464.
European Search Report dated Feb. 7, 2011 from EP 10177073.
Office Action dated Mar. 2, 2011 in U.S. Appl. No. 12/490,232.
Office Action dated Dec. 8, 2010 in U.S. Appl. No. 12/490,232.
Office Action dated Jan. 19, 2011 in U.S. Appl. No. 12/533,561.
Office Action dated Aug. 18, 2011 in U.S. Appl. No. 12/490,232.
Notice of Allowance dated Nov. 16, 2011 from U.S. Appl. No. 12/490,232.
Circuit City advertisement for Philips Somba 13" stereo TV dated Mar. 11, 2004.
Apple Computer IBook Hardware, General Topics; iBook Ports and Connectors, Figs. 1 and 2, downloaded Jun. 3, 2001.

* cited by examiner

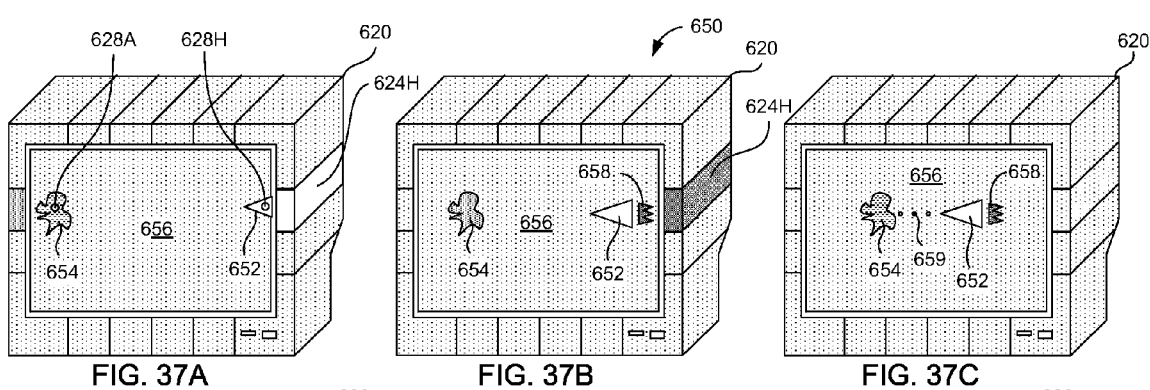
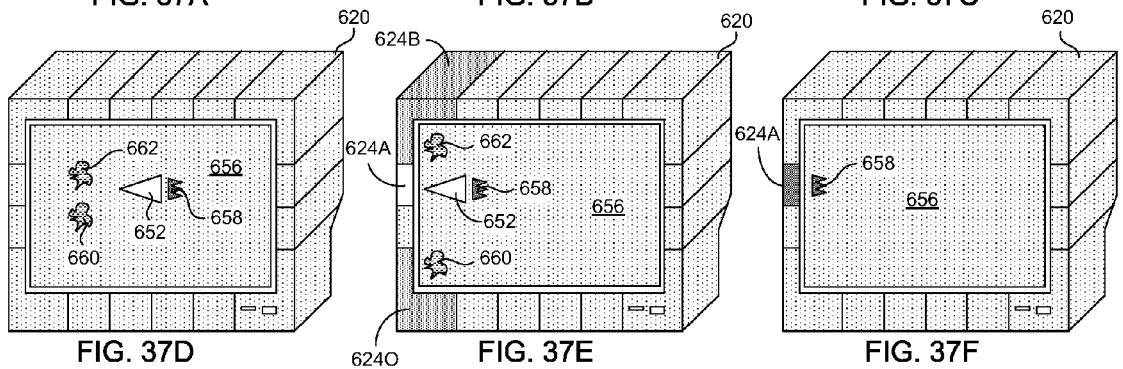
FIG. 37A  FIG. 37B  FIG. 37C
FIG. 37D  FIG. 37E  FIG. 37F

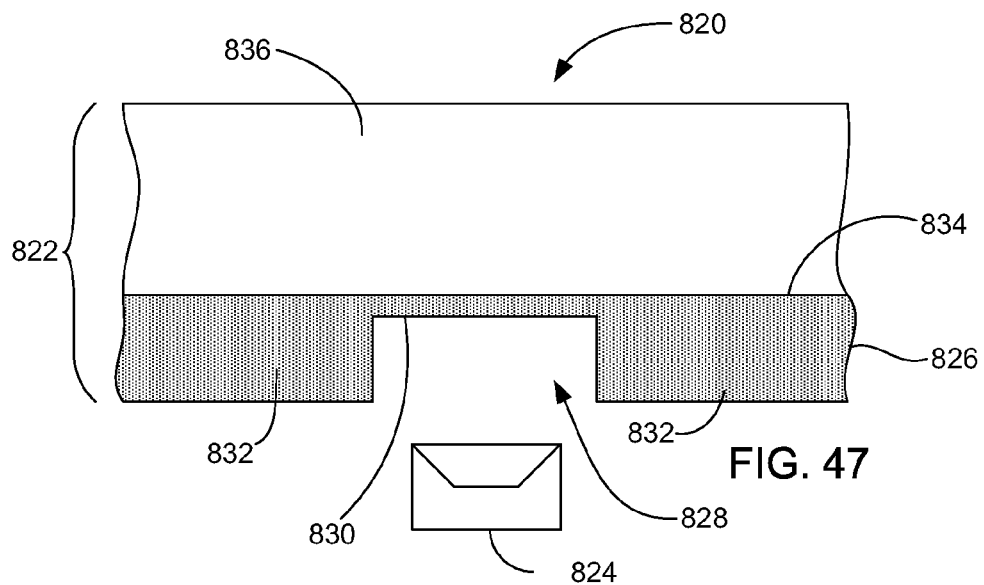
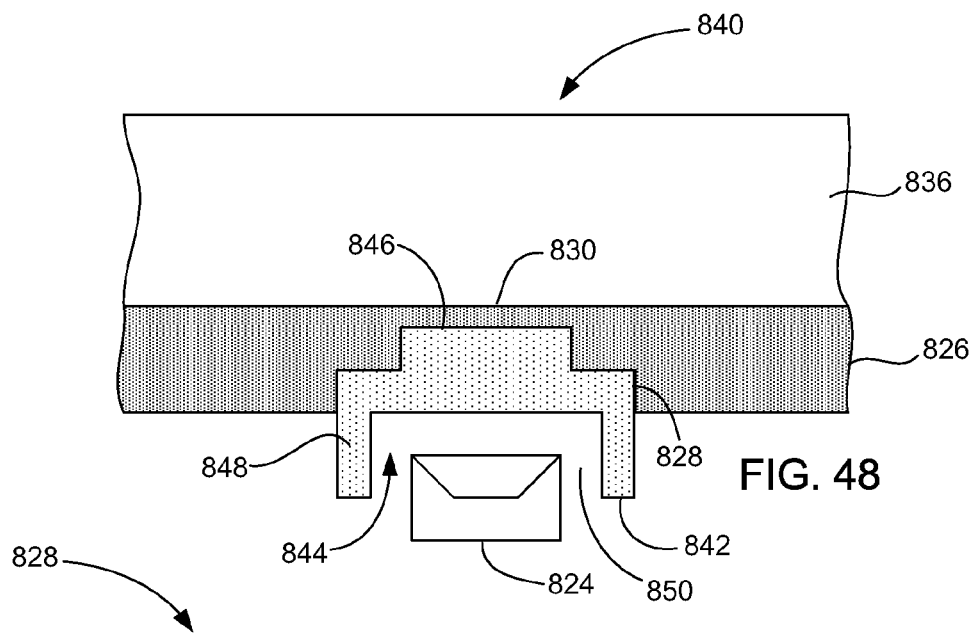
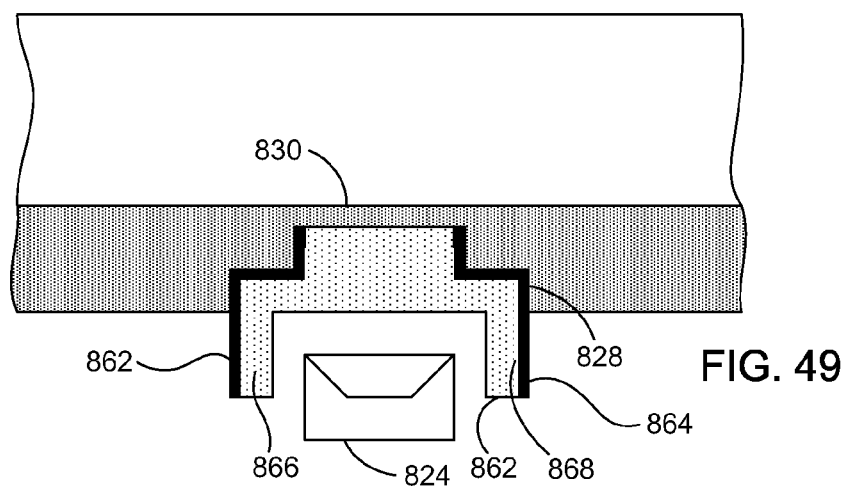

ACTIVE ENCLOSURE FOR COMPUTING DEVICE

CROSS REFERENCE TO RELATED APPLICATIONS

This application is a Divisional of co-pending U.S. patent application Ser. No. 10/773,897, filed on Feb. 6, 2004 and entitled "ACTIVE ENCLOSURE FOR COMPUTING DEVICE", which is a Continuation-in-part of U.S. patent application Ser. No. 10/075,964, filed on Feb. 13, 2002 and entitled "ACTIVE ENCLOSURE FOR COMPUTING DEVICE", now U.S. Pat. No. 7,452,098, issued Nov. 18, 2008, which claims the benefit of U.S. Provisional Application No. 60/298,364, filed on Jun. 15, 2001 and entitled "ACTIVE ENCLOSURE FOR COMPUTING DEVICE" and also claims the benefit of U.S. Provisional Application No. 60/315,571, filed on Aug. 28, 2001 and entitled "COMPUTING DEVICE WITH DYNAMIC ORNAMENTAL APPEARANCE". U.S. application Ser. No. 10/773,897 is also a Continuation-in-part of U.S. patent application Ser. No. 10/075,520, filed on Feb. 13, 2002 and entitled "COMPUTING DEVICE WITH DYNAMIC ORNAMENTAL APPEARANCE", now U.S. Pat. No. 7,113,196, issued on Sep. 26, 2006, which claims the benefit of U.S. Provisional Application No. 60/315,571, filed on Aug. 28, 2001 and entitled "COMPUTING DEVICE WITH DYNAMIC ORNAMENTAL APPEARANCE" and also claims the benefit of U.S. Provisional Application No. 60/298,364, filed on Jun. 15, 2001 and entitled "ACTIVE ENCLOSURE FOR COMPUTING DEVICE." All the foregoing patents and patent applications are hereby incorporated herein by reference.

This application is also related to U.S. patent application Ser. No. 09/389,915, filed on Sep. 3, 1999 and entitled "DISPLAY HOUSING FOR COMPUTING DEVICE,", now U.S. Pat. No. 6,977,808, issued Dec. 20, 2005, which claims the benefit of U.S. Provisional Application No. 60/134,082, filed May 14, 1999 and entitled "DISPLAY HOUSING FOR COMPUTING DEVICE"; and U.S. patent application Ser. No. 10/013,126, filed on Dec. 7, 2001 and entitled "HOUSING FOR A COMPUTING DEVICE", now U.S. Pat. No. 6,933,929 issued Aug. 23, 2005, which is a Divisional of U.S. Pat. No. 6,357,887, filed on Oct. 25, 1999 and entitled "HOUSING FOR A COMPUTING DEVICE" and which claims the benefit of U.S. Provisional Application No. 60/134,084, filed May 14, 1999 and entitled "HOUSING FOR A COMPUTER DEVICE"; and U.S. patent application Ser. No. 10/402,311, filed on Mar. 26, 2003 and entitled "COMPUTER LIGHT ADJUSTMENT", now U.S. Pat. No. 7,236,154 issued Jun. 26, 2007, which claims the benefit of U.S. Provisional Application No. 60/436,205, filed Dec. 24, 2002 and entitled "COMPUTER LIGHT ADJUSTMENT" all of which are hereby incorporated herein by reference.

BACKGROUND OF THE INVENTION

1. Field of the Invention

The present invention relates generally to a computing device. More particularly, the present invention relates to improved features for changing the appearance of a computing device.

2. Description of the Related Art

Most computing devices, including portable computers and desktop computers, give feedback to its user via a display screen or speakers. As is generally well known, display screens are used to display textual or graphical information to a user and speakers are used to output sound to the user. For example, display screens may be used to display a graphical user interface (GUI) and speakers may be used to output music or audio messages. Computing devices also give feedback to users via small indicators positioned on the computing device. By way of example, some indicators use light to indicate that a computing device (or the display screen of the computing device) is turned on/off or that a disk drive is reading or writing data to a disk. Although displays, speakers and indicators work well, they are limited to the type of feedback they give a user. For example, while playing a movie with a DVD drive of a computing device, the display screen only outputs the video associated with the movie, the speaker only outputs the audio associated with the movie, and the indicator only indicates that a movie is playing the DVD drive. Thus, it would be desirable to provide additional feedback to a user.

Computing devices also have housings that enclose the components and circuitry associated with operating the computing devices. Housings generally serve to shield and protect the components and circuitry from adverse conditions such as impact and dust. In some cases, the housings are configured to surround all the components of the computing device while in other cases the housings are configured to surround individual or a subset of components. For example, a housing may be used to enclose the central processing unit (CPU), display screen, disk drive, and speaker to form a single unit. As another example, a plurality of different housings may be used to individually enclose the CPU, display screen, disk drive and speakers to form a plurality of individual units.

As is generally well known, housings for computing devices in particular product lines are typically manufactured with the same appearance, i.e., they look the same. For example, housings from a particular product line may have the same box-like shape and/or the same neutral color. This can be discouraging to computer users who desire computers that are more personalized or to computer users who desire computers that are different than another user's computer. Recently, manufacturers have attempted to remedy this problem by offering brightly colored or translucent housings for computing devices. For example, some computer and telephone manufacturers now sell a variety of housings, which have different colors and patterns. By way of example, the iMAC® computer, which is produced by Apple Computer of Cupertino, Calif., is available in various colors and patterns.

Although these recent advances make substantial inroads to overcoming the same old appearance, the housings for the computing device remain passive structures that exhibit a non-adaptable or non-changing appearance. That is, a colored or patterned housing has a single color or pattern associated therewith that does not change overtime.

External lights have been used in some devices associated with displaying video to enhance the viewing experience of the video. Unfortunately, however, none of the external lights have been capable of changing the visual appearance of the device housing. That is, the external lights are typically located outside the periphery of the housing and are typically arranged to alter the environment in which the video is shown rather than the device housing itself (the appearance of the housing remains the same even with the use of lights).

Thus, there is a need for improvements in appearances of housings for computing devices.

SUMMARY OF THE INVENTION

The invention relates, in one embodiment, to a computing device. The computing device includes a housing for enclosing various internal components associated with the operation of the computing device. The computing device also includes an indicator assembly for indicating events associated with the computing device. The indicator assembly is configured to produce an indicator image at an outer surface of the housing when activated, and to eliminate the indicator image from the outer surface of the housing when deactivated.

The invention relates, in another embodiment, to a housing indicator system. The housing indicator system includes a housing having at least an inner bezel. The inner bezel has a light receiving recess that forms a reduced thickness portion. The reduced thickness portion is translucent. The housing indicator system also includes a light source disposed behind the housing. The light source is configured to illuminate the reduced thickness portion in order to form an indicator image at the outer surface of the inner bezel. The shape of the recess produces an indicator image of similar shape on the outer surface of the inner bezel.

The invention relates, in another embodiment, to a housing indicator system. The housing indicator system includes a housing having a clear outer layer and a translucent inner layer. The translucent inner layer includes a light receiving recess that forms a reduced thickness portion. The reduced thickness portion represents the area of the translucent layer that is illuminated. The housing indicator system also includes an indicator assembly. The indicator system includes a light device configured to provide light to the reduced thickness portion, a light barrier configured to prevent light from entering the translucent layer except at the reduced thickness portion and a light guide configured to direct light from the light source to the reduced thickness portion.

The invention relates, in another embodiment, to a computer system. The computer system includes a processor configured to generate light control signals. the computer system also includes a light feature operatively coupled to the processor. The light feature includes one or more light emitting diodes capable of emitting light in order to illuminate an illuminable housing of the computer system. The computer system also includes a light driver disposed between the processor and at least one of the LEDs. The light driver is configured to convert the light control signals into a stable continuous current for driving the light emitting diode. The magnitude of the current is based at least in part on the light control signal. The magnitude of the current affects the light intensity of the light emitting diode.

The invention relates, in another embodiment, to a method of illuminating a housing. The method includes generating a light control signal associated with a desired light intensity. The method also includes converting the light control signal into a voltage representative of the desired light intensity. The method further includes converting the voltage into a current representative of the desired light intensity. The current driving an LED so as to produce light. The method additionally includes directing the light from the LED through the housing such that an image is created at an outer surface of the housing.

BRIEF DESCRIPTION OF THE DRAWINGS

The invention will be readily understood by the following detailed description in conjunction with the accompanying drawings, wherein like reference numerals designate like structural elements, and in which:

FIGS. 37A-37F are perspective diagrams of a monitor presenting a sequence, in accordance with one embodiment of the present invention.

FIG. 47 is a diagram of a housing indicator system, in accordance with one embodiment of the present invention.

FIG. 48 is a diagram of a housing indicator system, in accordance with one embodiment of the present invention.

FIG. 49 is a diagram of a housing indicator system, in accordance with one embodiment of the present invention.

DETAILED DESCRIPTION OF THE INVENTION

Figure 1:
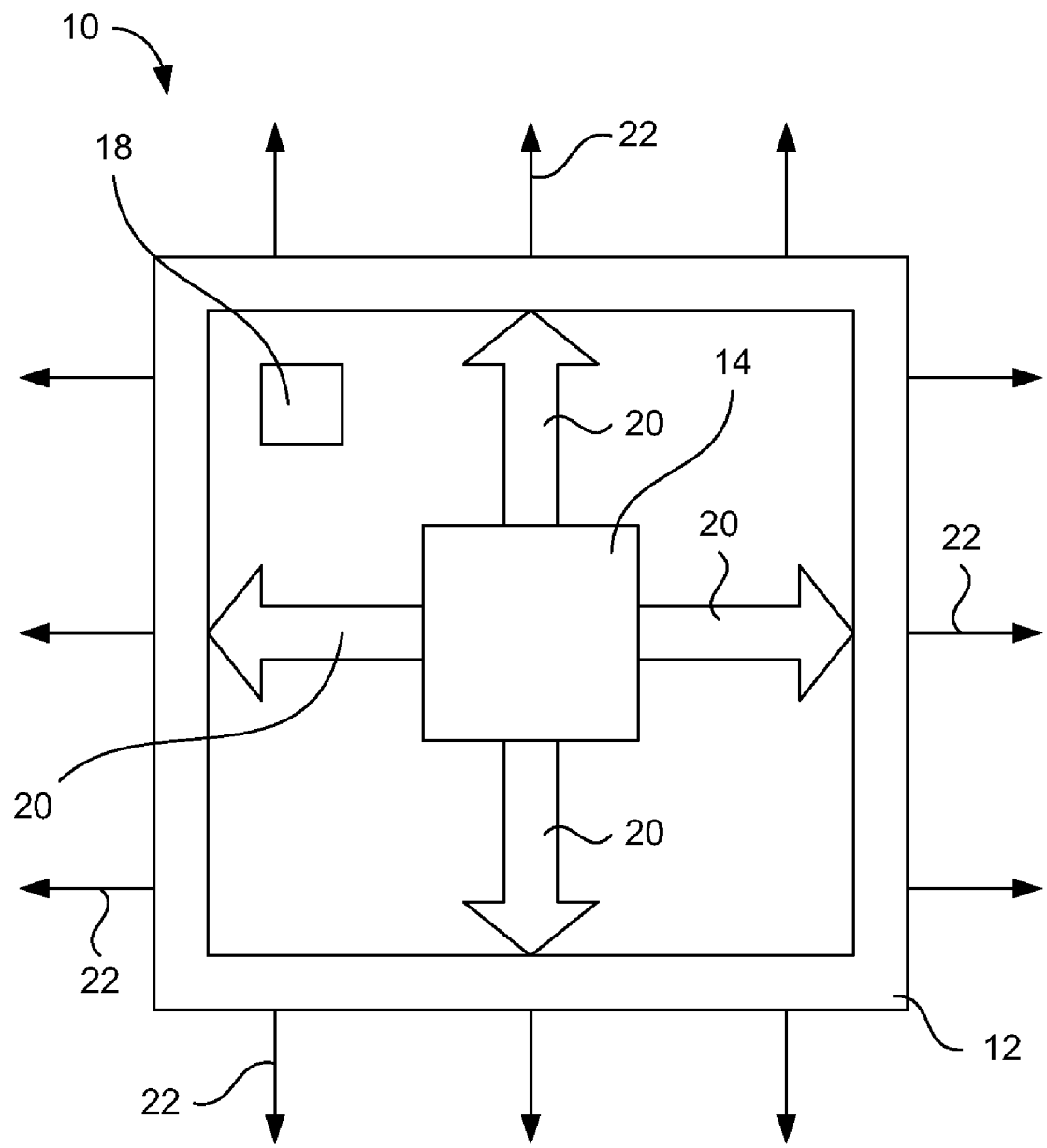
FIG. 1 is a simplified diagram of an electronic device, in accordance with one embodiment of the present invention.

The invention pertains to electronic devices capable of changing their ornamental or decorative appearance, i.e., the outer appearance as seen by a user. The electronic devices generally include an illuminable housing. The illuminable housing, which includes at least one wall configured for the passage of light, is configured to enclose, cover and protect a light arrangement as well as functional components of the electronic device. For example, in the case of a desktop computer, the functional components may include a processor for executing instructions and carrying out operations associated with the computer, and in the case of a display monitor, the functional components may include a display for presenting text or graphics to a user. The light arrangement, which generally includes one or more light sources, is configured to produce light for transmission through the light passing wall (or walls) of the illuminable housing. As should be appreciated, the transmitted light illuminates the wall(s) thus giving the wall a new appearance, i.e., the color, pattern, behavior, brightness and/or the like. That is, the transmitted light effectively alters the ornamental or decorative appearance of the electronic device. By way of example, a light source capable of producing green light may cause the light passing wall to exude green.

In most cases, the light is controlled so as to produce a light effect having specific characteristics or attributes. As such, the electronic device may be configured to provide additional feedback to the user of the electronic device and to give users the ability to personalize or change the look of their electronic device on an on-going basis. That is, a housing of the electronic device is active rather than passive, i.e., the housing has the ability to adapt and change. For example, the light may be used to exhibit a housing behavior that reflects the desires or moods of the user, that reflects inputs or outputs for the electronic device, or that reacts to tasks or events associated with operation of the electronic device.

It is contemplated that the present invention may be adapted for any of a number of suitable and known consumer electronic products that perform useful functions via electronic components. By way of example, the consumer electronic products may relate to computing devices and systems that process, send, retrieve and/or store data. The computing devices and systems may generally relate to desktop computers (both segmented and all-in-one machines) that sit on desks, floors or other surfaces, portable computers that can be easily transported by a user, or handheld computing devices. By way of example, portable computers include laptop computers, and handheld computing devices include personal digital assistants (PDAs) and mobile phones.

Embodiments of the invention are discussed below with reference to FIGS. 1-26. However, those skilled in the art will readily appreciate that the detailed description given herein with respect to these figures is for explanatory purposes as the invention extends beyond these limited embodiments.

FIG. 1 is a simplified diagram of a chameleonic electronic device 10, in accordance with one embodiment of the invention. The word "chameleonic" refers to the fact that the electronic device 10 has the ability to alter its visual appearance.

The chameleonic electronic device 10 generally includes a housing 12 configured to form an external protective covering of the chameleonic electronic device 10 and a light system 14 configured to adjust the illuminance or pigmentation of the housing 12. The housing 12 of the chameleonic electronic device 10 surrounds and protects internal components 18 disposed therein. The internal components 18 may be a plurality of electrical components that provide specific functions for the chameleonic electronic device 10. For example, the internal electrical components 18 may include devices for generating, transmitting and receiving data associated with operating the electronic device. In one embodiment, the chameleonic electronic device is a component of a computer system, as for example, a general purpose computer. As such, the internal electrical components may include a processor, memory, controllers, I/O devices, displays and/or the like.

The chameleonic electronic device 10 is configured to change its visual appearance via light. That is, the housing 12 is configured to allow the passage of light and the light system 14 is configured to produce light for transmission through the housing 12. In one embodiment, the light system 14 includes a light arrangement (not shown). The light arrangement, which is disposed inside the housing 12 and which includes at least one light source, is configured to emit light 20 incident on the inner surface of the housing 12. As should be appreciated, light 22 that is transmitted through the wall of the housing 12 changes the look of the housing 12 and thus the visual appearance of the chameleonic electronic device 10. By way of example, the light 20 may cause the housing 12 to exude a specific brightness such as intense or dull light, a specific color such as green, red or blue, a specific pattern such as a rainbow or dots, or a changing behavior such as a strobe effect or fading in/out.

In some cases, the light system 14 is arranged to cooperate with the electrical components 18. For example, events associated with the electrical components 14 may be monitored, and the light system 14 may be controlled based on the monitored events. As such, an illumination effect corresponding to a specific event may be produced. For example, the housing 12 may be configured to exude a blinking red coloration when an event has been implemented. Although the light system 14 may cooperate with the electrical components 18, it should be understood that the electrical components 18 and the light system 14 are distinct devices serving different functions. That is, the electrical components 18 are generally configured to perform functions relating to operating the chameleonic electronic device 10, and the light system 14 is generally configured to change the appearance of the housing 12 thereof.

Figure 2:
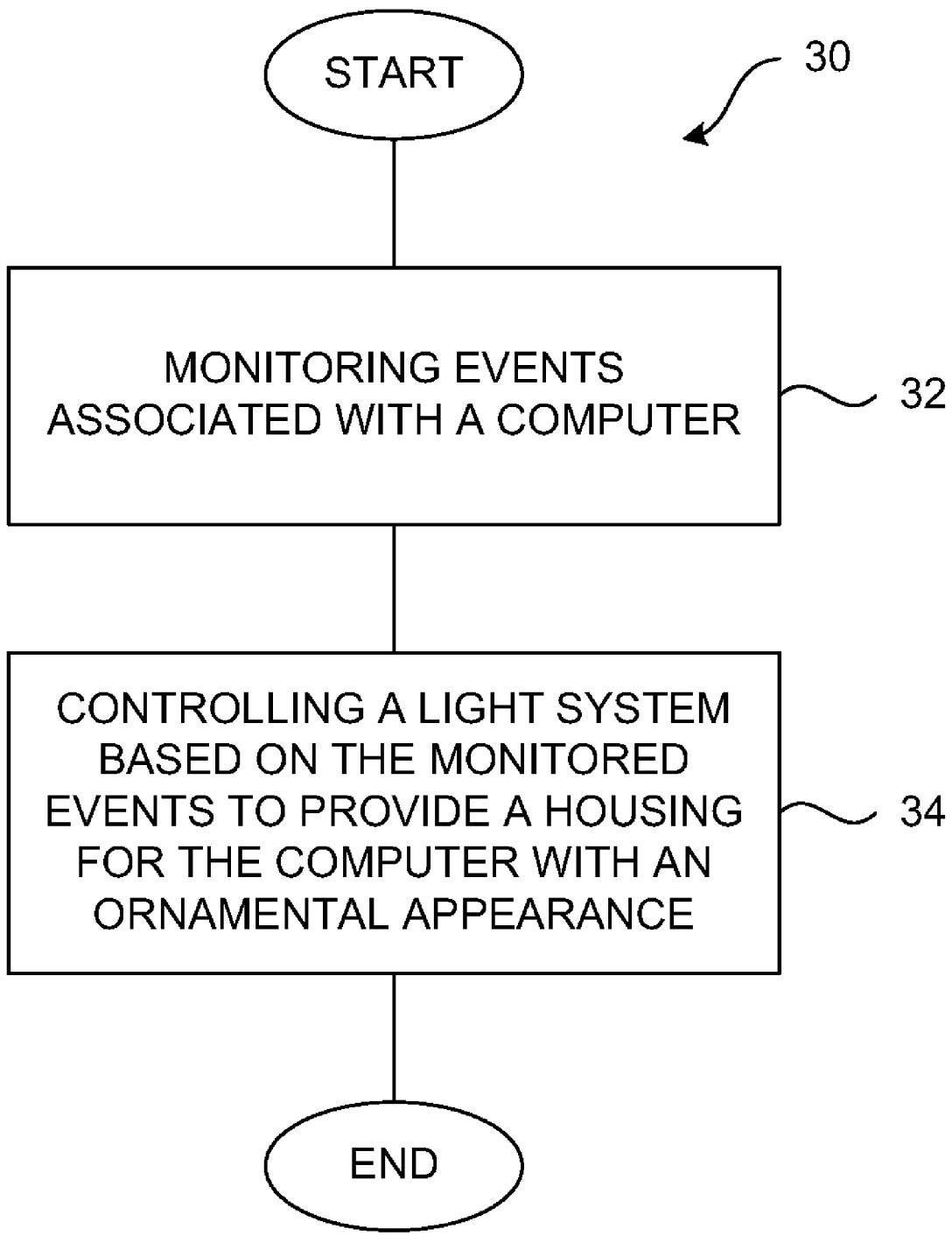
FIG. 2 is a flow diagram of computer illumination processing, in accordance with one embodiment of the present invention.

FIG. 2 is a flow diagram of computer illumination processing 30, in accordance with one embodiment of the invention. The computer illumination processing 30 is performed by a computer (or computer system) to provide the computer with an illumination effect, as for example, the illumination of a housing relating to the computer. The illumination effect for the housing is provided by a light system. Typically, the light system is internal to the housing being illuminated. In one embodiment, the computer corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

The computer illumination processing 30 begins at block 32 where events associated with a computer are monitored. In one embodiment, the events being monitored are identified by an operating system or a microprocessor utilized within the computer. The events can take many forms such as operating system events or microprocessor events. By way of example, the events may relate to signals, conditions or status of the computer.

Following block 32, the process proceeds to block 34 where a light system, associated with the computer, is controlled 34 based on the monitored events to provide a housing, also associated with the computer, with an ornamental appearance. In other words, the computer illumination processing 30 operates to provide the housing of the computer with a dynamic ornamental appearance that varies in accordance with the monitored events of the computer. By way of example, the housing and light system may generally correspond to the housing and light system described in FIG. 1. After the light system is controlled at block 34, the computer illumination processing 30 is complete and ends. It should be noted, however, that the processing can be repeatedly performed or performed whenever a new event occurs.

Figure 3:
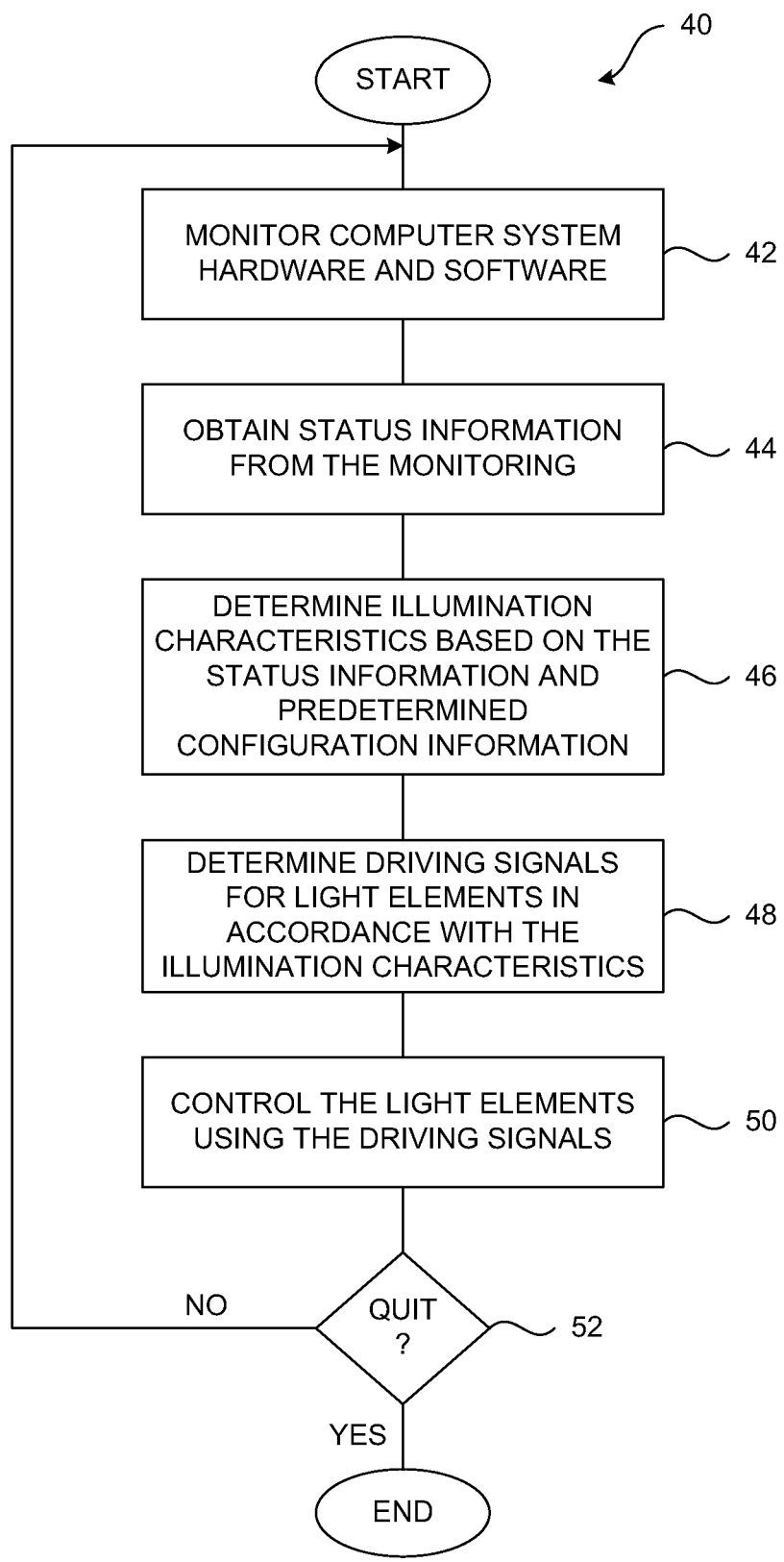
FIG. 3 is a flow diagram of computer illumination processing, in accordance with another embodiment of the present invention.

FIG. 3 is a flow diagram of computer illumination processing 40, in accordance with another embodiment of the invention. The computer illumination processing 40 is performed by a computer system (or computer) to provide the computer system with an illumination effect, as for example, the illumination of a housing associated with the computer system. The illumination effect for the housing is provided by a light system. Typically, the light system is internal to the housing being illuminated. In one embodiment, the computer system corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

The computer illumination processing 40 generally begins at block 42 where computer system hardware and software is monitored. Here, one or more devices, units or systems associated with the computer system can be monitored. By way of example, the devices or systems being monitored can include one or more of a microprocessor, an operating system, an application or utility program, or input/output (I/O) devices. After block 42, the process proceeds to block 44 where status information associated with the devices, units or systems is obtained from the monitoring. By way of example, status information may correspond to I/O connectivity status, wireless connectivity status, network connectivity status, processor status (e.g., sleep, shutdown), program status (e.g., errors, alerts, awaiting inputs, received new mail, loading), remote status (e.g., retrieving information from the internet), and/or the like.

After block 44, the process proceeds to block 46 where illumination characteristics are determined. Illumination characteristics generally refer to how a housing associated with the computer is illuminated to produce an ornamental appearance. The illumination characteristics are generally based on the status information and predetermined configuration information. In one embodiment, the predetermined configuration information identifies a type and nature of the illumination (e.g., which lights are operated, how long the light sources are operated, what color the light source output, etc.) that is to be provided for a specific status information. By way of example, a blinking red coloration may be identified when a program status such as an error is monitored.

In one embodiment, the predetermined configuration information is stored in a database. Thus, the computer consults the information held in the database in order to determine the illumination characteristics for a specific event. The predetermined configuration information stored in the database may be accessed by a user through a light control menu, which may be viewed on a display screen as part of a GUI interface. The light control menu may include light control settings pertaining to one or more events of the computer. In fact, the light control menu may serve as a control panel for reviewing and/or customizing the light control settings, i.e., the user may quickly and conveniently review the light control settings and make changes thereto. Once the user saves the changes, the modified light control settings will be employed (e.g., as predetermined configuration information) to handle future events transmitted and/or received through the computer.

After the illumination characteristics have been determined, the process proceeds to block 48 where driving signals for light elements associated with the light system are determined in accordance with the illumination characteristics. Typically, the light elements are arranged within a portion of the computer system. For example, the light elements could be arranged within a primary housing of the computer system. In another embodiment, the light elements could be arranged within a housing for a peripheral device associated with the computer system. After the driving signals are determined, the process proceeds to block 50 where the driving signals are used to control the light elements. For example, the driving signals may actuate one or more of the light elements so as to emit light incident on an inner surface of a housing. Once the drive signals control the light elements, the ornamental appearance of the housing is thus altered. Typically, the housing has one or more portions that are configured for allowing the passage of light, thereby causing the light to be transmitted therethrough which effectuates the ornamental appearance of the housing.

After using the driving signals, the process proceeds to block 52 where a decision is made as to whether the computer illumination processing 40 should end. When the decision 52 determines that the computer illumination processing 40 should not end, the computer illumination processing 40 returns to repeat the operation 42 and subsequent operations so that the illumination characteristics can be continuously updated in accordance with the status information. On the other hand, when the decision 52 determines that the computer illumination processing 40 should end, the computer illumination processing 40 is complete and ends. In general, the computer illumination processing 40 can be repeatedly performed or performed in an event driven manner.

Figure 4:
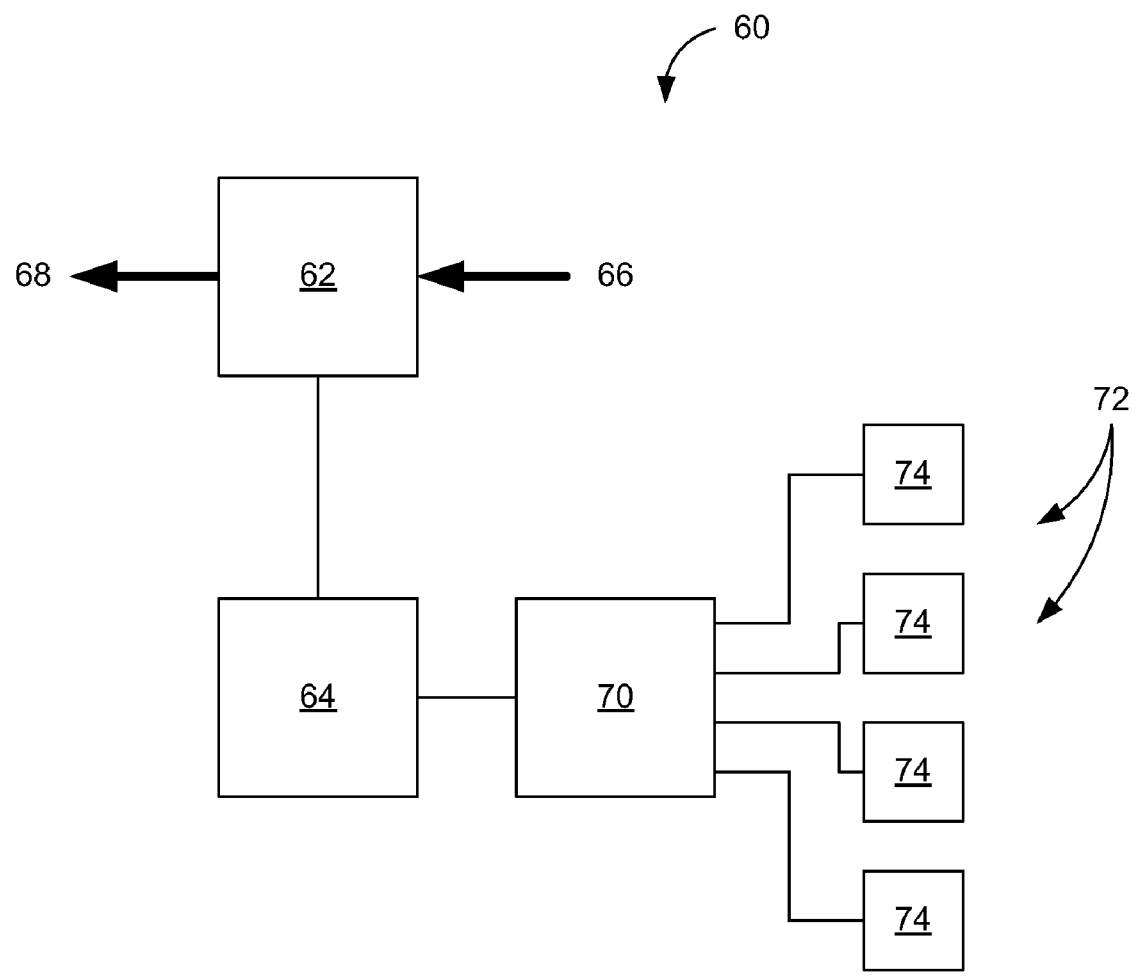
FIG. 4 is a block diagram of a computing device, in accordance with one embodiment of the present invention.

FIG. 4 is a block diagram of a computing device 60, in accordance with one embodiment of the present invention. By way of example, the computing device 60 may correspond to the chameleonic electronic device 10 shown in FIG. 1. The computing device 60 generally includes a variety of computer components 62, which as an example may correspond to the electrical components 18 in FIG. 1. The computer components 62 are generally configured to process, retrieve and store data associated with the computing device 60. By way of example, the computer components 62 may include a CPU (central processing unit), I/O controllers, display controllers, memory and the like. The computer components may also include operating systems, utility programs, application programs and/or the like.

The computing device 60 also includes an event monitor 64 operatively coupled to the computer components 62. The event monitor 64 is configured to track specific data through the computer components. For example, the event monitor 64 may be configured to track input data 66 and/or output data 68. Although shown outside the computer components, the input data and output data may correspond to internal inputs and outputs generated between individual parts of the computer components as well as to external inputs and outputs generated outside the computer components. By way of example, interior inputs/outputs may relate to data that is passed between a CPU and an I/O controller, and exterior inputs/outputs may relate to data that is passed between an I/O controller and an I/O device such as a keyboard, mouse, printer and the like. In one embodiment, the event monitor is part of the functionality provided by the computer components. For example, the event monitor may be included in the CPU. In another embodiment, the event monitor provides functionality independent of the computer components. For example, the event monitor may be a separate processor chip that is connected to a chip housing the CPU.

The computing device 60 also includes a light effect manager 70 operatively coupled to the event monitor 64. The light effect manager 70 is configured to direct light control signals to a light arrangement 72, and more particularly to a plurality of light elements 74 disposed inside a housing. The light control signals are generally based on the events tracked by the event monitor 64. That is, as events are processed by the computer components 62, the light effect manager 70 directs light control signals to the light elements 74. The light control signals carry illumination characteristics pertaining to the desired light effect that each of the light elements is to provide at the housing. That is, the light control signals sent to each of the light elements may cause the light elements to emit the same light effect (e.g., all emitting green light at the same intensity) or a different light effect (e.g., one element emitting green light while another emits blue light). These light elements 74 work together to produce a light effect that dynamically changes the ornamental appearance of the housing.

In one embodiment, the light effect manger 70 is configured to determine illumination characteristics based on the specific events (or data) monitored and the corresponding predetermined configuration information. As explained earlier, predetermined configuration information relates to information that is selected by a user and stored. In one embodiment, the light effect manager 70 is part of the functionality provided by the computer components 62. For example, the light effect manager 70 may be included in the processor chip of the computing device 60 that also includes the CPU. In another embodiment, the light effect manager 70 provides functionality independent of the computer components. For example, the light effect manager 70 may be a separate processor chip that is connected to a separate chip housing the CPU.

Figure 5:
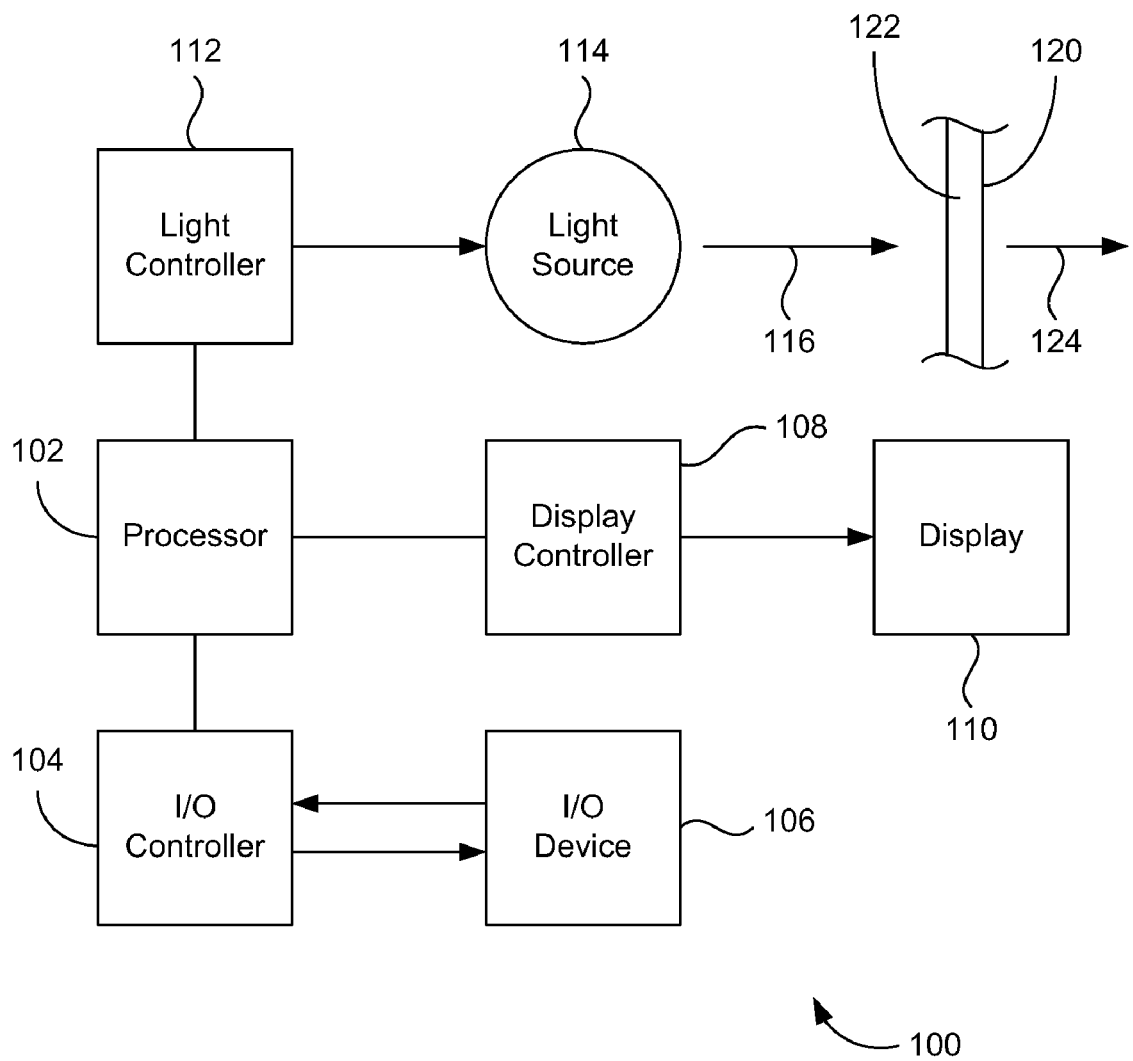
FIG. 5 is a block diagram of a computer system, in accordance with one embodiment of the present invention.
Figure 6:
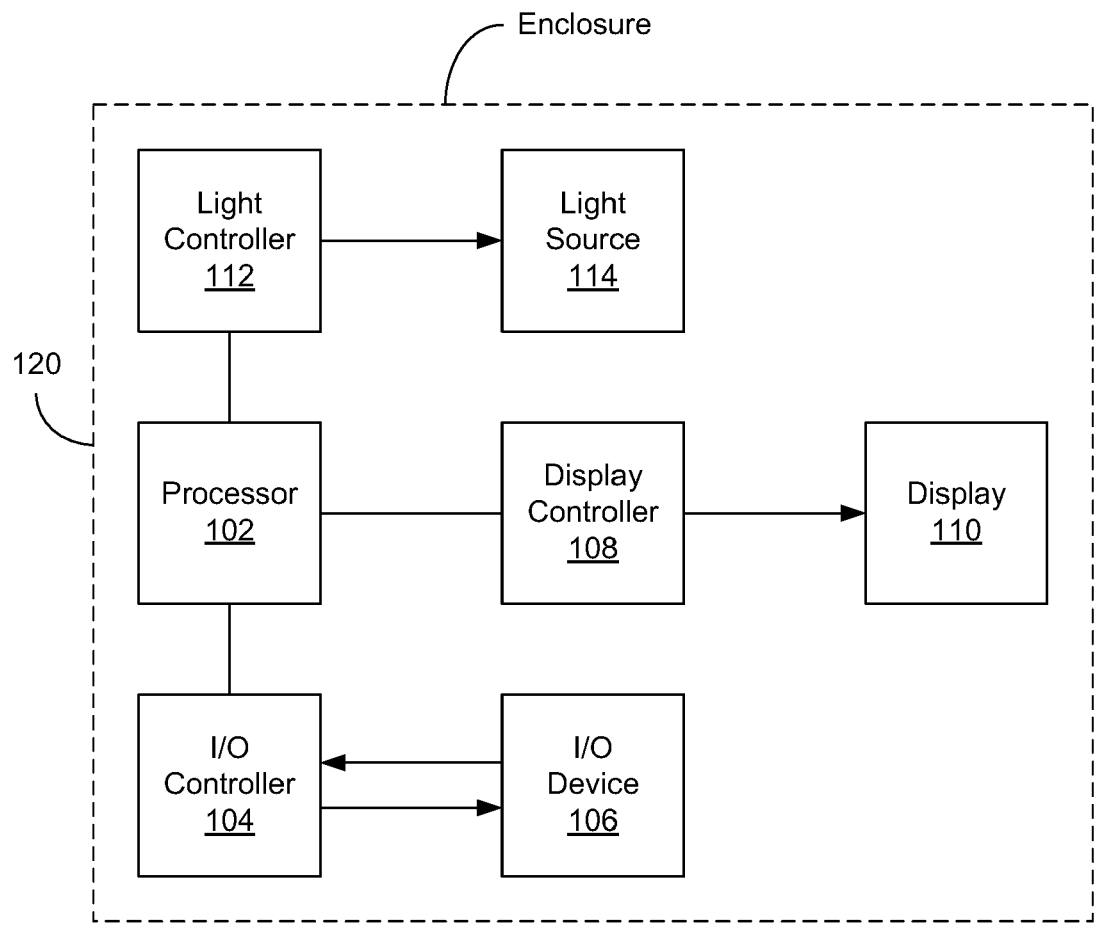
FIG. 6 is a block diagram of a computer system, in accordance with another embodiment of the present invention.
Figure 7:
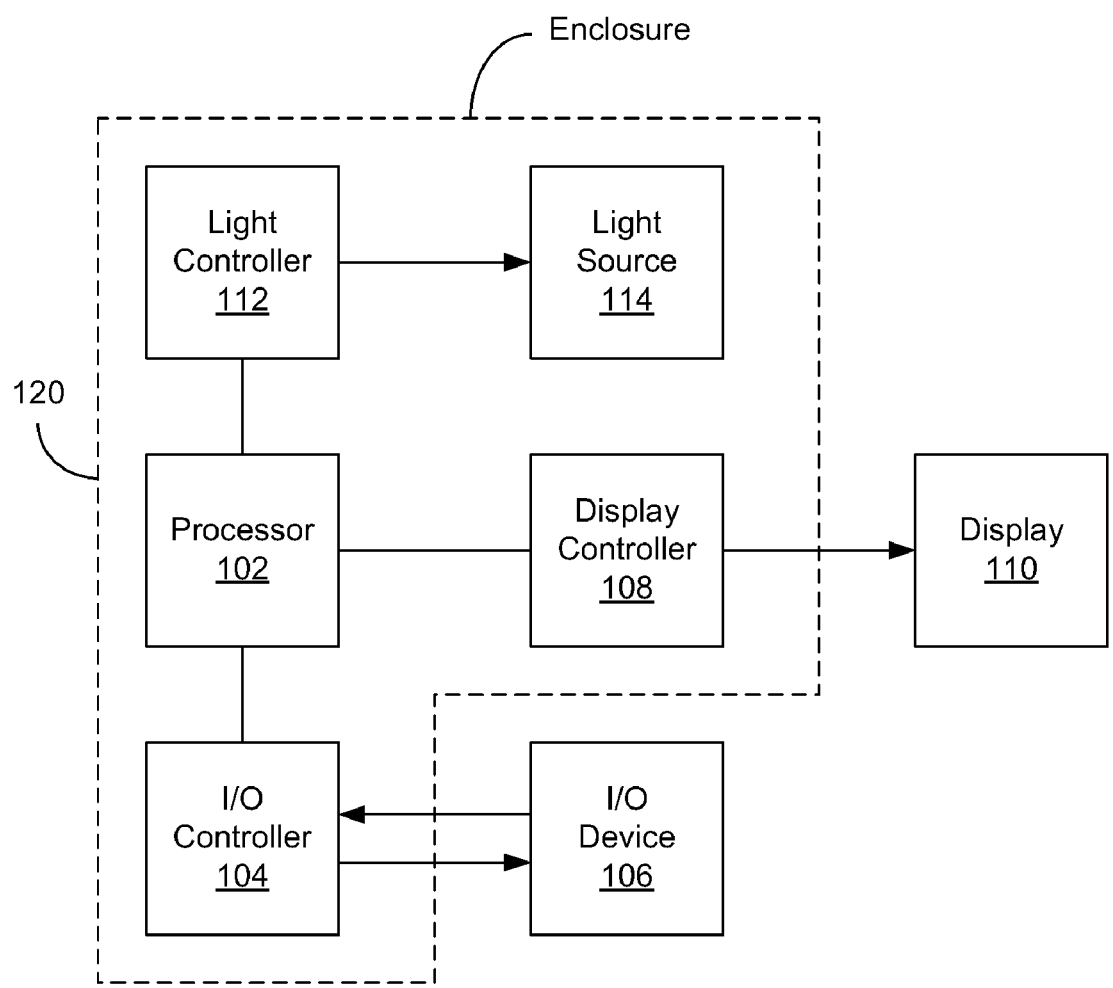
FIG. 7 is a block diagram of a computer system, in accordance with another embodiment of the present invention.

FIG. 5 is a block diagram of a computer system 100, in accordance with one embodiment of the present invention. By way of example, the computer system 100 may correspond to the electronic device 10 shown in FIG. 1. The computing system 100 generally includes a processor 102 (e.g., CPU or microprocessor) configured to execute instructions and to carry out operations associated with the computer system 100. By way of example, the processor 102 may execute instructions under the control of an operating system or other software.

The computing system 100 also includes an input/output (I/O) controller 104 that is operatively coupled to the processor 102. The I/O controller 104 is generally configured to control interactions with one or more I/O devices 106 that can be coupled to the computing system 100. The I/O controller 104 generally operates by exchanging data between the computing system 100 and the I/O devices 106 that desire to communicate with the computing system 100. In some cases, the I/O devices 106 may be connected to the I/O controller 104 through wired connections such as through wires or cables. In other cases, the I/O devices 106 may be connected to the I/O controller 104 through wireless connections. By way of example, the I/O devices 106 may be internal or peripheral devices such as memory, disk drives, keyboards, mice, printers, scanners, speakers, video cameras, MP3 players and the like. The I/O devices 106 may also be network-related devices such as network cards or modems.

The computing system 100 additionally includes a display controller 108 that that is operatively coupled to the processor 102. The display controller 108 is configured to process display commands to produce text and graphics on a display device 110. By way of example, the display 110 may be a monochrome display, color graphics adapter (CGA) display, enhanced graphics adapter (EGA) display, variable-graphics-array (VGA) display, super VGA display, liquid crystal display (LCD), cathode ray tube (CRT), plasma displays and the like.

The computing system 100 further includes a light source controller 112 that is operatively coupled to the processor 102. The light source controller 112 generally provides processing of light commands from the processor 102 to produce light 116 in a controlled manner via a light source 114. By way of example, the light source 114 may be one or more light emitting diodes (LED), light emitting semiconductor dies, lasers, incandescent light bulbs, fluorescent light bulbs, neon tubes, liquid crystal displays (LCD), and the like, that are arranged to produce light and more particularly colored light. The light source 114 is generally disposed inside an enclosure 120 that covers and protects some aspect of the computing system 100. More particularly, the enclosure 120 can cover and protect one or more computer components having functionality used in the operation of the computing system 100. By way of example, the enclosure 120 may be configured to cover one or more of the components described above. The enclosure 120 generally includes a wall 122 that is configured for transmitting light therethrough. As such, at least a portion of the light 116, which is made incident on the wall 122 via the light source 114, passes through the wall 122, thereby producing a light effect 124 that alters the visual appearance of the enclosure 120 and thus the visual appearance of the computing system 100.

Light effects are generally defined as the way in which the light 116, produced by the light source 114 and controlled by the light source controller 112, acts or influences the enclosure 120. Metaphorically speaking, the enclosure is the canvas, the light is the paint, and the light effect is the painting. Accordingly, in some cases, the light effect is arranged to cover the entire wall 122 while in other cases, the light effect is arranged to cover only a portion of the wall 122.

Light effects may be categorized as static (non-changing over time) or dynamic (changing over time). By way of example, static light effects may cause the enclosure to continuously exude a fixed color such as blue, a fixed shade of a color such as light blue, a fixed pattern or artistic design such as rainbow, stripes, dots, flowers and the like, or a fixed orientation such as a color or pattern located in a specific region of the enclosure. In addition, dynamic light effects may cause the enclosure to exude different colors, intensities or patterns at different times and in different orientations. That is, the coloration, intensities, patterns and position thereof may vary. For example, dynamic light effects may include light effects that change at least partially from a first color, intensity or pattern to a second color, intensity or pattern (e.g., from red to blue to light blue to rainbow, blinking on and off or fading in and out), that change regionally around the enclosure (e.g., moving from a first side to a second side of the enclosure, moving from center to outer, moving around the enclosure in a continuous fashion, a pattern that starts at a certain point on the enclosure and radiates out, etc.), or any combination thereof.

In one embodiment, computer illumination processing may be performed by the computer system when events associated with the computer system occur in or outside the system. The illumination processing generally provides the computer system with an illumination effect, as for example, the illumination of a housing associated with the computer system. In general, illumination processing includes monitoring events associated with the computer system (e.g., software or hardware) and controlling the light source based on the monitored events so as to provide a housing associated with the computer system with an ornamental appearance corresponding to the monitored event. The events being monitored are generally identified by an operating system or a microprocessor utilized within the computer system. The events can take many forms such as operating system events or microprocessor events. By way of example, the events may relate to signals, conditions or status of the computer system. Examples of illumination processing are described in greater detail in U.S. application Ser. No. 10/075,520 filed Feb. 13, 2002, now U.S. Pat. No. 7,113,196 issued Sep. 26, 2006 and entitled, "COMPUTING DEVICE WITH DYNAMIC ORNAMENTAL APPEARANCE"; which is incorporated herein by reference.

Although not shown in FIG. 5, the computer system may include other components such as buses, bridges, connectors, wires, memory, and the like. As is generally well known, buses provide a path for data to travel between components of the computer system 100. In addition, bridges serve to perform adjustments necessary to bridge communication between different buses, i.e., various buses follow different standards. Further, memory provides a place to hold data that is being used by the computer system. By way of example, memory may be a Read-Only Memory (ROM) or a Random-Access Memory (RAM). RAM typically provides temporary data storage for use by at least the processor 102, and ROM typically stores programming instructions for use with the processor 102.

In one embodiment, the illumination characteristics of the light system that produce the light effects may be determined by predetermined configuration information stored in a database, i.e., the computer system consults the information held in the database in order to determine the illumination characteristics. Illumination characteristics generally refer to how a housing associated with the computer is illuminated to produce an ornamental appearance (e.g., which lights are operated, how long the light sources are operated, what color the light source output, etc.). The predetermined configuration information stored in the database may be accessed by a user through a light control menu, which may be viewed on a display screen as part of a GUI interface. The light control menu may include light control settings pertaining to the illumination characteristics. In fact, the light control menu may serve as a control panel for reviewing and/or customizing the light control settings, i.e., the user may quickly and conveniently review the light control settings and make changes thereto. Once the user saves the changes, the modified light control settings will be employed (e.g., as predetermined configuration information) to handle future illumination processing.

Referring now to FIGS. 6-10, the placement of the enclosure 120 relative to the components described above will be described in greater detail. In one embodiment, the enclosure 120 is configured to cover the entire computer system described above. For example, in FIG. 6, the enclosure 120 is configured to cover the processor 102, the I/O controller 104, the I/O device 106, the display controller 108, the display 110, the light controller 112 and the light source 114.

Figure 8:
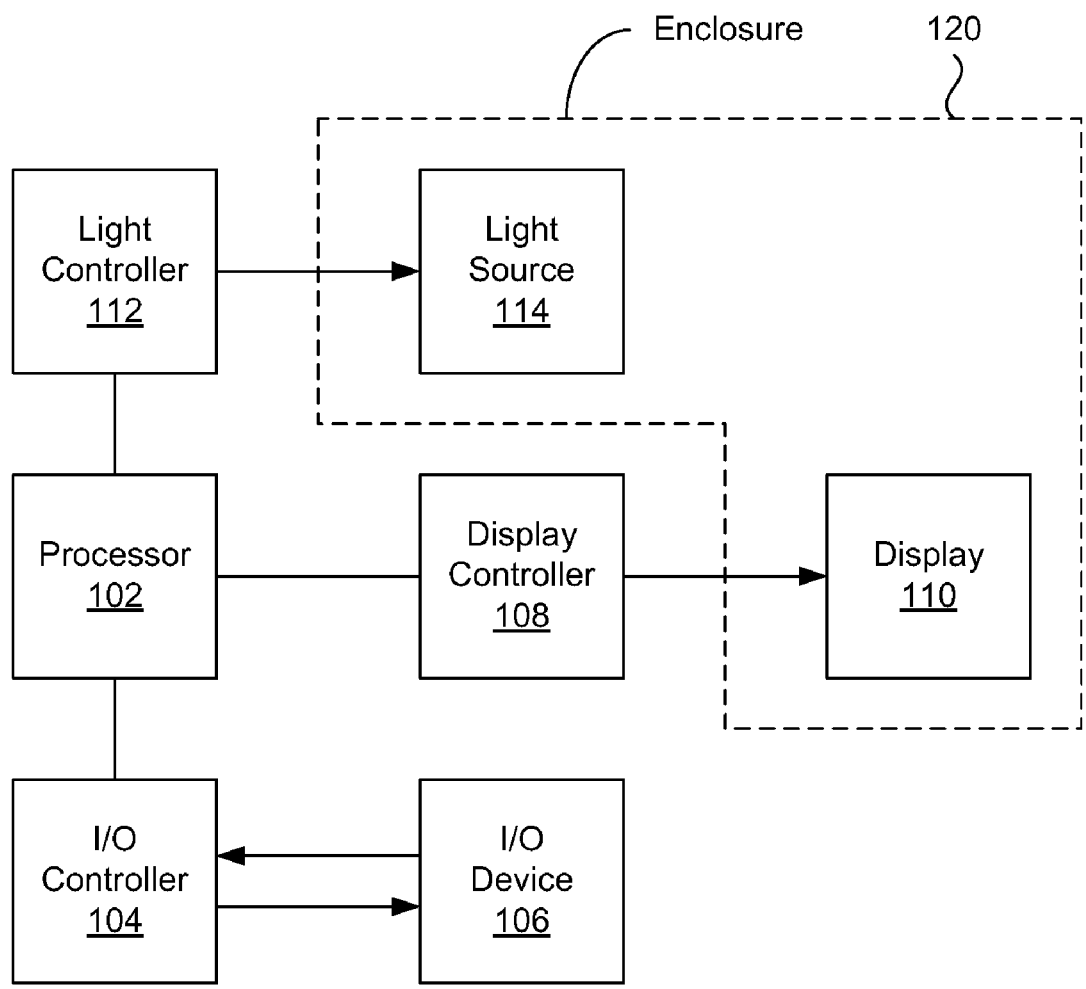
FIG. 8 is a block diagram of a computer system, in accordance with another embodiment of the present invention.
Figure 9:
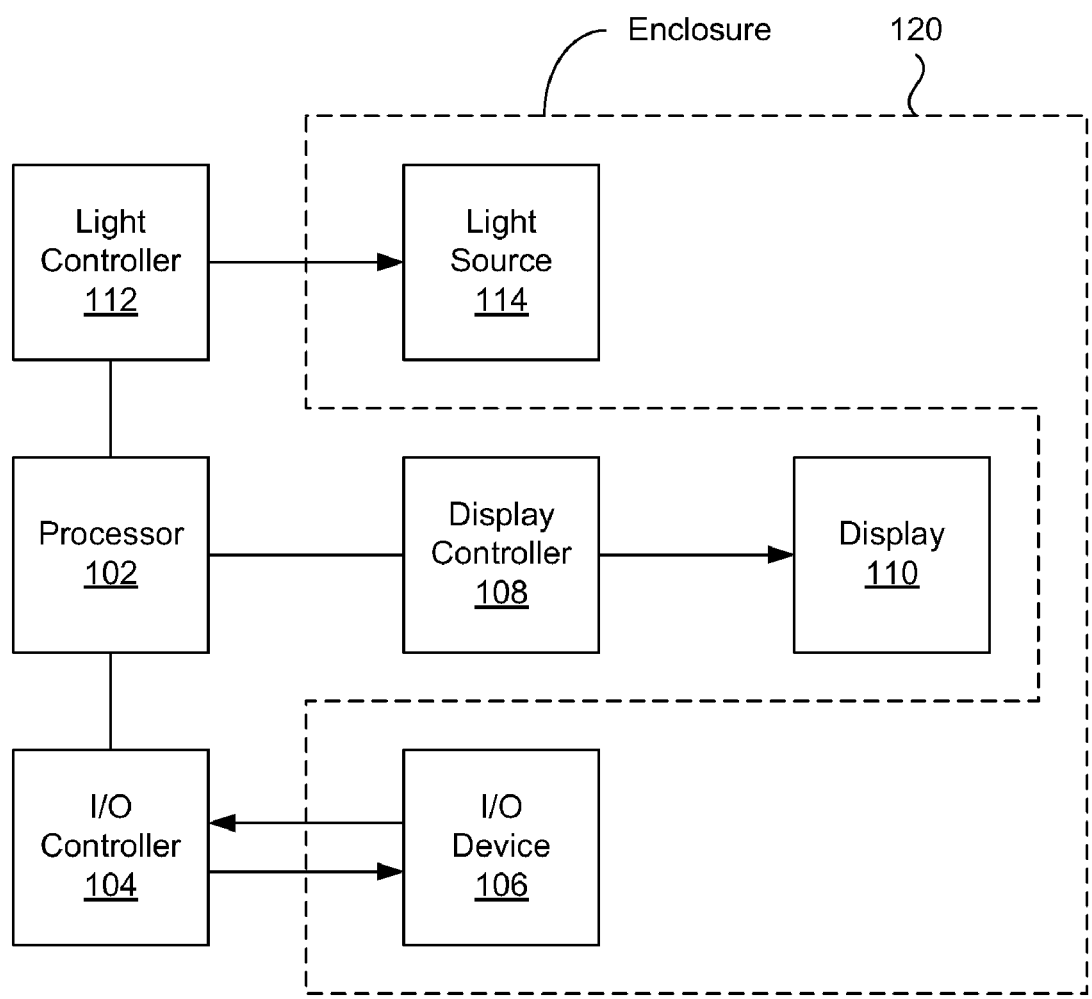
FIG. 9 is a block diagram of a computer system, in accordance with another embodiment of the present invention.
Figure 10:
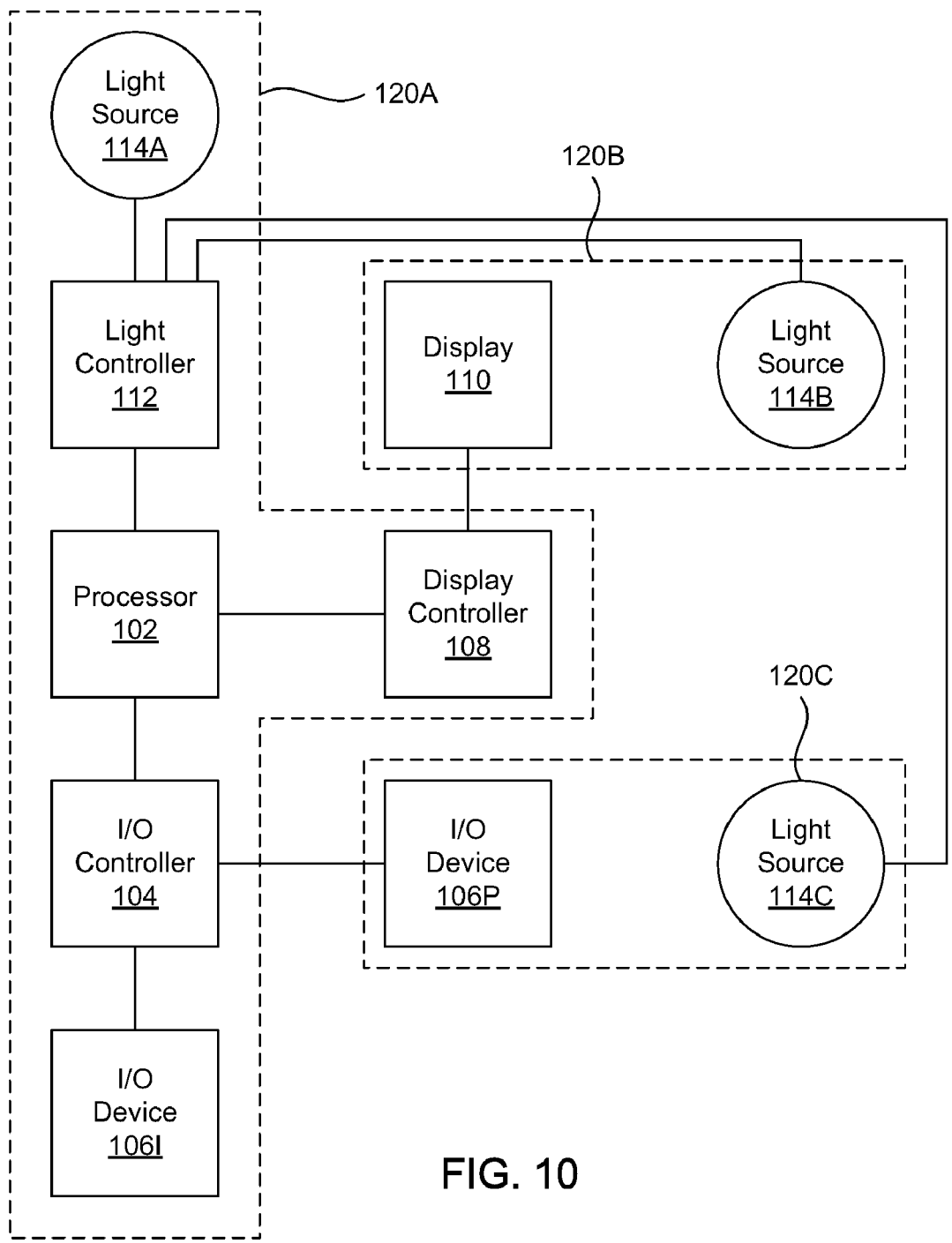
FIG. 10 is a block diagram of a computer system, in accordance with another embodiment of the present invention.

In another embodiment, the enclosure 120 is configured to cover only a portion of the computer system described above. For example, in FIG. 7, the illuminable enclosure 120 is configured to cover the processor 102, the I/O controller 104, the display controller 108, the light controller 112 and the light source 114. In FIG. 8, the illuminable enclosure 120 is configured to cover the display 110 and the light source 114. In FIG. 9, the illuminable enclosure 120 is configured to cover a peripheral I/O device (e.g., the I/O device 106) and the light source 114.

In yet another embodiment, the enclosure 120 can represent a plurality of enclosures that are configured to separately cover individual or sets of components of the computer system 100 described above. For example, in FIG. 10, a first enclosure 120A is configured to cover the processor 102, the I/O controller 104, an internal I/O device 106I, the display controller 108, the light controller 112 and a first light source 114A. In addition, a second enclosure 120B is configured to cover the display 110 and a second light source 114B. A third enclosure 120C is configured to cover a peripheral I/O device 106P and a third light source 114C. It should be understood that FIGS. 7-10 are representative embodiments and thus not limitations, thus it should be recognized that other configurations of the enclosure(s) may be used.

In one embodiment, the computer system corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

Figure 11:
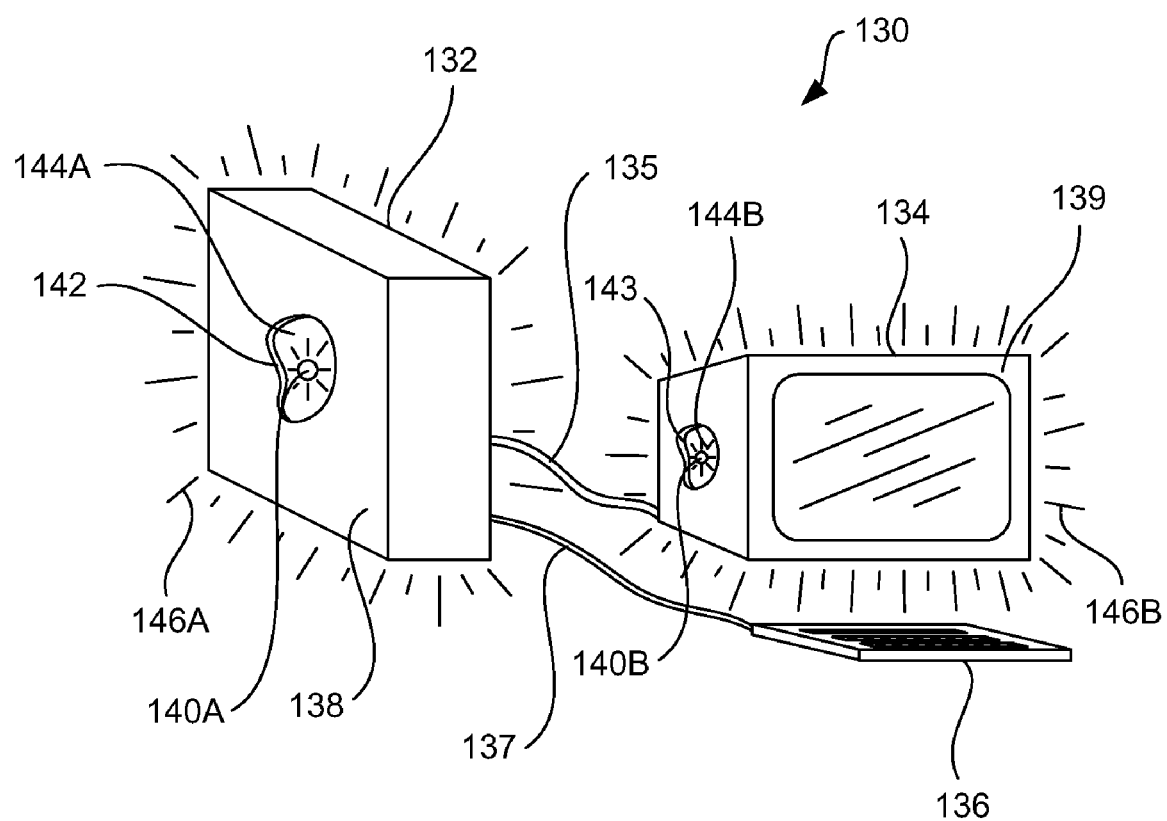
FIG. 11 is a perspective diagram of a computer system, in accordance with one embodiment of the present invention.

FIG. 11 is a perspective diagram of a general purpose computer 130, in accordance with one embodiment of the invention. By way of example, the general purpose computer 130 may correspond to the computer system 100 shown in FIG. 7 or 8. The computer 130 generally includes a base 132 and a monitor 134 (or display) operatively coupled to the base 132. In the illustrated embodiment, the base 132 and monitor 134 are separate components, i.e., they each have their own housing. That is, the base 132 includes a base housing 138 and the monitor 134 includes a monitor housing 139. Both housings are configured to enclose various internal components associated with operation of the respective devices. In general, the housings 138, 139 serve to surround their internal components at a peripheral region thereof so as to cover and protect their internal components from adverse conditions.

With regards to the base 132, the internal components may be processors, controllers, bridges, memory and the like. Often these internal components take the format of integrated circuits; however, the internal components can take various other forms (e.g., circuit boards, cables, fans, power supplies, batteries, capacitors, resistors). The internal components may also be various I/O devices such as a hard drive, a disk drive, a modem and the like. The base 132 may also include a plurality of I/O connectors for allowing connection to peripheral devices such as a mouse, a keyboard, a printer, a scanner, speakers and the like. In the illustrated embodiment, the base housing 138 serves to surround at least a processor and a controller. By way of example, the controller may be an input/output (I/O) controller, a display controller, a light source controller and/or the like. With regards to the monitor 134, the internal components may be a display screen. As is generally well known, the display screen is used to display the graphical user interface (including perhaps a pointer or cursor) as well as other information to a user.

In most cases, the housings 138, 139 include one or more walls 142, 143, respectively, that serve to structurally support the internal components in their assembled position within the housings. The walls 142, 143 also define the shape or form of the housings, i.e., the contour of the walls embody the outward physical appearance of the housings. The contour may be rectilinear, curvilinear or both. In the illustrated embodiment, the base housing 138 includes six (6) rectangular and planar walls that form a box-shaped housing. It should be understood, however, that this is not a limitation and that the form and shape of the housings may vary according to the specific needs or design of each computer system. By way of example, the housing may be formed in simple shapes such as a cube, a cylinder, a pyramid, a cone, or a sphere, or in complex shapes such as a combination of simple shapes or an object such as an apple, a house, a car or the like.

With regards to the base 132, the internal components may be processors, controllers, bridges, memory and the like. Often these internal components take the format of integrated circuits; however, the internal components can take various other forms (e.g., circuit boards, cables, fans, power supplies, batteries, capacitors, resistors). The internal components may also be various I/O devices such as a hard drive, a disk drive, a modem and the like. The base 132 may also include a plurality of I/O connectors for allowing connection to peripheral devices such as a mouse, a keyboard, a printer, a scanner, speakers and the like. In the illustrated embodiment, the base housing 138 serves to surround at least a processor and a controller. By way of example, the controller may be an input/output (I/O) controller, a display controller, a light source controller and/or the like. With regards to the monitor 134, the internal components may be a display screen. As is generally well known, the display screen is used to display the graphical user interface (including perhaps a pointer or cursor) as well as other information to a user.

For ease of discussion, a portion of the wall 142 has been removed to show a light source 140A disposed inside the housing 138. The light source 140A is configured to generate light 144A so as to illuminate the interior of the housing 138, and more particularly the interior of the light passing walls 142. The light 144A, which is made incident on the interior of the walls 142 by the light source 140A, is thereby transmitted through the walls 142 of the housing 138 to produce a light effect 146A that alters the visual appearance of the housing 138 and thus the visual appearance of the base 132. That is, the light 144A generated inside the housing 138 and passing through the walls 142 effectively changes the visual appearance of the housing 138 as seen by a user when looking at the housing 138. By way of example, the light effect 146A may cause housing 138 to exude a fixed or varying color or pattern. Although a single light source 140A is shown in FIG. 5, it should be noted that this is not a limitation and that a plurality of light sources may be used. For example, individual light sources may be strategically positioned within the housing 138 so as to illuminate specific zones or regions of the housing 138.

In another embodiment, the monitor housing 139 includes at least one light passing wall configured to allow the passage of light. In most cases, the light passing wall constitutes a significant percentage area of the housing. In the illustrated embodiment, the entire housing 139 is illuminable and thus all of its walls 143 are configured to allow the passage of light. It should be noted, however, that this is not a limitation and that the amount of light passing walls may vary according to the specific needs of each computer system. For example, the housing may include any number of opaque walls and light passing walls. Still further, a light passing wall needed not pass light over its entire surface. In other words, only a non-trivial portion of a wall needs to pass light to be considered a light passing wall. The light passing walls are generally formed from a translucent or semi-translucent medium such as, for example, a clear and/or frosted plastic material.

Again, for ease of discussion, a portion of the wall 143 has been removed to show a light source 140B disposed inside the housing 139. The light source 140B is configured to generate light 144B so as to illuminate the interior of the housing 139, and more particularly the interior of the light passing walls 143. The light 144B, which is made incident on the interior of the walls 143 by the light source 140B, is thereby transmitted through the walls 143 of the housing 139 to produce a light effect 146B that alters the visual appearance of the housing 139 and thus the visual appearance of the monitor 134. That is, the light 144B generated inside the housing 139 and passing through the walls 143 effectively changes the visual appearance of the housing 139 as seen by a user when looking at the housing 139. By way of example, the light effect 146B may cause housing 139 to exude a fixed or varying color or pattern. Although a single light source 140B is shown in FIG. 5, it should be noted that this is not a limitation and that a plurality of light sources may be used. For example, individual light sources may be strategically positioned within the housing 139 so as to illuminate specific zones or regions of the housing 139.

Figure 12:
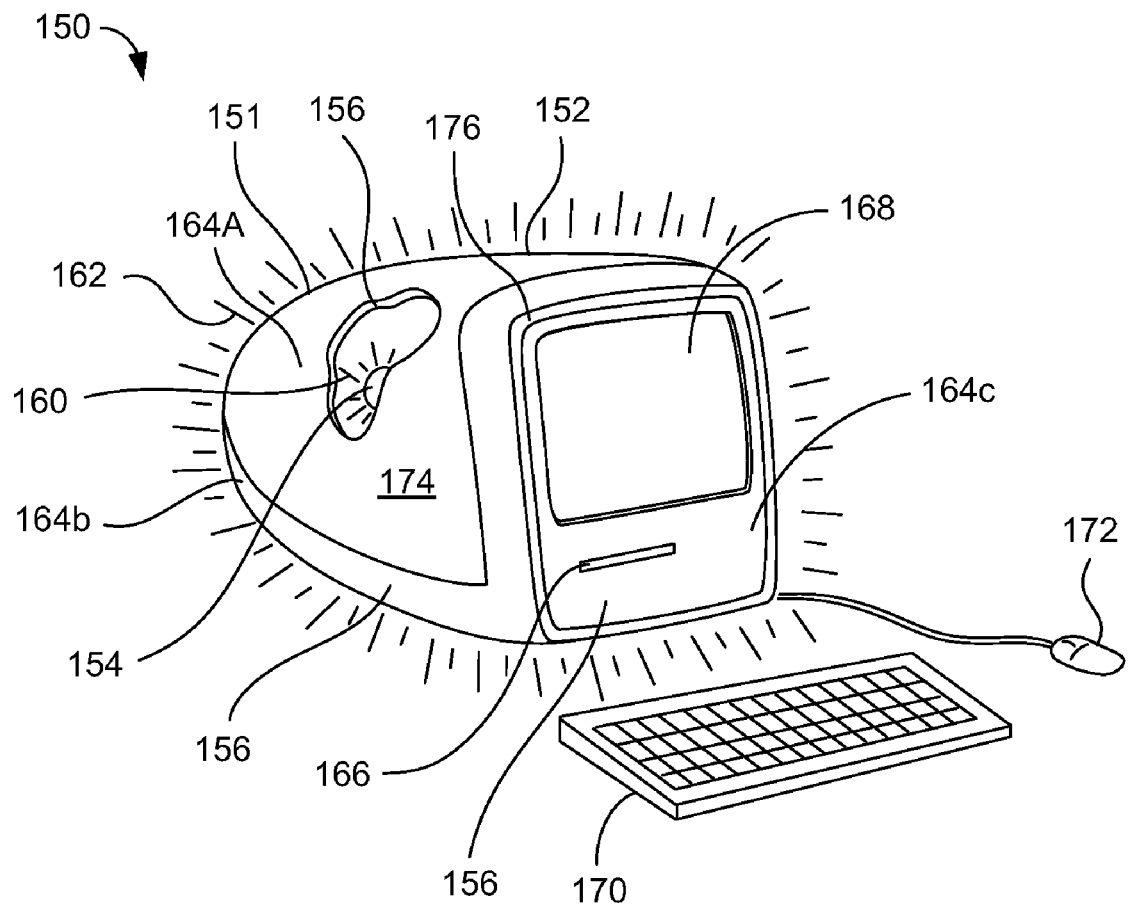
FIG. 12 is a perspective diagram of a computer system, in accordance with another embodiment of the present invention.

FIG. 12 is a perspective diagram of a general purpose computer 150, in accordance with another embodiment of the invention. By way of example, the general purpose computer 150 may correspond to the computer system shown in FIG. 7 or 8. The general purpose computer 150 includes an all in one machine 151 that integrates the base and monitor of FIG. 9 into a single housing 152. The housing 152 is generally configured to enclose various internal components associated with operation of the computer 150. In general, the housing 152 serves to surround the internal components at a peripheral region thereof so as to cover and protect the internal components from adverse conditions. In one embodiment, the housing 152 includes a plurality of cases 164 that cooperate to form the housing 152. Any number of cases may be used. In the illustrated embodiment, the cases 164 consist of a bottom case 164A, a top case 164B and a front case 164C.

The internal components may be processors, controllers, bridges, memory and the like. Often these internal components take the format of integrated circuits; however, the internal components can take various other forms (e.g., circuit boards, cables, fans, power supplies, batteries, capacitors, resistors). In the illustrated embodiment, the housing 152 serves to surround at least a processor and a controller. By way of example, the controller may be an input/output (I/O) controller, a display controller, a light source controller and/or the like. The internal components may also be various I/O devices such as a hard drive, a disk drive, a modem and the like. For example, as shown, the computer 150 may include a disk drive 166 and a display 168. The disk drive 166 is used to store and retrieve data via a disk. The display 168 is used to display the graphical user interface (including perhaps a pointer or cursor) as well as other information to the user. The all in one machine 151 may also include a plurality of I/O connectors for allowing connection to peripheral devices such as a mouse, a keyboard, a printer, a scanner, speakers and the like. By way of example, the computer system 150 may include I/O port connectors for connection to peripheral components such as a keyboard 170 and a mouse 172. The keyboard 170 allows a user of the computer 150 to enter alphanumeric data. The mouse 172 allows a user to move an input pointer on a graphical user interface and to make selections on the graphical user interface.

In most cases, the housing 152 includes one or more walls 156 that serve to structurally support the internal components in their assembled position within the housing. The walls 156 also define the shape or form of the housing, i.e., the contour of the walls embody the outward physical appearance of the housing. The contour may be rectilinear, curvilinear or both.

In one embodiment, the housing 152 includes one or more light passing walls having light passing portions, which are configured to allow the passage of light. The light passing portions may be an edge of the wall or a surface of the wall. The light passing portions may constitute the an entire wall or a portion of a wall, i.e., a light passing wall need not pass light over its entire surface. In other words, only a non-trivial portion of a wall needs to pass light to be considered a light passing wall. In most cases, the light passing portions constitute a significant percentage area of the light passing wall. For example, the amount of light passing area is generally determined by the amount of light needed to pass through the housing in order to effectively change the appearance of the housing so that a user feels differently about the device (e.g., not an indicator). Any suitable arrangement of light passing walls, light passing portions and opaque walls may be used so long as the outward appearance of the system changes.

In the illustrated embodiment, the walls 156' provided by the top case 164 are light passing walls, which are illuminated with light from a light source 154 disposed inside the housing 152. For ease of discussion, a portion of the wall 156' has been removed to show the light source 154 disposed therein. The light source 154 is configured to generate light 160 so as to illuminate the interior of the housing 152, and more particularly the interior of the wall 156'. In general, the light 160, which is made incident on the wall 156' by the light source 154, is transmitted through the wall 156' to produce a light effect 162 that alters the visual appearance of the housing 152 and thus the visual appearance of the computer system 150. That is, the light 160 generated inside the housing 152 and passing through the wall 156' effectively changes the visual appearance of the housing 152 as seen by a user when looking at the housing 152.

The light source 154 is operatively coupled to a light source controller (not shown) that cooperates with the light source 154 to produce the light 160. In general, the light source 154 provides the light 160 for illuminating the housing 152, and more particularly the wall 156, and the light source controller provides processing of light commands to produce the light in a controlled manner. In some implementations, the light 160 is arranged to produce the light effect 162 at a surface 174 of the wall 156. In other implementations, the light 160 is arranged to produce the light effect 162 at an edge 176 of the wall 156. In yet other implementations, the light 160 is arranged to produce a light effect 162 at both the surface 174 and the edge 176 of the wall 156.

To elaborate further, according to one embodiment, the light source 154 is generally configured to include at least one light emitting diode (LED). LED's offer many advantages over other light sources. For example, LED's are relatively small devices that are energy efficient and long lasting. LED's also run relatively cool and are low in cost. Furthermore, LED's come in various colors such as white, blue, green, red and the like. In most cases, the light source 154 includes a plurality of LED's that cooperate to produce the desired light effect. The plurality of LED's may be a plurality of individual LED's or a plurality of integrated LED arrays having a plurality of individual LED's that are grouped together.

In one embodiment, the individual LED's, whether by themselves or grouped together in an array, are the same color. As such, the same colored LED's can produce a light effect 162 that is one color or at least one shade of one color. This typically can be done by simultaneously maintaining the same light intensity for all of the LED's via the light source controller. The same colored LED's can also produce a light effect 162 that has a varying coloration. This typically can be accomplished by simultaneously adjusting the light intensities for all of the LED's at the same time via the light source controller. By way of example, this can be done to produce a light effect that blinks or fades in and out.

The same colored LED's can also produce a light effect that has a pattern with a plurality of different shades of one color. This is typically accomplished by maintaining different light intensities for different LED's via the light source controller. For example, LED's positioned in a first spatial zone, i.e., a first area of the illuminable housing 152, can produce a first shade of color (a first light intensity) and LED's positioned in a second spatial zone, i.e., a second area of the illuminable housing 152, can produce a second shade of color (a second light intensity). By way of example, the spatially zoned LED's can produce a light effect having stripes, spots, quadrants and the like. The same colored LED's can also produce a light effect 162 that has a varying pattern. This is typically accomplished by activating LED's at different times or by adjusting the intensities of LED's at different times via the light source controller. For example, same colored LED's positioned in a first spatial zone can produce a color at a first time and same colored LED's positioned in a second spatial zone can produce a color at a second time. By way of example, the spatially zoned LED's can produce a light effect that alternates or moves between different zones.

In another embodiment, at least a portion of the individual LED's, whether by themselves or grouped together in an array, are different colors. As such, the different colored LED's can produce a light effect that is a particular color or at least a shade of a particular color. This typically can be accomplished by mixing different colors of light to produce a resultant color of light via the light source controller. The different colored LED's can also produce a light effect 162 that has a varying coloration. This typically can be accomplished by adjusting the intensity of the different colored LED's via the light source controller. By way of example, this can be done to produce a light effect that changes from a first color to a second color (e.g., from blue to green).

The different colored LED's can also produce a light effect 162 that has a pattern with a plurality of colors. This typically can be accomplished by activating different colored LED's or LED arrays, which are located at various locations about the computer system, via the light source controller. For example, LED's or LED arrays positioned in a first spatial zone, i.e., a first area of the illuminable housing 152, can produce a first color and LED's positioned in a second spatial zone, i.e., a second area of the illuminable housing 152, can produce a second color. By way of example, the spatially zoned LED's can produce a light effect having rainbow stripes, different colored spots, different colored quadrants and the like. The different colored LED's can also produce a light effect 162 that has a changing pattern. This is typically accomplished by activating different colored LED's at different times or by adjusting the intensities of different colored LED's at different times via the light source controller. The different colored LED's may be in the same spatial zone or a different spatial zone. For example, LED's positioned in a first spatial zone can produce a first colored light at a first time and LED's positioned in a second spatial zone can produce a second colored light at a second time. This can be done in a specific sequence (e.g., red, blue, red, blue, red, blue . . . ) or a random sequence (e.g., green, yellow, red, yellow, blue . . . ).

Figure 13:
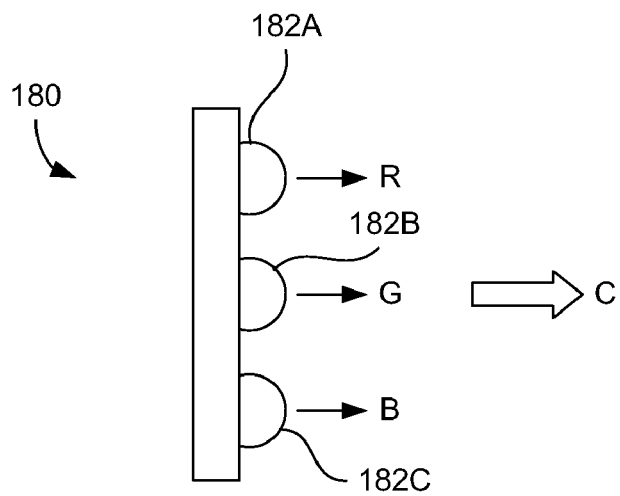
FIG. 13 is a side view of a LED array, in accordance with one embodiment of the present invention.

FIG. 13 is a simplified diagram of an integrated LED array 180, in accordance with one embodiment of the invention. By way of example, the integrated LED array 180 (or a plurality of LED arrays 180) may correspond to the light source 154 described in FIG. 11. The integrated LED array 180 generally includes a plurality of individual LED's 182 that produce an overall light effect that is one color at a moment in time. In the illustrated embodiment, each of the individual LED's 182 represents a different color, as for example, a red LED 182A, a green LED 182B and a blue LED 182C, that cooperate to produce a resultant color C. It is generally believed that these three colors are the primary colors of light and therefore they can be mixed to produce almost any color. That is, the resultant color C may be a wide range of colors, as for example, a majority of the colors from the color spectrum. Although only one LED is shown for each color, it should be noted that this is not a requirement and that the number may vary according to the specific needs of each device.

Figure 14A:
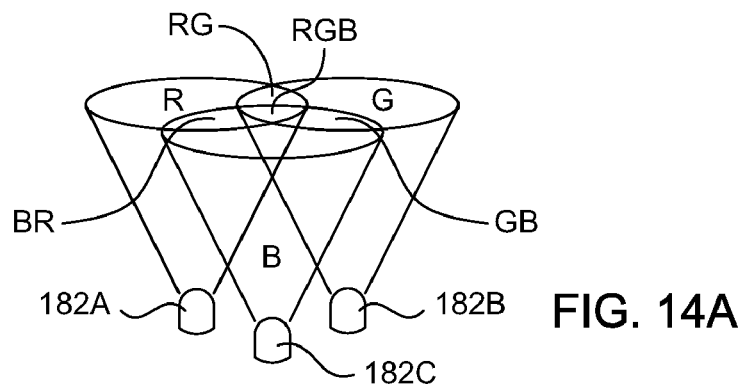
FIGS. 14A and 14B are graphical illustrations showing color mixing via the LED array of FIG. 8, in accordance with one embodiment of the present invention.

To facilitate discussion, FIG. 14A is a three dimensional graphical representation showing color mixing with regards to the red, green and blue LED's (182A-C). As shown, red light produced by the red LED 182A is designated R, green light produced by the green LED 182B is designated G, and blue light produced by the blue LED 182C is designated B. Furthermore, mixed light produced by the red and green LED's 182A&B is designated RG, mixed light produced by the green and blue LED's 182B&C is designated GB, and mixed light produced by the blue and red LED's 182A&C is designated BR. Moreover, mixed light produced by the red, green and blue LED's 182A-C is designated W (for white).

Figure 14B:
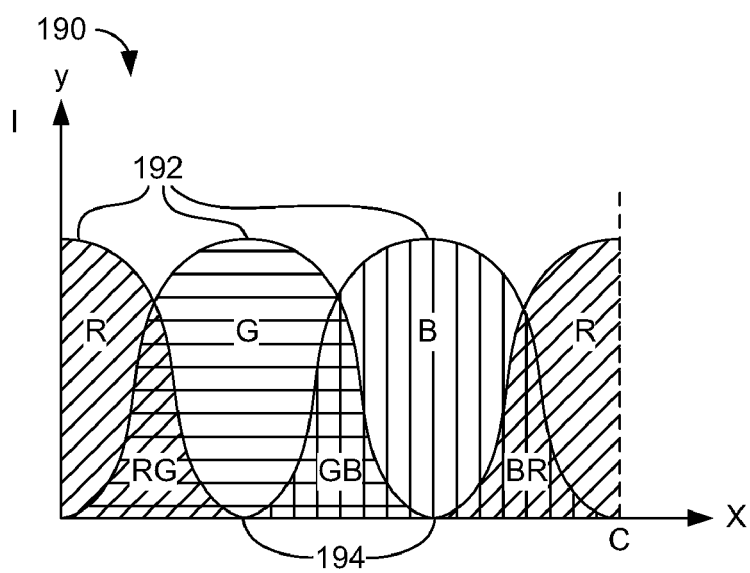

Referring now to FIG. 14B (a two dimensional graphical representation showing color mixing with regards to the red, green and blue LED's 182A-C) each of the colors has a range of intensities (I) between a peak intensity 192 and a zero intensity 194. As such, the light source controller can produced almost any color by adjusting the intensity (I) of each of the LED's (182A-C). By way of example, in order to produce the highest shade of red R, the intensities of the green G and blue B are reduced to zero intensity 194 and the intensity of the red R is increased to its peak intensity 192. The highest shades of green and blue can be implemented in a similar manner. In addition, in order to produce a shade of red and green RG, the intensities of the green G and red R are increased to levels above zero intensity 194 while the intensity of blue B is reduced to zero intensity 194. Shades of green and blue GB and blue and red BR can be implemented in a similar manner. Furthermore, in order to produce shades of white, the intensities of the red R, green G and blue B are increased to the same levels above zero intensity 194.

Although the integrated LED array 180 is shown and described as using the three primary colors, it should be noted that this is not a limitation and that other combinations may be used. For example, the integrated LED array may be configured to include only two of the primary colors.

Figure 15:
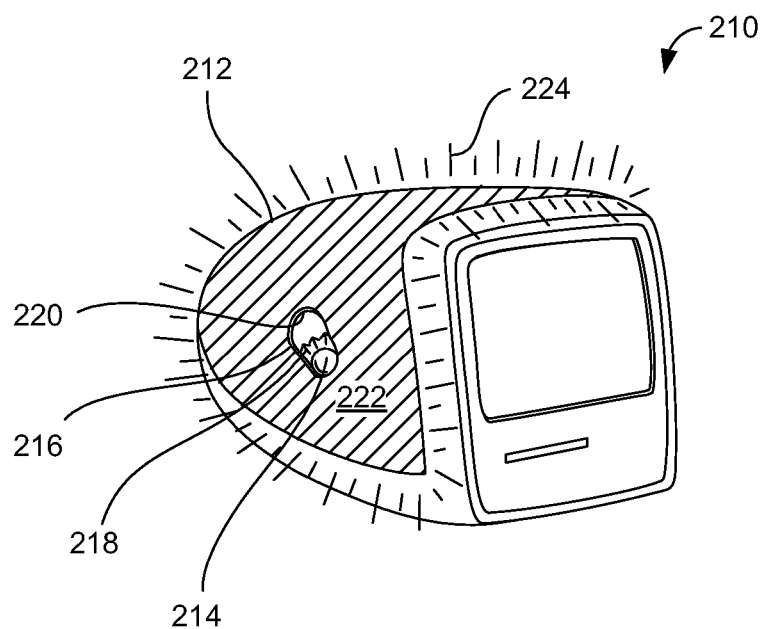
FIG. 15 is a perspective diagram of a computer, in accordance with one embodiment of the present invention.

FIG. 15 is a perspective diagram of a computer system 210, in accordance with one embodiment of the present invention. By way of example, the computer system 210 may generally correspond to the computer 150 of FIG. 12. The computer system 210 generally includes an illuminable housing 212 that is illuminated with light from a light source 214 disposed therein. The illuminable housing 212 generally includes a translucent or semi-translucent wall 216 configured to allow the passage of light. For ease of discussion, a portion of the wall 216 has been removed to show the light source 214 disposed therein. The light source 214 is generally configured to generate light 218 so as to illuminate a surface of the wall 216 of the illuminable housing 212. That is, the light 218 emitted by the light source 214 is made incident on an inner surface 220 of the wall 216. The light 218 then passes through the wall 216 (width wise) to an outer surface 222 of the wall 216 where it produces a light effect 224 that alters the visual appearance of the wall 216 and thus the visual appearance of the computer system 210.

In one embodiment, a characteristic glow is produced at the outer surface 222 of the wall 216 when the light 218 is transmitted through the wall 216. By characteristic glow, it is meant that the coloration of the wall 216 emanates from the wall 216 rather than from the light source 214, i.e., the light 218 is altered during transmission through the wall 216. In most cases, the characteristic glow is produced by a light directing element disposed in or on the wall 216. The light directing element is generally configured to scatter incident light by reflection and/or refraction.

Figure 16:
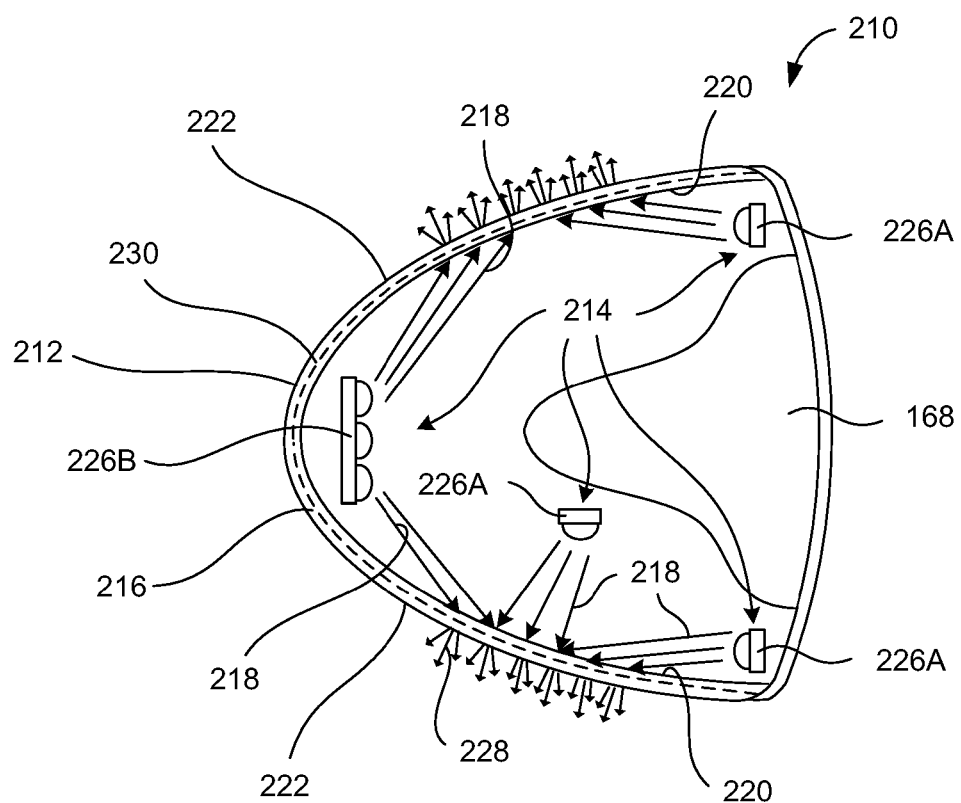
FIG. 16 is a top view of a computer, in accordance with one embodiment of the present invention.

To facilitate discussion, FIG. 16 is a top view, in cross section, of the computer system 210 shown in FIG. 15, in accordance with one embodiment of the invention. As shown, the light source 214 consists of a plurality of light emitting diodes 226 (LED's) that are disposed at various positions inside the illuminable housing 212. The LED's 226 may be a single LED 226A or an LED array 226B. The LED's 226 may be positioned in various directions so long as the light 218 is made incident on the inner surface 220 of the wall 216. For example, the axis of the LED's 226 may be pointing directly at the inner surface 220 or they may be pointing at an angle relative to the inner surface 220. Furthermore, the wall 216 is configured to transmit the light 218 therethrough from the inner surface 220 to an outer surface 222. By way of example, the wall 216 may be formed from a translucent or semi-translucent plastic such as polycarbonate, acrylic and the like. In most cases, the wall 216 is also configured to scatter the transmitted light to produce a characteristic glow 228 that emanates from the outer surface 222 of the wall 216. For instance, the wall 216 may include a light directing element 230 (shown by dotted line) that scatters the light via reflection and/or refraction.

Figure 17A:
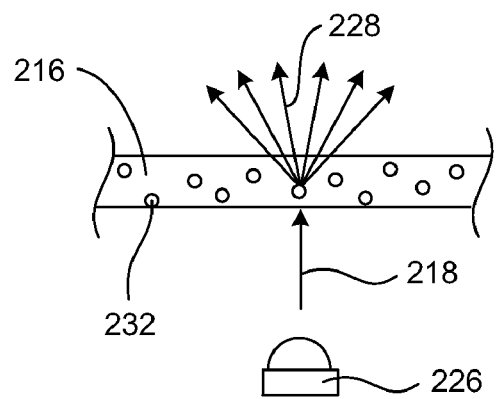
FIG. 17 A-C are broken away top views, in cross section, of a wall of a computer, in accordance with several embodiments of the present invention.

In one embodiment, the light directing element 230 is an additive that is disposed inside the wall 216. Referring to FIG. 17A, for example, the wall 216 may include a plurality of light scattering particles 232 (e.g., additives) dispersed between the inner surface 220 and outer surface 222 of the wall 216. As shown, when the light 218 is made incident on the inner surface 220, it is transmitted through the wall 216 until is intersects a light scattering particle 232 disposed inside the wall 216. After intersecting the light scattering particle 232, the light 218 is scattered outwards in a plurality of directions, i.e., the light is reflected off the surface and/or refracted through the light scattering particle thereby creating the characteristic glow 228. By way of example, the light scattering particles 232 may be formed from small glass particles or white pigments. Furthermore, by changing the amount of light scattering particles 232 disposed in the wall 216, the characteristics of the glow can be altered, i.e., the greater the particles the greater the light scattering.

Figure 17B:
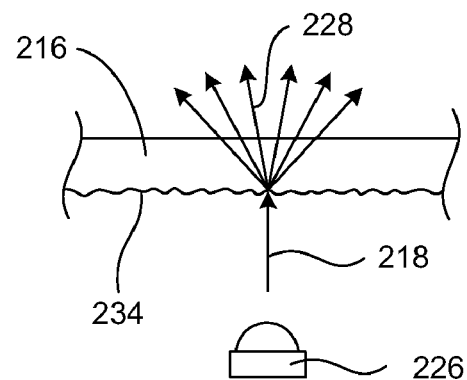
Figure 17C:
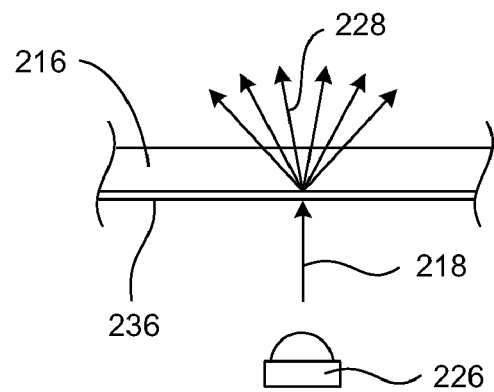

In another embodiment, the light directing element 230 is a layer, coating or texture that is applied to the inner or outer surface 220, 222 of the wall 216. Referring to FIGS. 17B and 17C, for example, the wall 216 may include a light scattering coating 234 or a light scattering texture 236 disposed on the inner surface 220 of the wall 216. By way of example, the light scattering coating 234 may be a paint, film or spray coating. In addition, the light scattering texture 236 may be a molded surface of the wall or a sandblasted surface of the wall. As shown, when light 218 is made incident on the inner surface 220, it intersects the light scattering coating 234 or texture applied on the inner surface 220 of the wall 216. After intersecting the light scattering coating 234 or the light scattering texture 236, the light 218 is scattered outwards in a plurality of directions, i.e., the light is reflected off the surface and/or refracted through the light scattering particle thereby creating the characteristic glow 228.

Although not shown, in another embodiment, the thickness of the wall may be altered so as to produce a light scattering effect. It is generally believed that the greater the thickness, the greater the light scattering effect.

Figure 18:
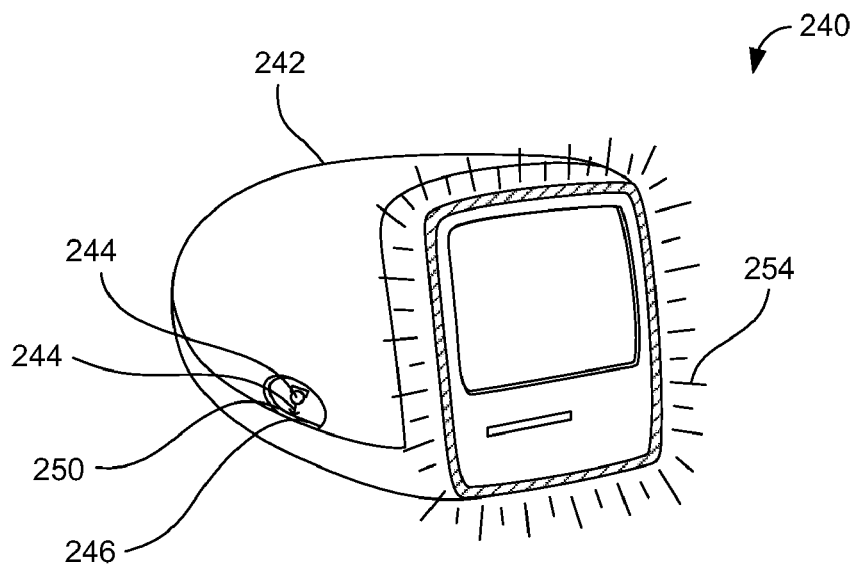
FIG. 18 is a perspective diagram of a computer, in accordance with one embodiment of the present invention.

FIG. 18 is a perspective diagram of a computer system 240, in accordance with another embodiment of the present invention. By way of example, the computer system 240 may generally correspond to the computer 150 of FIG. 12. The desktop computer system 240 generally includes an illuminable housing 242 that is illuminated with light from a light source 244 disposed therein. The illuminable housing 242 generally includes a translucent or semi-translucent wall 246 configured to allow the passage of light. For ease of discussion, a portion of the wall 246 has been removed to show the light source 244 disposed therein. The light source 244 is generally configured to generate light 248 so as to illuminate an edge of the wall 246 of the illuminable housing 242. That is, the light 248 emitted by the light source 244 is made incident on an inner edge 250 of the wall 246. The light is then directed through the wall 246 (length wise) to an outer edge 252 of the wall 246 where it produces a light effect 254 that alters the visual appearance of the wall 246 and thus the visual appearance of the computer system 240. In essence, the wall 246 acts like a light pipe that is configured for transferring or transporting light. Light pipes are generally well known in the art.

Figure 19:
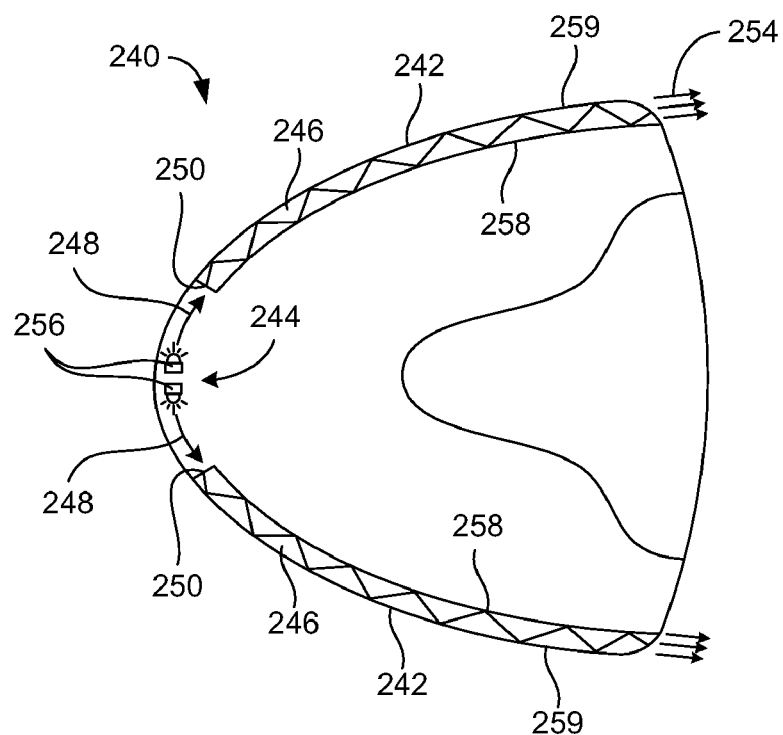
FIG. 19 is a top view of a computer, in accordance with one embodiment of the present invention.

To facilitate discussion, FIG. 19 is a top view, in cross section, of the computer system 240 shown in FIG. 14, in accordance with one embodiment of the invention. As shown, the light source 244 consists of a plurality of light emitting diodes 256 (LED's) that are disposed at various positions inside the illuminable housing 242. The LED's 256 may be a single LED or an LED array. The LED's 256 may be positioned in various directions so long as the light 248 is made incident on the inner edge 250 of the wall 246. For example, the axis of the LED's 256 may be pointing directly at the inner edge 250 or they may be pointing at an angle relative to the inner edge 250. Furthermore, the wall 246 is configured to transmit the light 248 therethrough from the inner edge 250 to the outer edge 252 to produce the light effect 254 that emanates from the outer edge 252 of the wall 246. By way of example, the wall 246 may be formed from a translucent or semi-translucent plastic such as polycarbonate, acrylic and the like. In some cases, the wall 246 may include light directing portions 258, 259 that cause the light to reflect back and forth until it exits the outer edge 252.

Figure 20:
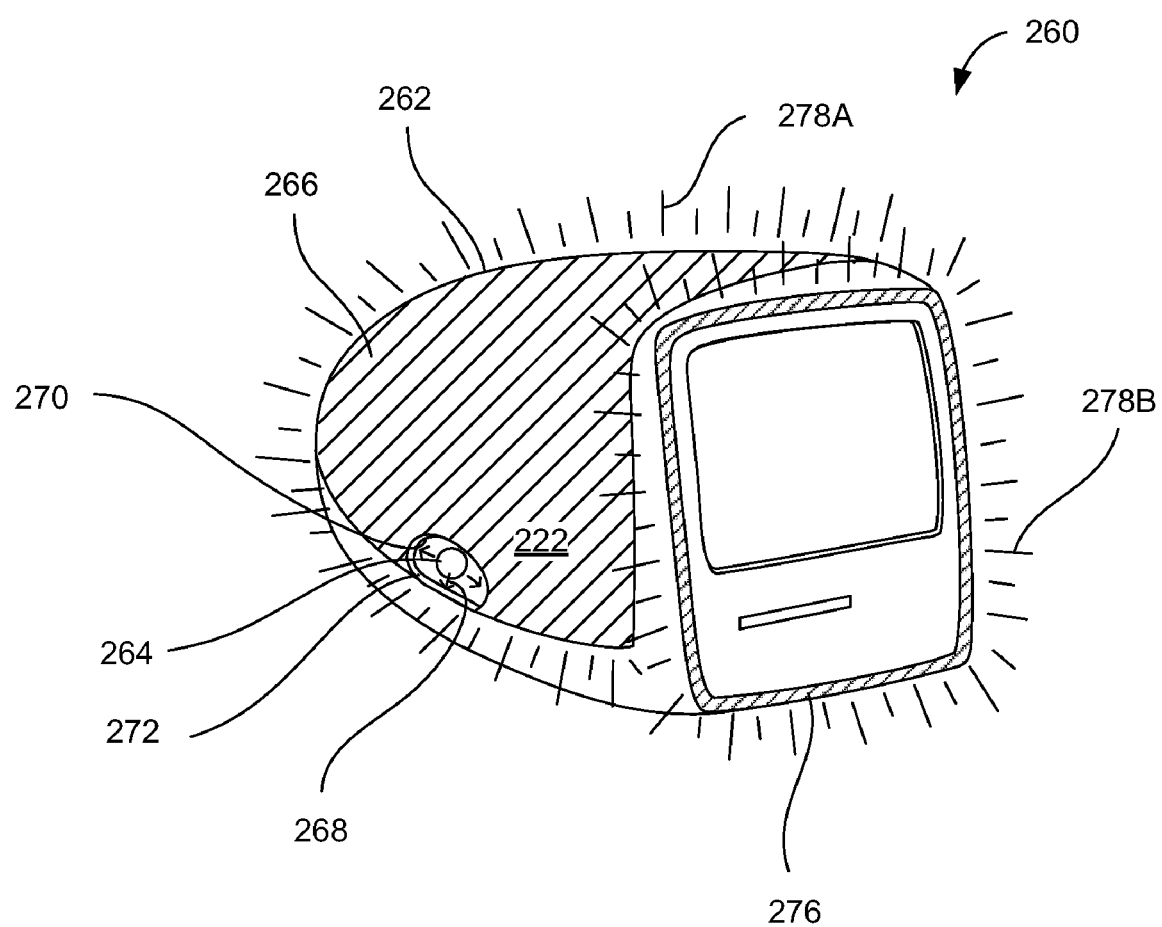
FIG. 20 is a perspective diagram of a computer, in accordance with one embodiment of the present invention.

FIG. 20 is a perspective diagram of a computer system 260, in accordance with another embodiment of the present invention. By way of example, the computer system 260 may generally correspond to the computers 150, 210 and 240 of FIGS. 12, 15 and 18, respectively. The desktop computer system 260 generally includes an illuminable housing 262 that is illuminated with light from a light source 264 disposed therein. The illuminable housing 262 generally includes a translucent or semi-translucent wall 266 configured to allow the passage of light. For ease of discussion, a portion of the wall 266 has been removed to show the light source 264 disposed therein. The light source 264 is generally configured to generate light 268 so as to illuminate both a surface and an edge of the wall 266 of the illuminable housing 262. That is, the light 268 emitted by the light source 264 is made incident on an inner surface 270 and/or an inner edge 272 of the wall 266. The light is then directed through the wall 266 to an outer surface 274 and an outer edge 276 of the wall 266 where it produces a light effect 278A and 278B that alters the visual appearance of the wall 266 and thus the visual appearance of the computer system 260.

Figure 21A:
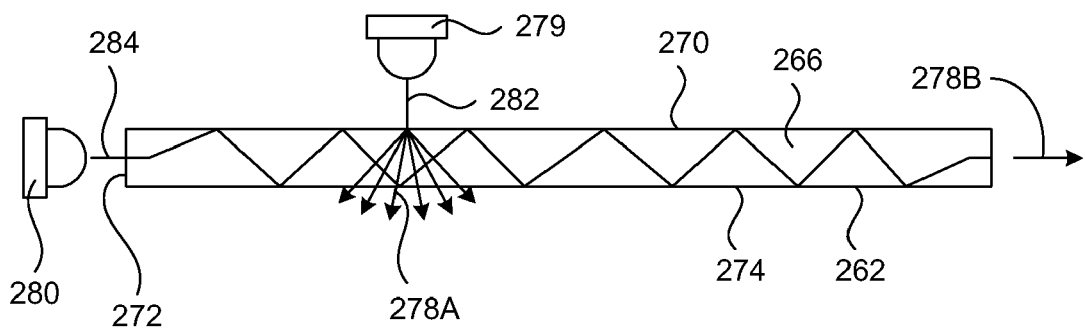
FIG. 21 A-D are broken away top views, in cross section, of a wall of a computer, in accordance with several embodiments of the present invention.

In one embodiment, the light 268 emitted by the light source 264 is made incident on both the inner edge 272 and inner surface 270 of the wall 266 via a plurality of LED's or LED arrays. Referring to FIG. 21A, for example, the light source 264 includes at least a first LED 279 and a second LED 280. The first LED 279 is configured to generate a first light 282 so as to illuminate a surface of the wall 266 of the illuminable housing 262 and the second LED 280 is configured to generate a second light 284 so as to illuminate an edge of the wall 266 of the illuminable housing 262. With regards to the first LED 278, the first light 282 is first made incident on the inner surface 270 of the wall 266 and then it is directed through the wall 266 (width wise) to the outer surface 274 of the wall 266 where it produces the light effect 278A. With regards to the second LED 280, the second light 284 is first made incident on the inner edge 272 of the wall 266 and then it is directed through the wall 266 (length wise) to an outer edge 276 of the wall 266 where it produces the light effect 278B. As should be appreciated, the light effect 278A alters the visual appearance of the surface of the wall 266, while light effect 278B alters the visual appearance of the edge of the wall 266.

Figure 21B:
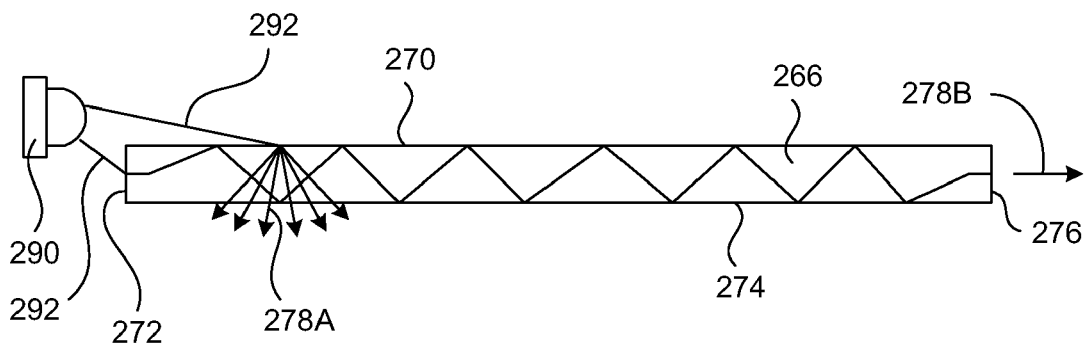

In another embodiment, the light 268 emitted by the light source 264 is made incident on both the inner edge 272 and the inner surface 270 of the wall 266 via an offset LED. Referring to FIG. 21B, for example, the light source 264 includes an LED 290 that is offset relative to the wall 266 and that generates light 292 so as to illuminate a surface and an edge of the wall 266 of the illuminable housing 262. That is, the light 292 emitted by the LED 290 is made incident on both the inner surface 270 and the inner edge 272 of the wall 266. As such, a first portion of the light 290 is directed through the wall 266 (width wise) to the outer surface 274 of the wall 266 where it produces the light effect 278A that alters the visual appearance of the surface of the wall 266. In addition, a second portion of the light 290 is directed through the wall 266 (length wise) to the outer edge 276 of the wall 266 where it produces a light effect 278B that alters the visual appearance of the edge of the wall 266.

Figure 21C:
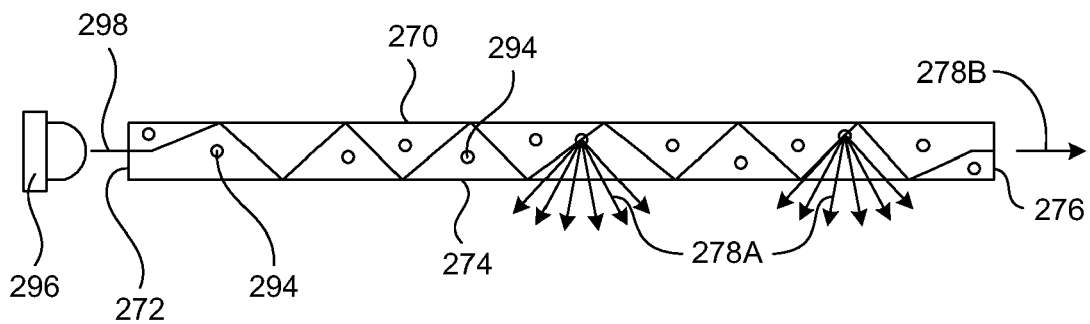

In another embodiment, the wall 266 includes light scattering particles and the light 268 emitted by the light source 264 is made incident on the inner edge 276 via an LED. Referring to FIG. 21C, for example, the wall 266 includes a plurality of light scattering particles 294 disposed between the inner and outer surfaces 270, 274 and the inner and outer edges 272, 276. Furthermore, the light source 264 includes an LED 296 configured to generate light 298 so as to illuminate a surface and an edge of the wall 266 of the illuminable housing 262. The light 298 emitted by the LED 296 is made incident on an inner edge 272 of the wall 266. The light 298 is then directed through the wall 266 (length wise) to an outer edge 276 of the wall 266 where it produces the light effect 278B that alters the visual appearance of the surface of the wall 266. As shown, the light 298 also intersects the light scattering particle 294 during transmission therethrough and thus a portion of the light 298 is scattered outwards in a plurality of directions where it produces the light effect 278A that also alters the visual appearance of the surface of the wall 266.

Figure 21D:
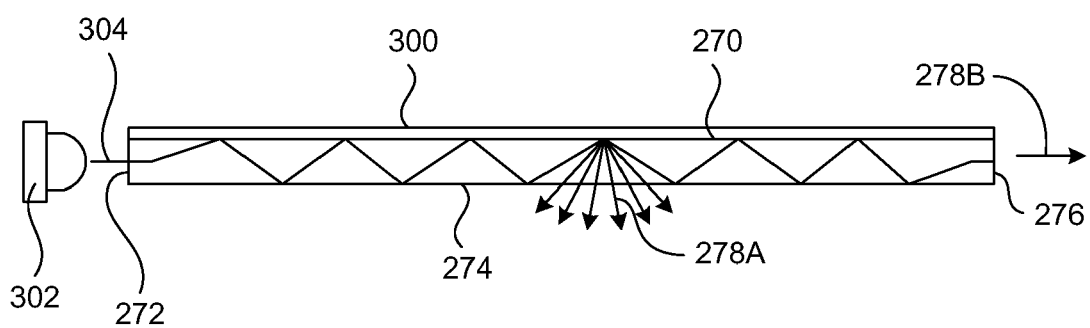

In another embodiment, the wall 266 can include a light scattering coating and the light 268 emitted by the light source 264 is made incident on an inner edge 272 via an LED. Referring to FIG. 21D, for example, the wall 266 includes a light scattering coating 300 that is applied to the inner surface 270. Furthermore, the light source 264 includes an LED 302 configured to generate light 304 so as to illuminate a surface and edge of the wall 266 of the illuminable housing 262. The light 304 emitted by the LED 302 is made incident on the inner edge 272 of the wall 266. The light 304 is then directed through the wall 266 (length wise) to an outer edge 276 of the wall 266 where it produces the light effect 278B that alters the visual appearance of the edge of the wall 266. As shown, the light 304 also intersects the light scattering coating 300 during transmission through the wall and thus a portion of the light 304 is scattered outwards in a plurality of directions where it produces the light effect 278A that also alters the visual appearance of the surface of the wall 266.

Figure 22:
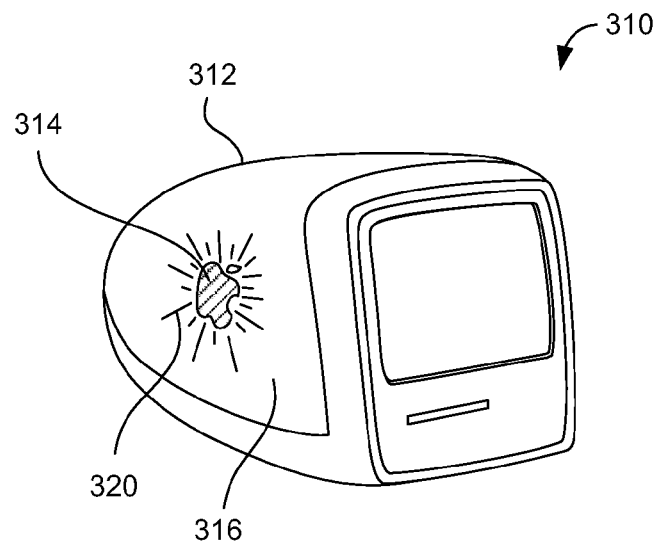
FIG. 22 is a perspective diagram of a computer, in accordance with one embodiment of the present invention.

FIG. 22 is a perspective diagram of a computer system 310, in accordance with another embodiment of the present invention. By way of example, the computer system 310 may generally correspond to the computer 150 of FIG. 12. The desktop computer system 310 generally includes an illuminable housing 312 that is illuminated with light from an illuminated object 314 disposed therein. The illuminable housing 312 generally includes a translucent or semi-translucent wall 316 configured to allow the passage of light. In the illustrated embodiment, the illuminated object 314 is seen through the translucent or semi-translucent wall 316. That is, the illuminated object 314 generates a first light effect (not shown) that is transmitted through a surface of the wall 316 to produce a second light effect 320 that alters the visual appearance of the computer system 310. As should be appreciated, the shape of the light effect 320 typically corresponds to the shape of the illuminated object 314. By way of example, the illuminated object 314 may take on a variety of shapes including simple shapes such as squares and circles or more complex shapes such as an apple (as shown).

Figure 23:
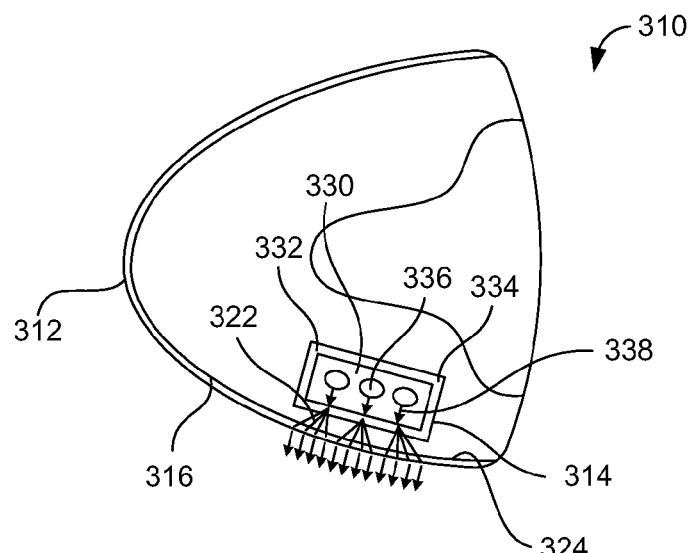
FIG. 23 is a top view of a computer, in accordance with one embodiment of the present invention.

To facilitate discussion, FIG. 23 is a top view, in cross section, of the computing device 310 shown in FIG. 22, in accordance with one embodiment of the invention. As shown, the illuminated object 314 is disposed inside the illuminable housing 312. The illuminated object 314 is generally positioned adjacent to the wall 316 of the illuminable housing 312. It should be noted, however, that this is not a limitation and that the illuminated object 314 may be positioned at other locations inside the housing 312. For example, the illuminated object 314 may be placed towards the center of the housing 312. Furthermore, the illuminated object 314 may be positioned in various directions so long as a first light effect 322 is made incident on an inner surface 324 of the wall 316. For example, the axis of the illuminated object may be pointing directly at the inner surface 324 or they may be pointing at an angle relative to the inner surface 324.

Furthermore, the wall 316 is configured to transmit the light effect 322 therethrough from the inner surface 324 to an outer surface 326, i.e., the wall provides a window for passing the first light effect therethrough. By way of example, the wall 316 may be formed from a translucent or semi-translucent plastic such as polycarbonate, acrylic and the like. Accordingly, the first light effect 322 that passes through the wall 316 effectively changes the appearance of the computing device 310. In some cases, the wall 316 may also be configured to scatter the transmitted light effect to produce a characteristic glow that emanates from the outer surface of the wall 316. That is, the wall 316 may include a light directing element that scatters the light via reflection and/or refraction.

To elaborate further, the illuminated object 314 generally includes a light source 330 and a casing 332. The casing 332, which typically forms the shape of the illuminated object 314, includes a casing wall 334 that is configured to cover at least a portion of the light source 330. In the illustrated embodiment, the light source 330 consists of a plurality of light emitting diodes 336 (LED's) that are disposed at various positions inside the casing 332. The LED's 336 may be a single LED or an LED array. The LED's 336 are generally configured to generate light 338 so as to illuminate the casing wall 334. As such, the LED's 336 may be positioned in various directions so long as the light 338 is made incident on an inner surface of the casing wall 334. Furthermore, the wall 316 is configured to transmit the light 338 therethrough from the inner surface to an outer surface. By way of example, the wall 334 may be formed from a translucent or semi-translucent plastic such as polycarbonate, acrylic and the like. In most cases, the casing wall 334 is configured to scatter the transmitted light to produce a characteristic glow that emanates from the outer surface of the casing wall 334. For instance, the casing wall 334 might include a light directing element that scatters the light via reflection and/or refraction.

Figure 24:
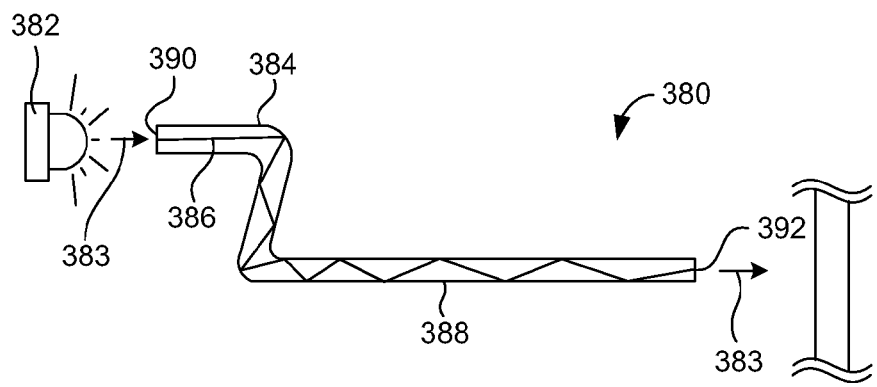
FIG. 24 is a simplified diagram of a light source arrangement, in accordance with one embodiment of the present invention.

FIG. 24 is a side view of a light source arrangement 380, in accordance with one embodiment of the present invention. By way of example, the light source arrangement 380 may generally correspond to any of the light sources (e.g., light emitting devices) described above. The light source arrangement 380 includes a light source 382 and a light pipe 384. The light source 382 is configured to generate light 383 and the light pipe 384 is configured to distribute the light 383 to locations within a housing where it is needed. By way of example, the housing may correspond to any one of the illuminable housings described above. The light pipe 384 generally includes a transmissive portion 386 at its interior and a reflective portion 388 at its exterior. Because the exterior of the light pipe 384 is reflective, the light 383 reflects off the sides of the pipe as it travels through the interior of the light pipe. Accordingly, when light 383 is made incident on an inner edge 390 of the light pipe it is directed through the light pipe via the transmissive and reflective portions to an outer edge 392 of the light pipe where it emits the light to another location positioned away from the location of the light source.

Any suitable light pipe may be used. For example, the light pipe may be rigid or flexible (as shown). Flexible light pipes allow a wider range of light source positions relative to housing positions. For example, the light source may positioned in locations that prevent direct exposure to an illuminable portion of the housing, and thus the light pipe may be used to distribute the light to the illuminable portions of the housing by bending around components that prevent direct exposure (e.g., walls, frames and the like). In one embodiment, the light source is housed within an opaque portion of the housing, and a light pipe is used to direct light to an illuminable portion of the housing so as to produce the desired light effect. Furthermore, multiple light pipes may be used to direct light to a plurality of locations around the housing. This may be done with a single light source or multiple light sources. For example, a single light source may be used to provide light to a plurality of light pipes, each of which has one end position proximate the light source and an opposite end positioned in different locations within the housing.

Figure 25:
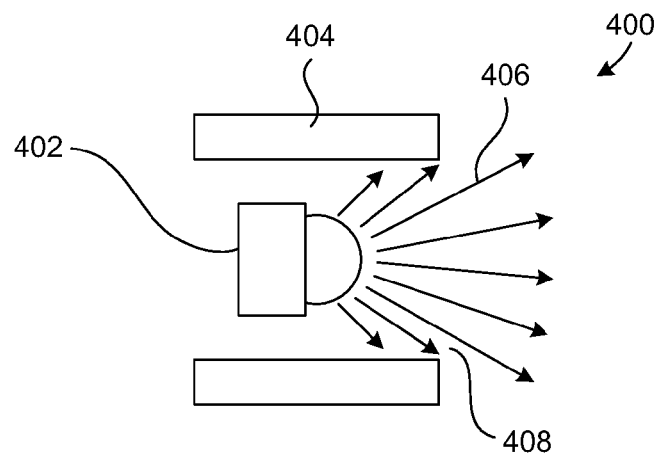
FIG. 25 is a simplified diagram of a light source arrangement, in accordance with one embodiment of the present invention.

FIG. 25 is a side view of a light source arrangement 400, in accordance with one embodiment of the present invention. By way of example, the light source arrangement 400 may generally correspond to any of the light sources (e.g., light emitting devices) described above. The light source arrangement 400 includes a light source 402 and a light guide 404, which is configured to focus light 406 generated by the light source 402. The light guide 404, which covers a portion of the light source 402, is typically formed from an opaque material such that the light 406 emanating from the light source 402 is only directed out of an opening 408 formed by the light guide 404. In this manner, the light exiting the opening has a shaped configuration that is more intense. The shaped configuration tends to illuminate a smaller portion of the housing than would otherwise be illuminated. The opening 408 may form any number of shapes. For example, the opening may form a circle, an oval, a square, a rectangle, a triangle, a letter, a logo or any other shape. In this particular embodiment, the light guide 404 is configured to cover the sides of the light source 402. In some cases, it may be desirable to use a light guide to block light from reaching light sensitive areas of the electronic device or to prevent heat sensitive areas from becoming to hot.

Figure 26:
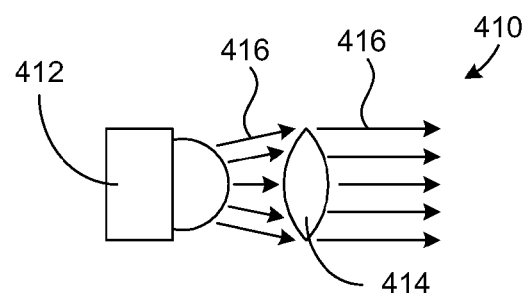
FIG. 26 is a simplified diagram of a light source arrangement, in accordance with one embodiment of the present invention.

FIG. 26 is a side view of a light source arrangement 410, in accordance with one embodiment of the present invention. By way of example, the light source arrangement 410 may generally correspond to any of the light sources (e.g., light emitting devices) described above. The light source arrangement 410 includes a light source 412 and a lens 414, which is configured to focus light 416 generated by the light source 412. The lens 404, which is typically positioned between the light source 402 and the illuminable wall (not shown), is arranged to receive light emanating from the light source 402 and to direct the light to a specific area of the illuminable wall. In this manner, the light has a shaped configuration that is more intense. As mentioned above, the shaped configuration tends to illuminate a smaller portion of the housing than would otherwise be illuminated.

Figure 27:
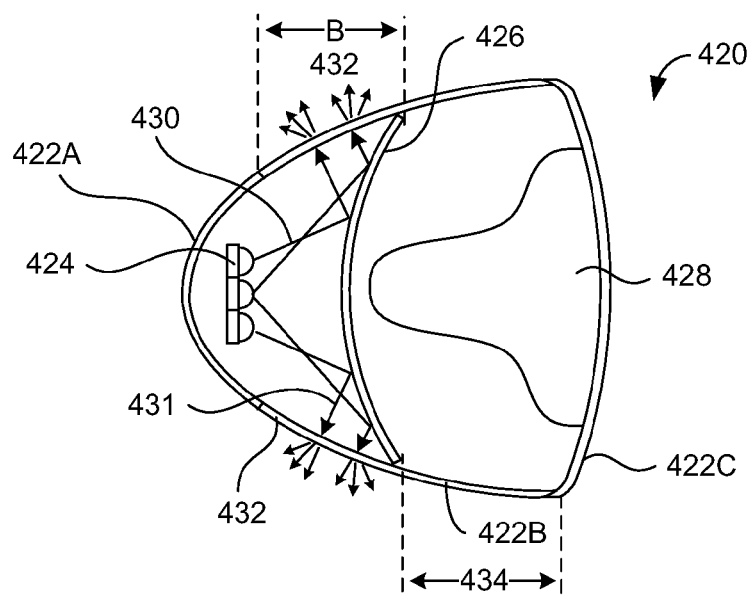
FIG. 27 is a top view of a computer having a light reflecting system, in accordance with one embodiment of the present invention.

FIG. 27 is a top view, in cross section, of a computer system 420, in accordance with one embodiment of the present invention. By way of example, the computer system 420 may generally correspond to any of the computer systems described above. As shown, the computer system 420 includes a housing 422 and a light source 424 disposed therein. In the illustrated embodiment, the housing 422 consists of three parts: end cap 422A, a body 422B and a front face 422C. The end cap 422A closes off one side of the body 422B and the front face 422C closes off another side of the body 422B. Any suitable arrangement of light passing and light blocking walls may be used. In the illustrated embodiment, the end cap 422A and front face 422C are typically formed from a light blocking material while the body 422B is formed from a material that allows the passage of light (e.g., translucent or semi-translucent material). The computer system 420 also includes a reflector 426. The reflector 426 is positioned between the light source 424 (which is located towards the end cap 422A) and the front face 422C. In the illustrated embodiment, the reflector 426 is positioned in front of a display 428. The reflector 426 is configured to redirect the light 430 generated by the light emitting device 424. As shown, the light 430 from the light emitting device 424 is reflected off the surface of the reflector 426 to a first portion 432 of the body 422B. The first portion is defined by B. The reflected light 431 made incident on the inner surface of the body 422B is subsequently transmitted through the wall of the body 422B and out the outer surface of the first portion 432 of the body 422B at the portion 432. Thus, light is prevented from passing through a second portion 434 of the body 422B.

Although the principles of FIGS. 24-27 are described singularly, it should be noted that they may be combined in some cases to produce other types of light arrangements. For example, any combination of a light pipe, light guide, light lens and/or a reflector may be used to distribute light within a housing.

Figure 28:
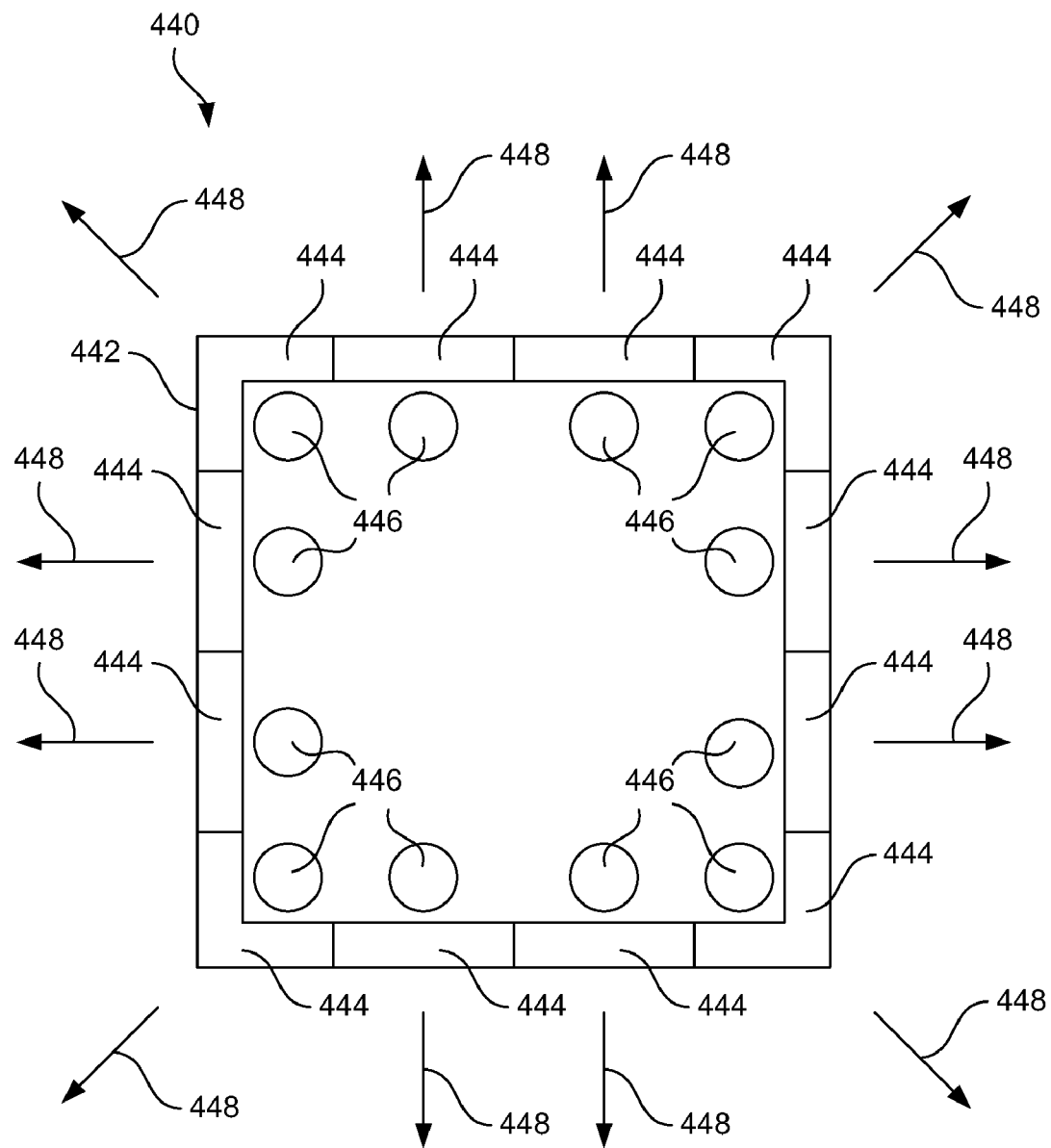
FIG. 28 is a simplified diagram of a chameleonic electronic device, in accordance with one embodiment of the present invention.

FIG. 28 is a simplified diagram of a chameleonic electronic device 440, in accordance with one embodiment of the invention. By way of example, the chameleonic electronic device 440 may generally correspond to the chameleonic electronic device 10 shown in FIG. 1. The chameleonic electronic device 440 generally includes a housing 442 that is divided into several independent and spatially distinct illuminable zones 444. As shown, the zones 444 are positioned around the periphery of the housing 442. The periphery may correspond to any portion of the housing such as the top, bottom, and sides of the housing. Any number of zones may be used. In the illustrated embodiment, the housing 442 includes 12 illuminable zones 444. Each of the zones 444 has an associated light element 446, which is disposed inside the housing 442 proximate the zone 444. As should be appreciated, the associated light element 446 is configured to light up its corresponding zone 444 so as to change the ornamental appearance of the housing. By way of example, the associated light element may be an LED array capable of illuminating the corresponding zone with a plurality of colors (e.g., the LED array may include a red, green and blue LED). As shown, each of the zones 444 is configured to provide a light output 448.

The zones may be configured to produce a variety of ornamental appearances. In one embodiment, the zones are arranged to produce a uniform ornamental appearance. This is generally accomplished by sending the same light command signal to each of the light elements. For example, each of the zones may produce the same green light output so as to produce a uniform green housing. In another embodiment, the zones are arranged to produce a patterned ornamental appearance. This is generally accomplished by sending different light command signals to the light elements. For example, a first set of alternating zones may produce a red light output, and a second set of alternating zones may produce a blue light output in order to produce a housing with stripes. In another embodiment, the zones are arranged to produce a changing ornamental appearance. This is generally accomplished by sending different light command signals to the light elements at different times. For example, each of the zones may be arranged to activate at different times to produce a light sequence such as blinking, fading in and out, strobes or moving from one zone to another.

Figure 29:
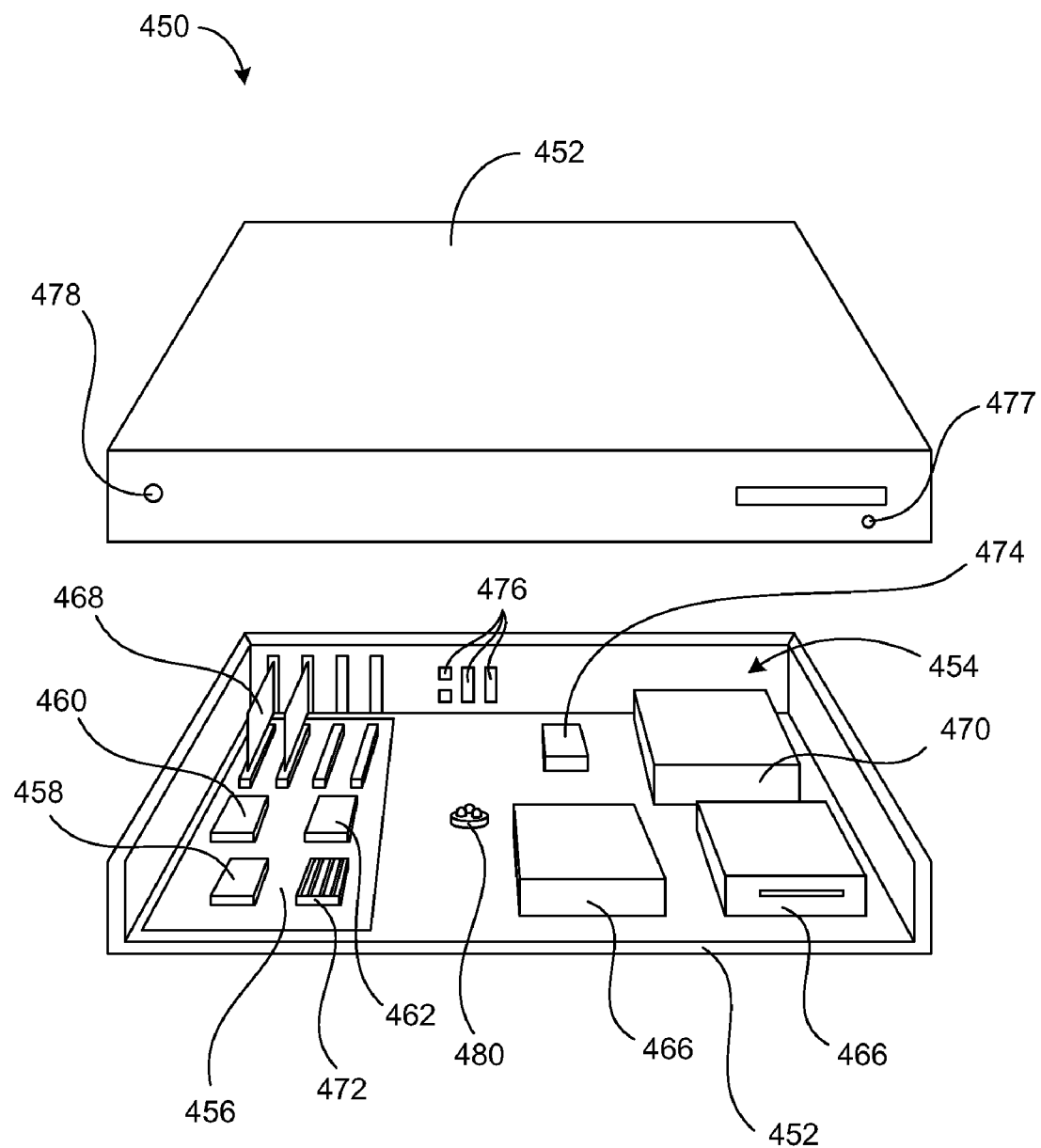
FIG. 29 is a broken away diagram of a general purpose computer, in accordance with one embodiment of the present invention.

FIG. 29 is a broken away diagram of a general purpose computer 450, in accordance with one embodiment of the present invention. The general purpose computer 450 includes a housing 452 which encloses internal components 454 associated with operating the general purpose computer 450. The housing 452, which includes several walls that define the peripheral form of the housing, is broken away between a top and a bottom so as to show the internal components therein. As shown, the internal components 454 may include a motherboard 456 that supports a CPU 458, RAM 460, ROM 462, a hard drive 464, a disk drive 466, expansion slots and boards 468, and the like. The internal components 454 may also include a power supply 470 and other associated circuitry such as heat sinks 472 and fans 474 for cooling the internal components 454. The housing 452 may also include a plurality of ports 476 for connection to peripheral devices located outside the housing 452. In addition, the housing 452 may include an indicator 477 and a power switch 478. In some cases, a monitor may be one of the internal components 454.

The internal components 454 may also include one or more light emitting diodes (LED's) 480. The LED's 480 are generally configured to generate light within the housing 452. By way of example, the LED's 480 may generate light found within the color spectrum. The light is used to colorize or patternize the housing 452. This is generally accomplished by directing the light through illuminable portions of the housing 452. That is, the LED's 480 produce light having a variety or colors and patterns so as to give the illuminable portions of the housing 452 a color or pattern. In one embodiment, the illuminable portions are capable of diffusing the light so that the illuminable portions appear to glow when light is directed therethrough. The LED's 480 may be disposed centrally, peripherally or both so as to allow the light to reach the illuminable portions of the housing 452. For example, although the LED's 480 are centrally located in FIG. 29, the LED's 480 may be disposed closer to the walls of the housing 452 so as to circumvent light blocking components contained within the housing 452. The LED's 480 may be controlled by a separate processor or by the CPU 458 that also controls the operation of the general purpose computer.

The size of the illuminable portion generally constitutes a substantial portion of the entire housing 452. By substantial, it is meant that the area of the illuminable portion is large enough to effect the overall appearance of the general purpose computer 450 when light is passed therein. In essence, the LED's are dedicated to altering the appearance of the housing 452 so that people may break free from the neutral-passive colors and patterns that have dominated the housings of general purpose computers for so long. In one embodiment, the illuminable portion covers the entire housing 452. In another embodiment, the illuminable portion covers one or more walls of the housing 452 (in their entirety). In another embodiment, the illuminable portion covers a part of two or more walls of the housing 452. In another embodiment, the illuminable portion covers a significant part of a wall of the housing 452. In another embodiment, the area of the illuminable portion is substantially larger than any of the switches, connectors or indicators located on the housing 452. These type of devices are typically too small to effect the overall appearance of the general purpose computer. That is, they typically do not cover a significant part of the wall to which they are attached.

Although FIG. 29 is directed at a general purpose computer, it should be appreciated that LED's may be placed in other devices associated with the general purpose computer. For example, LED's may be placed in housings of peripheral devices such as input devices (e.g., mice) or output devices (e.g., speakers) that are connected to the general purpose computer. In the case of input devices, the input devices are arranged to serve its primary function of inputting data while communicating other data via the LED's. In the case of output devices, the output devices are arranged to serve their primary function of outputting data while communicating other data via the LED's. In either case, the LED's may be controlled by the main CPU of the general purpose computer or a separate processor of the general purpose computer.

Figure 30:
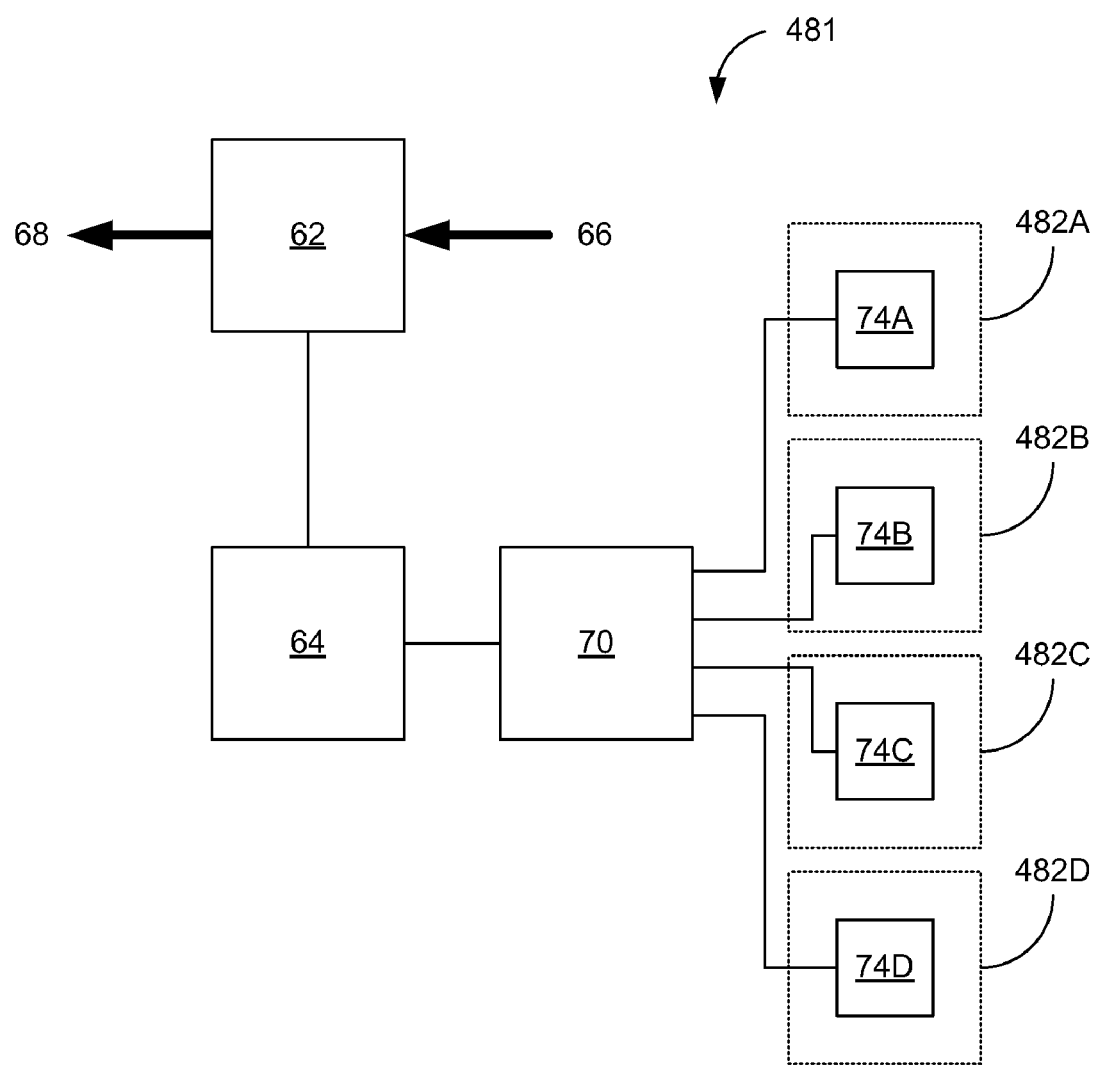
FIG. 30 is a block diagram of a computer system, in accordance with one embodiment of the present invention.

FIG. 30 is a block diagram of a computer system 481, in accordance with one embodiment of the present invention. This particular embodiment is similar to the embodiment shown in FIG. 4. For example, the computer system 481 includes a plurality of the light elements 74A-D. In the illustrated embodiment each of the light elements 74A-D has their own individual housing 182A-D. Each of the housings 482A-D includes one or more light passing walls. In one embodiment, each of the housings 482A-D corresponds to different components of the computer system 481. For example, housing 482A may be used to house the base components such as processors, controllers, memory, internal I/O devices and/or the like; housing 482B may be used to house monitor components such as a display screen; housing 482C may be used to house external peripheral I/O devices such as disk drives, printers, mice, keyboards, speakers and the like; and housing 482D may be used to house a docking station in the case of a portable computer.

Figure 31:
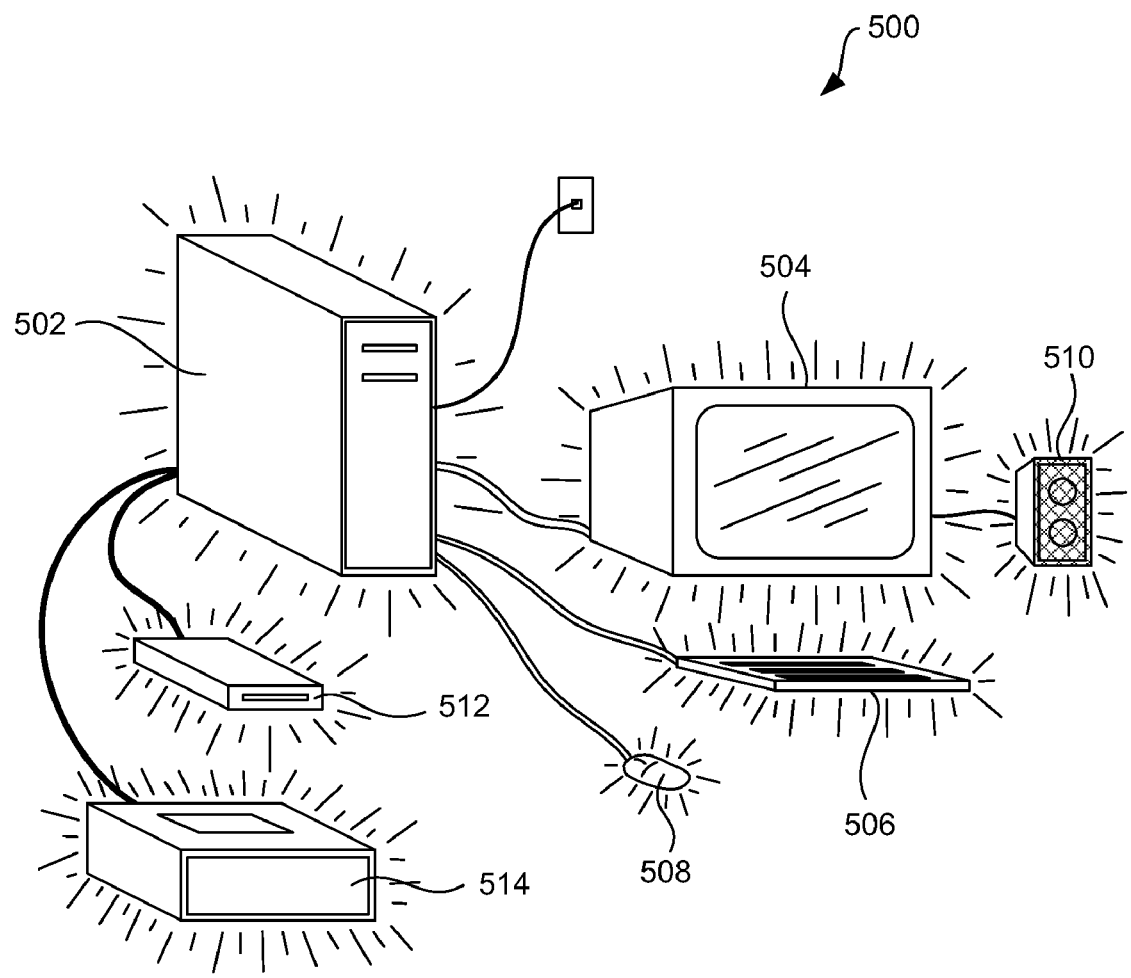
FIG. 31 is a perspective diagram of a computer system, in accordance with another embodiment of the present invention.

FIG. 31 is a perspective diagram of a computer system 500, in accordance with one embodiment of the present invention. By way of example, the computer system 500 may correspond to the computer system described in FIG. 30. The computer system 500 includes a base 502 operatively coupled to a plurality of peripheral devices such as a monitor 504, a keyboard 506, a mouse 508, a speaker 510, an external disk drive 512 and a printer 514. Each of these components is configured with an illuminable housing, i.e., a housing having at least one light passing wall, and a light source disposed therein. As stated throughout this document, the light source is configured to generate light for passing through the light passing wall so as to alter the ornamental appearance of the light passing wall.

A light effect manager, such as the light effect manager 70 illustrated in FIG. 30, can be used to control and coordinate the ornamental appearance of the various illuminable housings. The control and coordination of the ornamental appearance of the various illuminable housings can be achieved in many different ways.

In one embodiment, the light source(s) inside the base and the light source(s) inside the peripheral device are configured to actuate when the base is in communication with or processing tasks associated with the peripheral device. For example, when the base sends a signal to the printer, as for example a signal to print a document, the base and the printer may exude a light effect associated with printing. In addition, when the external disk drive sends data to the base, the external disk drive and base may exude a light effect associated with data retrieval. Moreover, when the base is playing music through the speaker, the base and the speaker may exude a light effect associated with outputting audio. In the case of audio, the light effect may correspond to the frequency of the audio signal so as to produce a light effect that changes with the music or sounds being played. The light effect may be different for different devices. For example, the base may be blue when communicating with the monitor and green when communicating with the printer.

Figure 32:
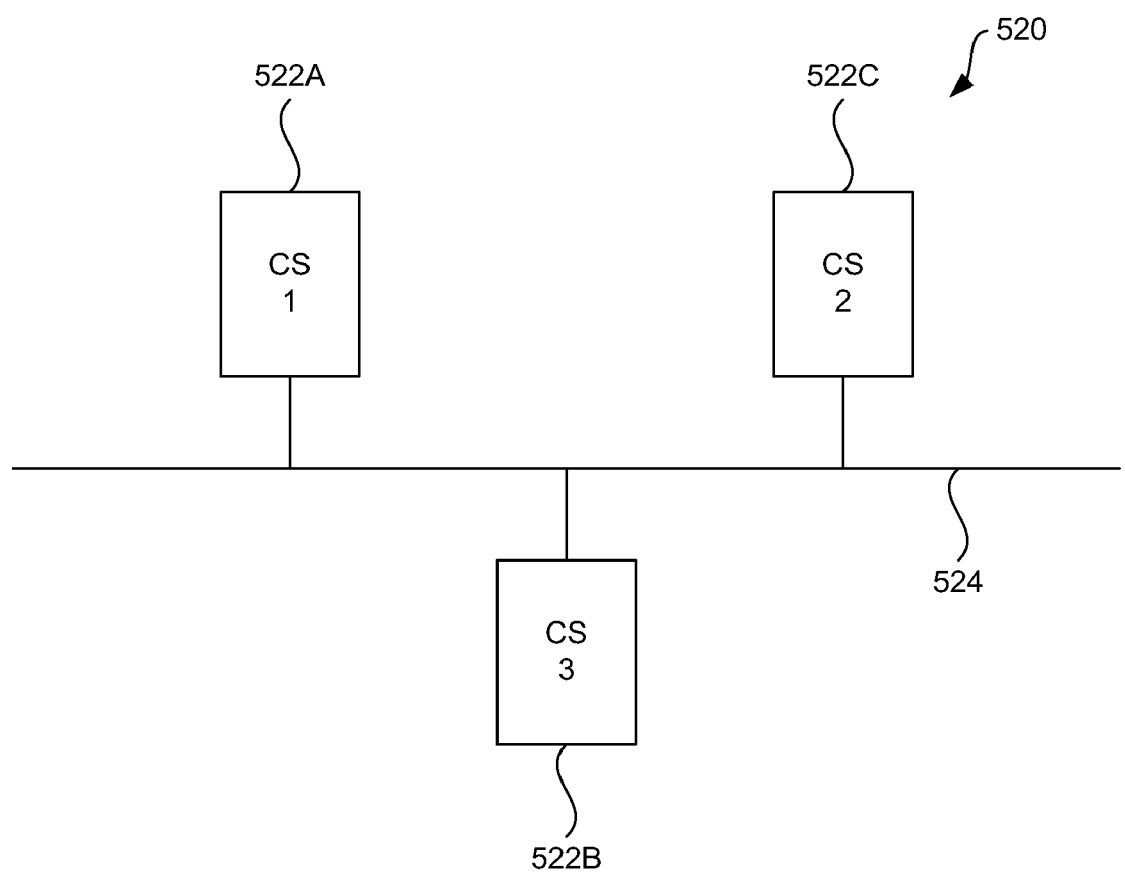
FIG. 32 is a simplified diagram of a computer network, in accordance with one embodiment of the present invention.

FIG. 32 is a simplified diagram of a computer network 520, in accordance with one embodiment of the present invention. The computer network 520 includes a plurality of computer systems 522A-522C which are connected via a network 524. By way of example, the network may represent a Local Area Network (LAN), Wide Area Network (WAN), Internet and the like, or a combination thereof. The network 524 can also be wired or wireless. The computers 522A-522C may, for example, be configured as any of the computers systems discussed above. As should be appreciated, each of the computer systems 522A-522C includes an illuminable housing capable of altering its ornamental appearance via light.

The computer system 522A-522C can individually alter their ornamental appearance. Alternatively, the computer systems 522A-222C can have their ornamental appearance centrally controlled. The central control can be provided by one of the computer systems 522A-522C or another computer. In one embodiment, the light source(s) inside each of the computer systems 522A-522C are configured to actuate when such computer systems 522A-522C are in communication with or processing tasks associated with another of the computer system 522A-522C. For example, when the computer system 522A sends or requests information to or from computer system 522B, both systems may exude a specific light effect. In one implementation, a master light effect manager residing in one of the computer systems 522A-522C provides central control over the ornamental appearance of the computer systems 522A-522C through interaction with slave light effect managers residing in other of the computer systems 522A-522C.

Figure 33:
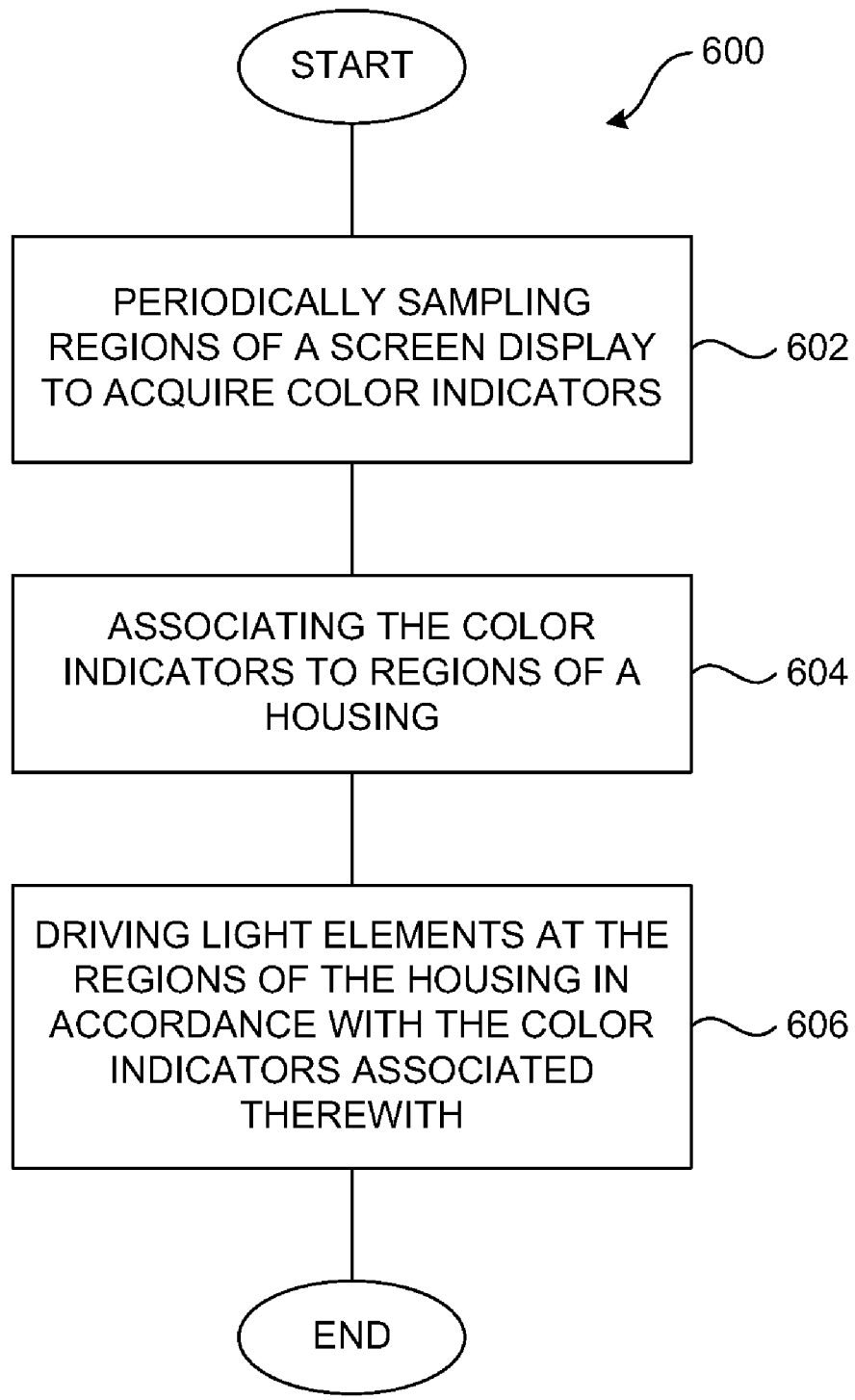
FIG. 33 is a flow diagram of illumination processing, in accordance with one embodiment of the present invention.

FIG. 33 is a flow diagram of illumination processing 600, in accordance with another embodiment of the invention. The illumination processing 600 is, for example, performed by a computing device or system that includes a display screen. The computing device or system that performs the illumination processing 600 can, for example, be the computing device or system shown in FIGS. 4-12.

The illumination processing 600 begins at step 602 by periodically sampling regions of a display screen so as to acquire color indicators for each of the regions. After acquiring the color indicators, the process proceeds to step 604 where the color indicators are associated to zones (regions) of a housing corresponding to the computing device or system. For example, the housing can pertain to the primary housing for enclosing a base computer, a screen display, or a peripheral device. In one embodiment, step 604 pertains to a mapping operation during which the regions of the screen display that were sampled in step 602 are mapped to counterpart zones of the housing.

After associating the color indicators to the zones, the process proceeds to step 606 where light elements are driven in accordance with the color indicators associated therewith. These light elements are located at the zones of the housing. The driven light elements operate to illuminate the zones of the housing. Following step 606, the illumination processing 600 is complete and ends. However, the illumination processing 600 is typically performed constantly or periodically such that the light elements can be driven 606 in accordance with the color indicators acquired from the screen display.

In one embodiment, the illumination processing 600 mimics the colors appearing at the regions of the screen display to zones of the housing. In one example, the regions of the screen display can be associated with a color configuration, and the regions of the housing can be provided with the same configuration. This is generally done to extend the feel of the display screen to the housing. For example, if the regions of the display screen are blue, then the counterpart zones of the housing are also blue. In addition, if different regions of the display screen are different colors, then different zones of the housing are also different colors.

Figure 34:
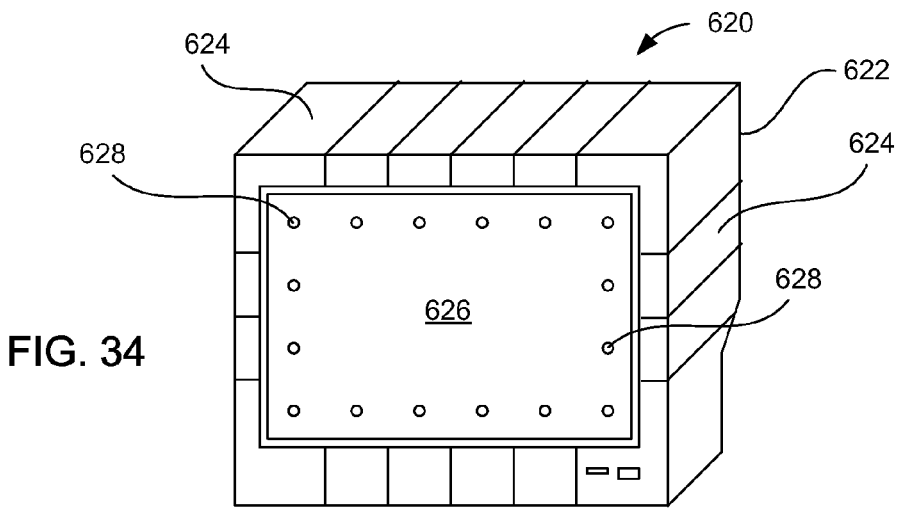
FIG. 34 is a perspective diagram of a monitor, in accordance with one embodiment of the present invention.

FIG. 34 is a perspective diagram of a display monitor 620, in accordance with one embodiment of the present invention. The display monitor 620 includes a housing 622 that is divided into several independent and spatially distinct illuminable zones 624. Any number of zones may be used. In the illustrated embodiment, the housing 622 includes 16 illuminable zones 624. Each of the zones 624 has an associated light element (not shown), which is disposed inside the housing proximate the zone. As should be appreciated, the associated light element is configured to light up its corresponding zone. By way of example, the associated light element may be an LED array capable of illuminating the corresponding zone with a plurality of colors (e.g., the LED array may include a red, green and blue LED). In the illustrated embodiment, the zones 624 are positioned around the periphery of the housing 622, and include portions that are on the front of the monitor 620, as well as portions that are on the side of the monitor 620. It should be noted, however, that this is not a limitation and that the zones may be configured differently relative to the monitor 620. For example, the zones may be positioned in the rear, or only on one side of the monitor 620.

As shown, the housing 622 is configured to structurally support a display screen 626 in its assembled position within the housing 622. The portion of the display screen 626 that is viewed by the user is positioned in the front of the monitor 320 behind an opening in the housing 622 as shown. As previously mentioned, the display screen 626 is configured to present text and graphics to the user. For example, the display screen may present text and graphics associated with application or operating system programs. During illumination processing, as for example illumination processing 600, regions 628 of the display screen 626 are periodically sampled to acquire color indicators. In one embodiment, the color indicators represent the primary color that is being displayed in the region (e.g., several colors may be displayed in a region). For example, if the region is generally seen as blue then the color indicator is blue. The color indicators are used to drive the light elements of the zones 624 as described above. The regions 628 may be any suitable area inside the display screen. In the illustrated embodiment, the regions 628 are disposed about the outer periphery of the display screen 626.

In one embodiment, the regions 628 of the display screen 626 are mapped to counterpart zones 624 of the housing 622. As such, when regions of the display screen change so do the counterpart zones. In the illustrated embodiment, there is a sample region 628 for every zone 624. The sample region 628 may correspond to any suitable zone 624. In the illustrated embodiment, however, individual sample regions correspond to individual zones positioned nearest the location of the individual sample region. For example, sample region 628' corresponds to zone 624'. Accordingly, when sample region 628' changes from a first color to a second color, the counterpart zone 624' changes from the first color to the second color.

Figure 35:
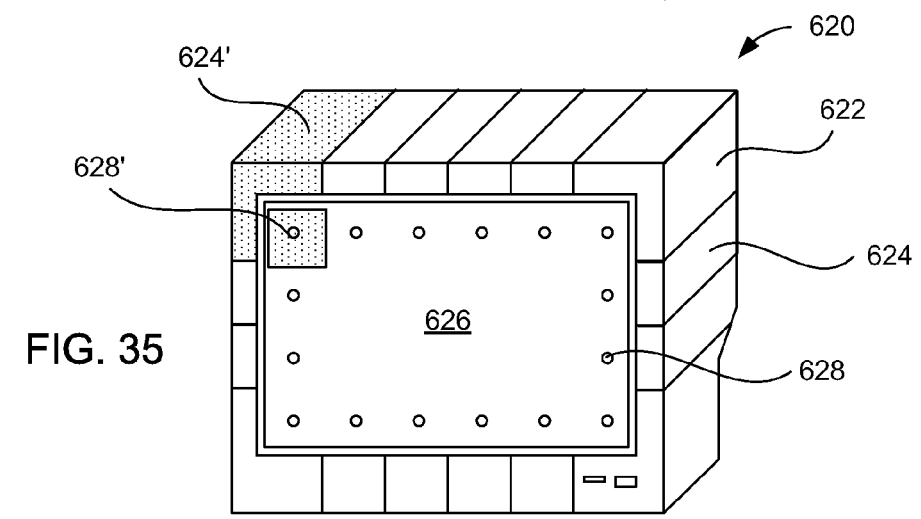
FIG. 35 is a perspective diagram of a monitor, in accordance with one embodiment of the present invention.

In one embodiment, an event monitor such as any one of the event monitors described above is used to sample various locations of the display screen 626. The event monitor alerts a light effect manager when a certain graphic is displayed. As such, the light manager can send a control signal to a light element to dynamically adjust one or more of the zones in accordance with sample. By way of example, and referring to FIG. 35, when the sample region 628' changes, an event monitor sends event information to a light effect manager, and the light effect manager sends a corresponding control signal to the light element housed beneath zone 624' commanding the light element to light up (i.e., the light element illuminates the zone 624' with light), thereby changing the zone 624' along with the sample region 628'. For example, if the sample region 628' changes to blue, then the zone 624' will also change to blue. It should be noted that changing to the same color is not a limitation and that the zone may be configured to change to colors other than the color of the sample region. In one embodiment, the light effect manager is configured to consult an illumination table containing illumination characteristics before sending the control signal to the light source.

Figure 36:
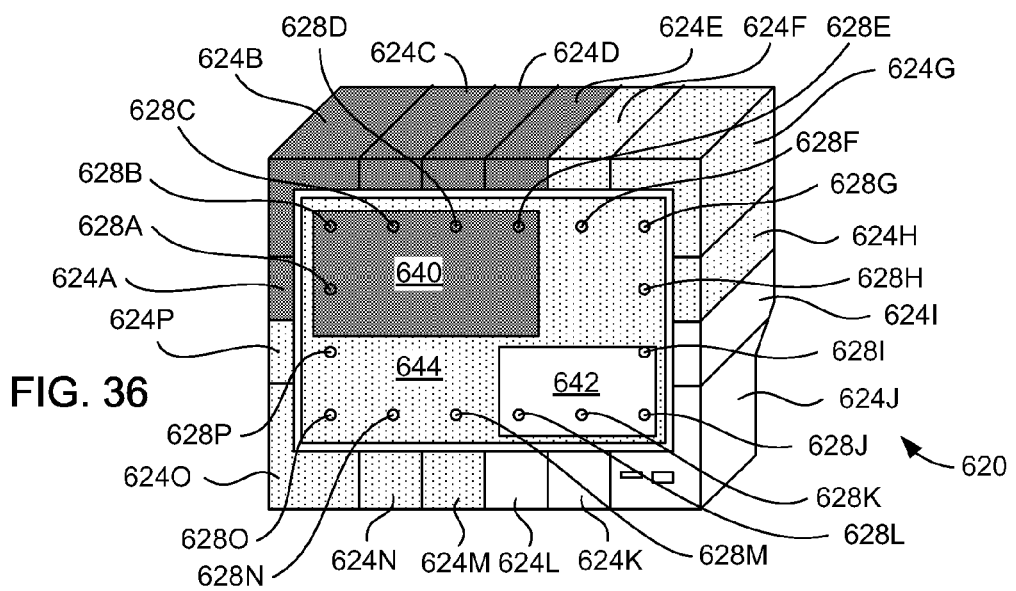
FIG. 36 is a perspective diagram of a monitor, in accordance with one embodiment of the present invention.

By way of another example, FIG. 36 is a perspective diagram of the display monitor 620 presenting a first window 640 and a second window 642 over a wallpaper backdrop 644 on the display screen 626. In this configuration, some of the sampled regions 628 correspond to the colors of the first window 640, some of the sampled regions 628 correspond to the colors of the second window 642 and the remaining sampled regions correspond to the colors of the wallpaper backdrop 644. In the illustrated embodiment, the individual zones 624 associated with the different sampled regions 628 are configured to output a similar color. For example, sampled regions 628A-E and zones 624A-E located near sampled regions 628A-E may output a first color such as green, sampled regions 628I-L and zones 624I-L located near sampled regions 628I-L may output a second color such as white, and sampled regions 628F-G&M-P and zones 624F-G&M-P located near sampled regions 628F-G&M-P may output a third color such as blue.

By way of another example, FIGS. 37A-37F are perspective diagrams of the display monitor 620 of FIG. 36 presenting a video or gaming sequence 650. By way of example, the video may correspond to a movie being played on a DVD drive or a game being played on a CD drive. In the illustrated embodiments, the sequence 650 corresponds to a spaceship 652 that encounters an asteroid 654 in space 656. This is by way of example and not by way of limitation.

FIG. 37A shows a first sequence where the asteroid 654 and spaceship 652 enter the display screen 626 from opposing sides. As such, sampled region 628A includes the asteroid 654, sampled region 628H includes the spaceship 652 and the remaining sampled regions 628B-628G and 628I-628P include space 656 therein. As a result, the associated zone 624A exudes a light effect similar to the asteroid 654, the associated zone 624H exudes a light effect similar to the spaceship 652 and the associated zones 624B-624G and 624I-624P exude a light effect similar to space 656. For example, zone 624A may be brown to correspond to a brown asteroid, zone 624H may be orange to correspond to an orange spaceship, and zones 624B-624G and 624I-624P may be blue to correspond to blue space.

FIG. 37B shows a second sequence where the asteroid 654 and space ship 652 move closer together and away from their respective sides. As such, sample regions 628A-628G and 628I-628P now include space 656 and sample region 628H now includes exhaust 658 from the space ship 652. As a result, zones 624A-624G and 624I-624P now exude a light effect similar to space 656 and the associated zone 624H now exudes a light effect similar to the exhaust 658. By way of example, zones 624A-624G and 624I-624P may be blue to correspond to blue space and zone 624H may be yellow to correspond to the yellow exhaust.

FIGS. 37C and 37D show a third and fourth sequence where the spaceship 652 fires bullets 659 at the asteroid 654 so as to split the asteroid 654 into two smaller asteroids 660 and 662. The third and fourth sequence also show the spaceship 652 continuing to move towards the asteroid 654, and the two smaller asteroids 660, 662 moving away from the spaceship 652 after splitting. As such, all the sample regions 628A-628P now include space 656. As a result, zones 624A-624P now exude a light effect similar to space 656. For example, zones 624A-624P may be blue to correspond to blue space.

FIG. 37E shows a fifth sequence where the spaceship 652 continues to move towards the asteroids 660, 662, and the asteroids 660, 662 continue to move away from the spaceship 652 at an angle. As such, sample region 628O now includes the first asteroid 660, sample region 628B now includes the second asteroid 662, sample region 628A now includes the spaceship 652 and sample regions 628C-628N and 628P now include space 656. As a result, the associated zone 624O exudes a light effect similar to the first asteroid 660, associated zone 624B exudes a light effect similar to the second asteroid 662, the associated zone 624A exudes a light effect similar to the spaceship 652, and the remaining zones 624C-624N and 624P exude a light effect similar to space 656. For example, zones 624O and 624B may be brown to correspond to a brown asteroid, zone 624A may be orange to correspond to an orange spaceship, and zones 624C-624N and 624P may be blue to correspond to blue space.

FIG. 37F shows a sixth sequence where the asteroids 660, 662 and the spaceship 652 have exited the side of the display screen 626. As such, sample region 628A now includes the exhaust 658 of the spaceship 652 and sample regions 628B-628P now include space 656. As a result, the associated zone 624A now exudes a light effect similar to the exhaust 658, and the remaining zones 624B-624P exude a light effect similar to space 656. For example, zone 624A may be yellow to correspond to yellow exhaust, and zones 624B-624P may be blue to correspond to blue space.

Figure 38A:
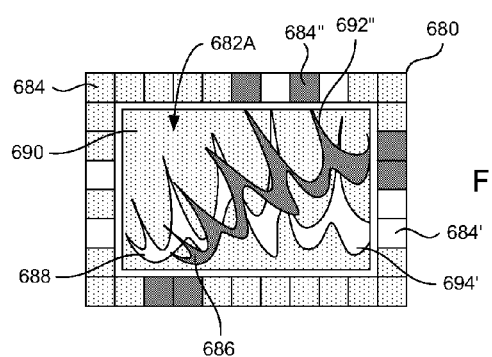
FIGS. 38A-38B are simplified diagrams of a monitor presenting a sequence, in accordance with one embodiment of the present invention.
Figure 38B:
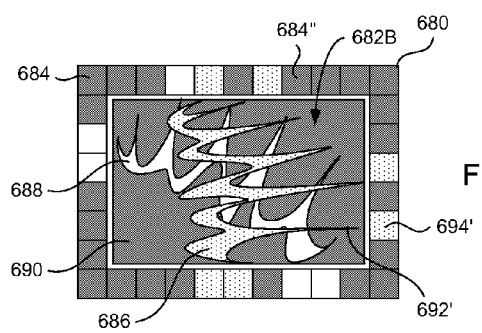

By way of another example, FIGS. 38A and 38B are simplified diagrams of a display monitor 680 presenting two segments 682A and 682B of a programmed sequence 682. Display monitor 680 is similar to display monitor 620 of FIG. 36, and as such, the display monitor 680 includes a plurality of illuminable zones 684. In the illustrated embodiment, the programmed sequence 682 corresponds to a computer program that allows users of the computer system to visualize their music. The computer program is arranged to display a stunning light show (e.g., different colors or patterns) on the display screen of the display monitor 680 that changes, throbs, and pulses to the beat of the user's music. For example, the computer program may adjust its color and patterns relative to the frequency of the music being played in the computer system. The music may be imported from a CD or DVD player, MP3 player, internet, or it may be stored in the computer system itself. By way of example, the computer program may correspond to the computer program iTunes produced by Apple Computer of Cupertino, Calif.

The programmed sequence 682 may take on many forms. In the illustrated embodiment, the programmed sequence 682 is a multicolored graphical display that includes a plurality of patterns 686 and 688 that move through a wall paper back drop 690. The plurality of patterns 686 and 688 may follow a random or predetermined route. FIG. 38A illustrates the patterns 686 and 688 in a first position, and FIG. 68B illustrates the patterns 686 and 688 in a second position along the route. These positions may or may not be consecutive. In this embodiment, the plurality of patterns 686 and 688 represent frequency distributions having peaks 692 and troughs 694. The patterns 686 and 688 may adjust their configuration as they move through the wall paper backdrop 690. For example, the peaks and troughs 692 and 694 may change their period and amplitude or they may change their color (e.g., 686). The frequency distributions may be based on the frequencies of the music being played on the computer system or they may be predetermined.

Similarly to FIGS. 34-37, regions of the display screen are mapped to counterpart illuminable zones 684. As such, when regions of the display screen change so do the counterpart zones. As mentioned, there is generally a sample region for every illuminable zone 684. The sample region may correspond to any suitable zone 684, however, they typically correspond to individual zones positioned nearest the location of the individual sample region. As shown in FIGS. 38A and 38B, the peaks and troughs 692 and 694 move into and exit different regions of the display screen as they change their configuration and position. As such, the illuminable zones 684 are continuously changing so as to produce a light effect that corresponds to the changing regions. For example, in FIG. 38A, the configuration (e.g. color, intensity) of the illuminable zone 684' corresponds to the configuration (e.g. color, intensity) of the trough 694' of pattern 688, and in FIG. 38B, the configuration (e.g. color, intensity) of the illuminable zone 684' corresponds to the configuration (e.g. color, intensity) of a peak 692' of the pattern 686. In addition, in FIG. 38A, the configuration of the illuminable zone 684" corresponds to the configuration of a peak 692" of the pattern 686, and in FIG. 38B, the configuration of the illuminable zone 684" corresponds to the configuration of the wall paper backdrop 690.

Figure 39A:
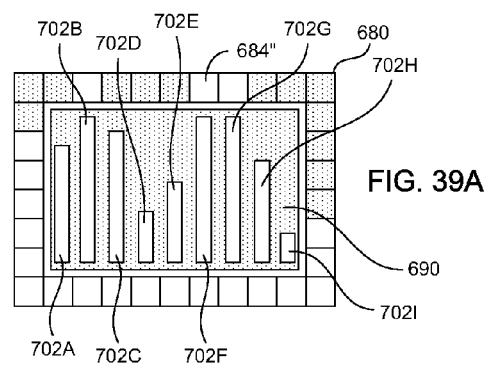
FIGS. 39A-39B are simplified diagrams of a monitor presenting a sequence, in accordance with one embodiment of the present invention.
Figure 39B:
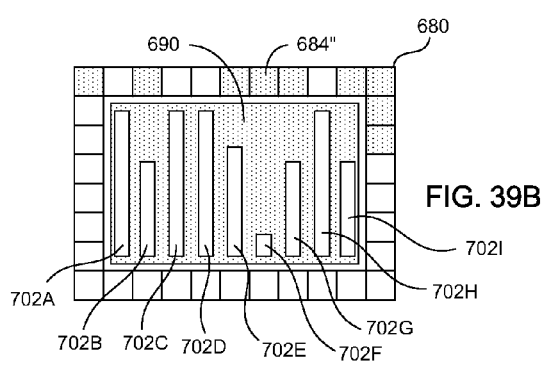

By way of another example, FIGS. 39A and 39B are simplified diagrams of the display monitor 680 presenting two segments 700A and 700B of a programmed sequence 700. Like the programmed sequence 682, the programmed sequence 400 corresponds to a computer program that allows users of the computer system to visualize their music. The programmed sequence 700 may take on many forms. In the illustrated embodiment, the programmed sequence 700 is a graphical display that includes a plurality of pulsating distributions 702A-I that move through a wall paper back drop 704. The pulsating distributions 702A-I are generally configured to act like an equalizer and thus they change (move up and down) in accordance with the frequency of the music being played in the computer system. FIG. 39A illustrates the pulsating distributions 702A-I in a first position, and FIG. 39B illustrates the pulsating distributions 702A-I in a second position.

Similarly to FIGS. 34-38, regions of the display screen are mapped to counterpart illuminable zones 684. As such, when regions of the display screen change so do the counterpart zones. As mentioned, there is generally a sample region for every illuminable zone 684. The sample region may correspond to any suitable zone 684, however, they typically correspond to individual zones positioned nearest the location of the individual sample region. As shown in FIGS. 39A and 39B, the pulsating distributions 702A-I move into and exit different regions of the display screen as they change their configuration and position. As such, the illuminable zones 684 are continuously changing so as to produce a light effect that corresponds to the changing regions. For example, in FIG. 39A, the configuration (e.g. color, intensity) of the illuminable zone 684" corresponds to the configuration (e.g. color, intensity) of the pulsating distribution 702F, and in FIG. 39B, the configuration (e.g. color, intensity) of the illuminable zone 684" corresponds to the configuration (e.g. color, intensity) of the wall paper backdrop 690.

It should be noted that a methodology similar to methodology shown in FIGS. 38 and 39 may also be used to change the zones in accordance with the music itself rather than with the visual output of the display screen.

Although the description thus far has been primarily directed at illuminating larger portions of a housing, in some cases, it may only be desirable to illuminate a small portion of the housing. This may be useful for indicators that indicate events associated with the system in which they are used. By way of example, the events may relate to signals, conditions or status of the system.

Figure 40:
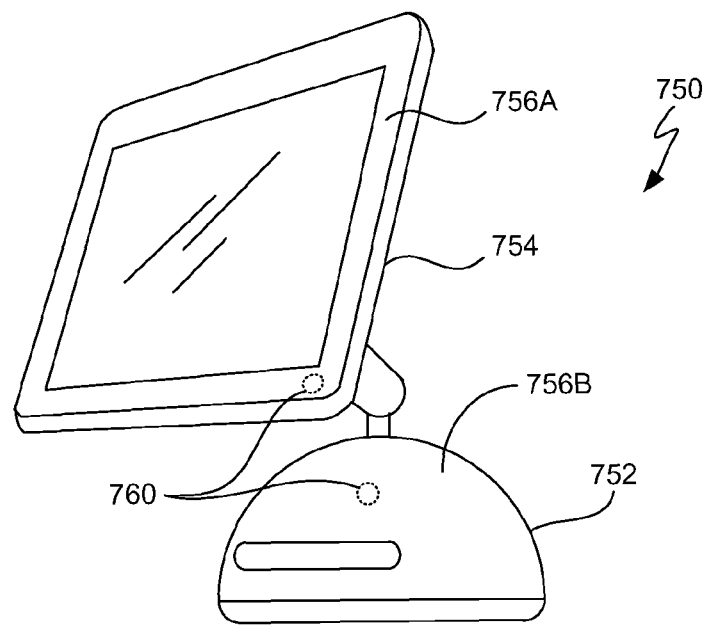
FIG. 40 shows a computer system including a base and a monitor, in accordance with one embodiment of the present invention.

FIG. 40 shows a computer system 750 including a base 752 and a monitor 754, in accordance with one embodiment of the present invention. The base 752 and monitor 754 may be separate components or they may be integrated into a single component. In the illustrated embodiment, the base 752 and monitor 754 are separate components, i.e., they each have their own housing. The monitor 754 includes a monitor housing 756A and the base 752 includes a base housing 756B. Both housings 756A and B are configured to enclose various internal components associated with operation of the respective devices. In general, the housings 756 serve to surround their internal components at a peripheral region thereof so as to cover and protect their internal components from adverse conditions. By way of example, the monitor housing 756A may enclose internally a display and related display components and the base housing 756B may enclose internally various electrical components (including integrated circuit chips and other circuitry) to provide computing operations for the computer system 750.

In order to alert a user to a particular status of the computer system 750, each of the components (base, monitor) may include an indicator 760. For example, each of the components may include a power/sleep indicator that alerts a user as to when the components are on/off or in a sleep mode. The indicators 760 are typically illuminated when the component is on, and not illuminated when the component is off. Furthermore, the indicator may turn on and off or cycle with increasing or decreasing intensity (ebb) when in sleep mode.

Indicators have been used in computer systems 750 for a long time. Unlike conventional indicators, however, the indicators 760 shown in FIG. 40 use the principles described in the previous embodiments. Mainly, that a light source disposed inside the housing 756 is configured to illuminate a portion of the housing 756 thereby causing the housing 756 to change its appearance, i.e., change its color. By way of example, a change in color may indicate a change in status of the system.

Figures 41A, 41B:
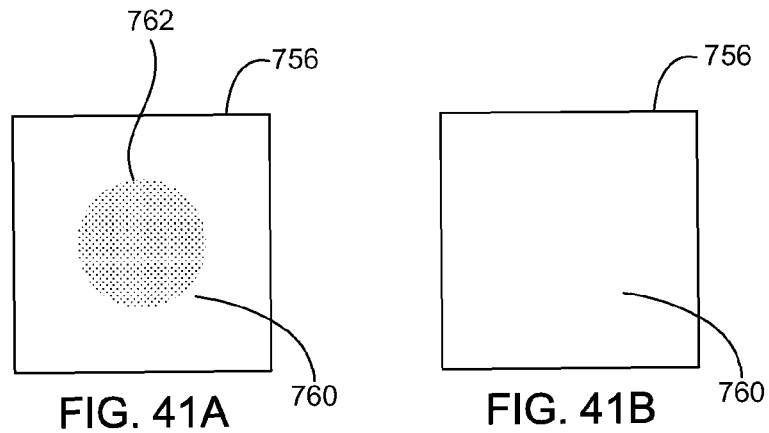
FIGS. 41A and 41B illustrate an indicator image as it appears on the surface of the housing when the indicator is on, and as it disappears from the surface of the housing when the indicator is off, in accordance with one embodiment of the present invention.

As shown in FIGS. 41A and 41B, the indicator image 762 appears on the surface of the housing 756 when the indicator is on, and it disappears from the surface of the housing 756 when the indicator is off. One advantage of this type of indicator is that there is no trace of the indicator 760 when the indicator 760 is off. The indicator 760 only exists when the indicator 760 is turned on. Furthermore, the indicator 760 avoids substantial breaks, lines, pits, protrusions in the surface of the housing 756, which are aesthetically unpleasing and degrade the look of the computer system. In conventional indicators, the indicator always exists at the surface of the housing. As should be appreciated, conventional indicators typically include a small clear plastic insert, which is located in front of an LED, and which is inserted within an opening in the housing thus causing it to protrude outside the housing. Substantial breaks also exist at the interface between the insert and housing thereby making it visually unappealing. Alternatively, the LED itself may be placed in the opening in the housing. This, however, also typically protrudes from the housing and may also include substantial gaps.

Figure 42:
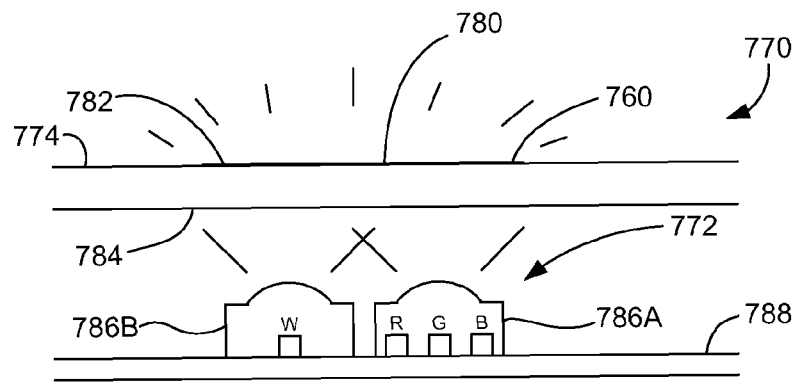
FIG. 42 is a diagram of an indicator, in accordance with one embodiment of the present invention.

FIG. 42 is a diagram of an indicator 770, in accordance with one embodiment of the present invention. The indicator 770 may for example be used in a computer system such as the one described in FIG. 40 or another type of electronic device. As shown in FIG. 42, the indicator 770 includes a light source 772 that is placed behind a housing 774. At least some portion of the housing 774 in close proximity to the light source 772 is illuminable, i.e., can be lit up. Generally speaking, an indicator image such as that shown in FIG. 41 is formed at the outer surface 782 of the illuminable portion 776, and may even glow, when light is made incident on the inner surface 784 of illuminable portion 776 via the light source 772.

The light source 772 may be widely varied, however, in most cases it includes an LED or group of LEDs. By way of example, the light source 772 may include red, blue, green and/or white LEDs. In the illustrated embodiment, the light source 772 includes a pair of surface mount LEDs 786A and 786B that are in close proximity to one another and that are attached to a printed circuit board 788. The surface mount LED 786A includes red, green and blue LEDs, and the surface mount LED 786B includes a white LED. The red, green, blue and white LEDs work together to produce the different colors of the color spectrum (e.g., mixing). This particular arrangement allows a computer system to change the color of the indicator according to specific tasks being performed in the computer system. In some cases, a UV-LED may be used.

The illuminable portion 776, which may include one or more layers, is typically formed from a light passing material(s) that is translucent or semi-translucent. The translucency of the illuminable portion 776 is configured to allow the passage of light therethrough while preventing the user from clearly seeing or distinguishing objects through it as for example the light source 772. That is, the illuminable portion 776 transmits light while causing sufficient diffusion to prevent perception of distinct objects located behind it. The illuminable portion 776 may, for example, include a light diffusing means located either internal or external to the illuminable portion 776 (see FIGS. 17A-17C). In one implementation, the illuminable portion 776 is a thin section of a white plastic housing.

In one particular embodiment, the illuminable portion 776 of the housing 774 is formed from multiple layers. For example, the housing 774 may include a transparent outer layer that forms an outer peripheral portion of the housing 774 and a translucent inner layer that forms an inner peripheral portion of the housing 774. These layers can be located at various locations relative to one another, however, in most cases they are placed against one another and may even be molded or attached to one another thereby forming a single unit. The translucent inner layer is configured to mask out the undesirable internal components located within the housing 774 while providing a uniform, clean look for the housing 774 when viewed from the outer surface 782 of the housing 774 as for example through the transparent outer layer. The translucent inner layer is also configured to transmit light therethrough in order to be illuminable. This arrangement offers an appealing aesthetic look without being hampered by components internal to the housing 774.

The inner layer can be formed from a variety of translucent or semi translucent materials and can be any of a variety of different colors or multiple colors. The outer layer, on the other hand, can be formed from a variety of clear materials such as clear plastic or glass. In one implementation, the outer layer is a thin sheet of clear plastic and the inner layer is a thin sheet of white plastic. As should be appreciated, the white surface provides the superior medium for producing different colors on the housing 774 via the light source 772.

Although the light source 772 may be capable of producing shaped images, other means may be necessary to produce an indicator image with a desired shape. In cases such as these, the indicator 770 may include a masking element that blocks light from passing through some areas of the illuminable housing 774 while allowing light to pass through other areas of the illuminable housing 774. The masking element generally includes an opening corresponding to the image to be illuminated. The light passing through the opening is projected onto the illuminable housing 774 thereby forming an image on the illuminable housing 774. The indicator image is typically provided in the illuminable housing 774 in the vicinity of the opening. The light passing through the opening passes through the illuminable housing 774 to produce an illuminated image at an outer surface of the illuminable housing 774. The shape of the image formed on the illuminable housing 774 typically corresponds to the shape of the opening. The shape of the opening and thus the image may be widely varied. For example, it may be a simple shape such a circle, rectangle, square, triangle, etc. or it may be a more complex shape such as an icon, logo, etc.

Figure 43:
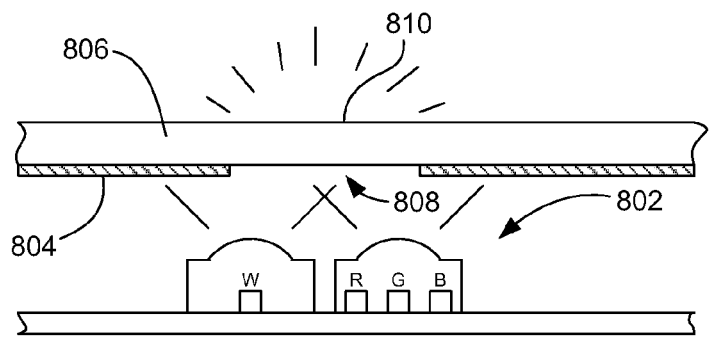
FIG. 43 is a diagram of a housing indicator system, in accordance with one embodiment of the present invention.

FIG. 43 is a diagram of a housing indicator system 800, in accordance with one embodiment of the present invention. The housing indicator system 800 includes a light source 802, a mask 804 and an illuminable housing portion 806. The light source 802 is capable or producing very bright illumination. The illuminable housing portion 806, which may be the entire housing or some smaller component, is configured to be translucent such that it transmits light without permitting objects disposed behind it to be distinctly seen, i.e., allows light to pass through diffusely (partially transparent). The mask 804, on the other hand, blocks the light from illuminating all but the part of the illuminable housing portion 806 that is desired to be illuminated. The mask 804 generally includes an opening 808 having a shape that corresponds to the image desired to be created. During operation, the image is created when light is projected through the opening 808, i.e., the image is transferred to the outer surface 810 of the illuminable housing portion 806 where it can be seen by a user.

Figure 44:
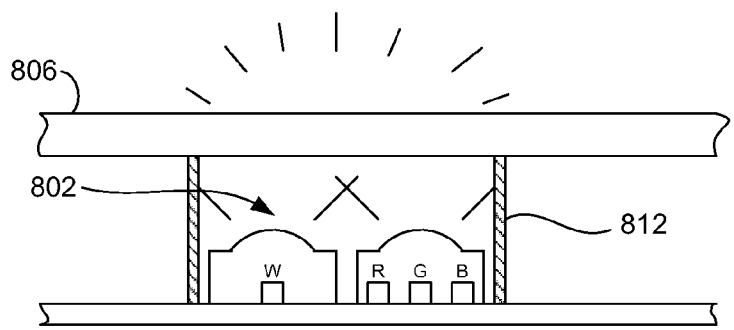
FIG. 44 is a diagram of a housing indicator system, in accordance with one embodiment of the present invention.
Figure 45:
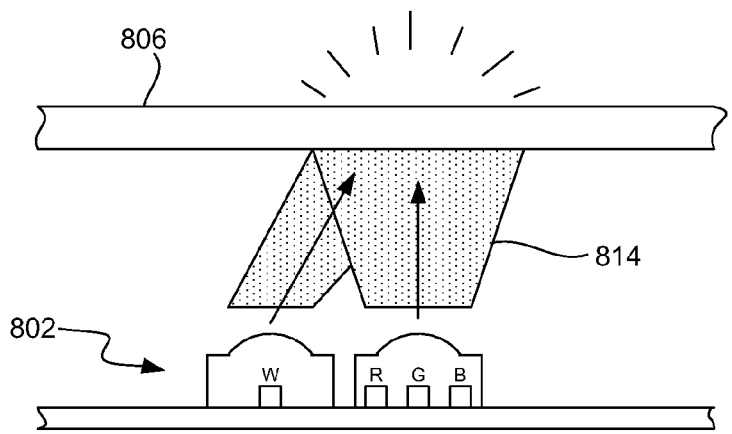
FIG. 45 is a diagram of a housing indicator system, in accordance with one embodiment of the present invention.

While a mask 804 has been generally shown and discussed it should be noted that other masking elements may be used. For example, the masking element may come in the form of a light guide or light pipe that can form an image by directing light to a specific area. The light guide and pipe may further help guide light from one area to another such as when the light source is at a remote location. By way of example, FIG. 44 shows a light guide 812 forming an image on the illuminable housing portion 806 via the light source 802 (see also FIG. 25) and FIG. 45 shows a light pipe 814 forming an image on the illuminable housing portion 806 via the light source 802 (see also FIG. 24).

Figure 46:
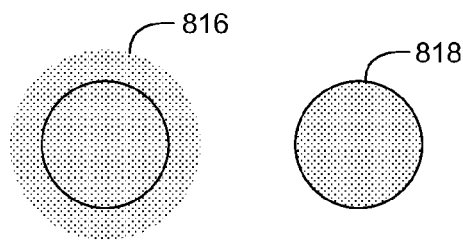
FIG. 46 shows a fuzzy indicator image and a crisp indicator image, in accordance with embodiments of the present invention.

It may be further desirable to produce sharp indicator images that do not have blurred edges. As should be appreciated, light may bleed through the illuminable housing portion 806 thereby causing a distorted image, especially at the edges of the image. By way of example, FIG. 46 shows a fuzzy indicator image 816 and a crisp indicator image 818. Several embodiments for making sharp images as shown in FIG. 46 will now be described.

FIG. 47 is a diagram of a housing indicator system 820, in accordance with one embodiment of the present invention. The housing indicator system 820 includes a housing 822 and a light source 824 disposed behind the housing 822. The light source 772 may be placed adjacent the inner surface of the housing 822 or it may be spaced away. The light source 824 may, for example, include one or more LEDs such as a RGB LED and a white LED. The housing 822 includes at least an inner bezel 826 having a light receiving recess 828 that forms a reduced thickness portion 830 in the inner bezel 826. The reduced thickness portion 830 is configured to be translucent while the thicker portions 832 of the inner bezel 826 are configured to be opaque. The thicker portion 832 of the bezel 826 acts like a mask, which prevents light from passing through areas of the bezel 826 (other than the recess 828). The walls 834 of the recess 828 act like a light guide, which helps guide light from the light source 824 to the reduced thickness portion 830. Because the reduced thickness portion 830 is translucent, it can be illuminated when light is introduced into the recess 828 via the light source 824. Furthermore, the shape of the recess 828 produces an indicator image of similar shape on the outer surface 834 of the inner bezel 826. For example, if the recess is formed as a cylinder then the indicator image will be a circle such as that shown in FIG. 41A.

The thickness of the reduced thickness portion 830 can be adjusted to effect the intensity of the illumination provided. For example, the thickness can be made larger to reduce its translucency (thus making the intensity of the illumination at the outer surface smaller) or it can be decreased to increase its translucency (thus making the intensity of the illumination at the outer surface greater). The thickness of the reduced thickness portion can also be adjusted to effect what can be seen therethrough, i.e., if it is too thin a user may be able to see the light source disposed behind it. In most cases, the thickness is designed to produce the greatest amount of illumination while still preventing objects disposed behind it from being distinctly seen.

In one embodiment, the inner bezel 826 is formed from a white material so that it acts like a canvas to the light colors created by the light source 824. For example, if the light source 824 produces red light then the reduced thickness portion 830 turns red. The housing 822 may additionally include a clear outer bezel 836. The clear outer bezel 836 cooperates with the inner bezel 826 to form the housing 822.

FIG. 48 is a diagram of a housing indicator system 840, in accordance with one embodiment of the present invention. Like the housing indicator system shown in FIG. 47, the housing indicator system 840 shown herein includes a recess 828 having reduced thickness portion 830. However, unlike the housing indicator system of FIG. 47, the housing indicator system 840 includes an illuminable plug 842 that is inserted or formed into the recess 828. The illuminable plug 842 operates as a light guide/pipe for directing the light from the light source 824 to the reduced thickness portion 830. The illuminable plug 842 may for example be formed from a clear or translucent material. In the case of UV LEDs, the illuminable plug 842 may additionally include UV brighteners.

The illuminable plug 842 generally includes a light receiving area 844 for collecting light and an illuminating area 846 for emitting light. The illuminable plug 842 directs light from the light source 824 through the light plug 842 from the light receiving area 844 to the illuminating area 846. The illuminating area 846 is adjacent the reduced thickness portion 830 so that light emanating from the illuminating area 846 travels to the inner surface of the reduced thickness portion 830 and subsequently through the reduced thickness portion 830 thereby illuminating the reduced thickness portion 830 at its outer surface 834.

The illuminable plug 842 may include a protruding member 848, which extends away from the inner bezel 826 when the illuminable plug 842 is positioned in the recess 828. The protruding member 848 may include a void or recess 850. The light source 824 may be positioned, at least in part, in the void 850 so that the light plug 842 captures a larger portion of the light being generated therefrom, i.e., the protrusion surrounds the light source 824. The shape of the light plug 842 coincides with the shape of the recess 828.

FIG. 49 is a diagram of a housing indicator system 860, in accordance with one embodiment of the present invention. Like the housing indicator system shown in FIGS. 47 and 48, the housing indicator system 860 includes a recess 828 having reduced thickness portion 830 and an illuminable plug 862 that is inserted or formed into the recess 828. Unlike the illuminable plug shown in FIG. 48, however, the illuminable plug 862 includes a light barrier 864 at its peripheral surface. The light barrier 864 is configured to prevent light from emanating out of the sides of the illuminable plug 862. For example, the light barrier 864 may be formed from an opaque material.

In one particular embodiment, the illuminable plug 862 is formed by a transmissive portion 866 at its interior and a reflective portion 868 at its exterior. Because the exterior of the illuminable plug 862 is reflective, the light reflects off the sides of the illuminable plug 862 as it travels from the light receiving area 844 to the illuminating area 846. The reflective portion 868 also prevents light from bleeding through the side walls of the recess 828. When light is made incident on the light receiving area 844, the light is transmitted to the illuminating area 846 where it emits the light onto the reduced thickness portion 830.

Although generally described as a continuous piece of the inner bezel, the illuminable portion could also be provided by a separate piece of translucent material (e.g., plug or insert) that is inserted and affixed within an opening or hole in a translucent or non-translucent inner bezel. Like the inner bezel, the translucent material can be any of a variety of different colors or multiple colors although in most cases it would correspond to the color of the inner bezel in order to simulate a continuous piece. By continuous piece, it is generally meant that the surface of the inner bezel does not include substantial breaks, lines, pits, that tend to make the housing aesthetically unpleasing and degrade the overall look of the computer system.

Figure 50:
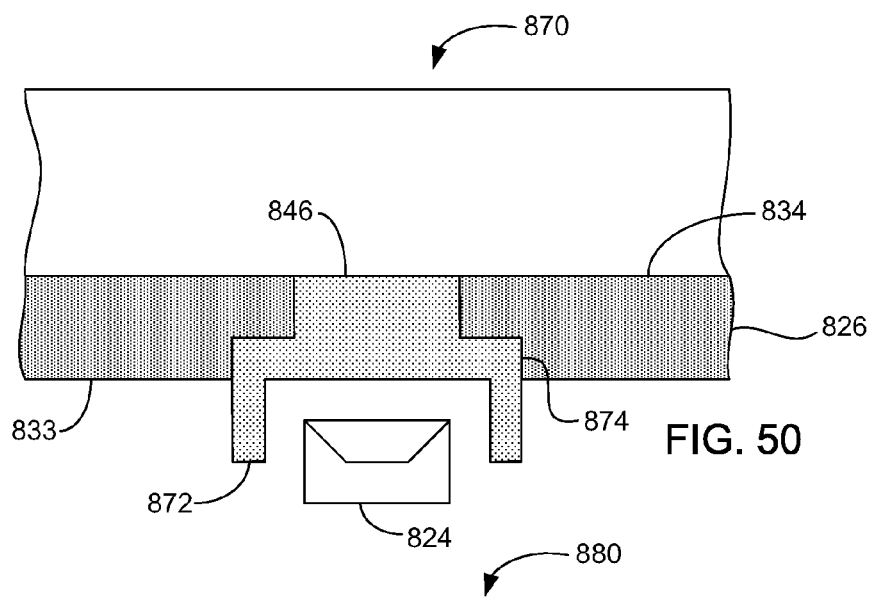
FIG. 50 is a diagram of a housing indicator system, in accordance with one embodiment of the present invention.

FIG. 50 is a diagram of a housing indicator system 870, in accordance with one embodiment of the present invention. In this embodiment, the system 870 includes an illuminable plug 872 similar to FIG. 48, however, unlike FIG. 48, the inner bezel 826 includes an opening 874 rather then a recess. The opening 874 forms a through hole from the inner surface 833 of the inner bezel 826 to the outer surface 834 of the inner bezel 826. The illuminable plug 872 is disposed inside the opening 874. The illuminating area 846 of the light plug 872 becomes the illuminable area of the housing 822. In most cases, the illuminating area 846 of the light plug 842 is flush with the outer surface of the inner bezel 826 to produce a uniform and continuous appearance. The shape of the light plug 842 coincides with the shape of the opening 874. In this manner, there are substantially no gaps between the side of the light plug 842 and the inside surface of the opening 874. In some cases, the inner bezel is molded around the illuminable plug in order to eliminate any gaps there between. In essence the two pieces are fused together.

Figure 51:
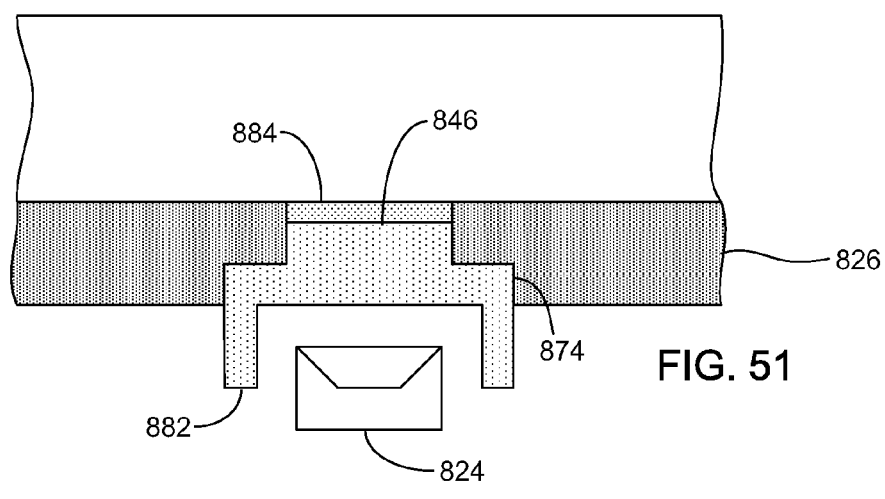
FIG. 51 is a diagram of a housing indicator system, in accordance with one embodiment of the present invention.

FIG. 51 is a diagram of a housing indicator system 880, in accordance with one embodiment of the present invention. In this embodiment, the housing indicator system 880 includes a illuminable plug 882 similar to FIG. 50, however, unlike FIG. 50, the illuminable plug 882 further includes a screen member 884 adjacent the illuminating area 846 of the illuminable plug 882. The screen member 884 acts like the reduced thickness portion 830 described above. Although the screen member 884 can be formed from various colors, it is typically configured to match the color of the inner bezel 826. By doing so, the inner bezel 826 appears as a single continuous part. The two pieces may be formed from similar materials or from dissimilar materials. In one particular implementation, the inner bezel 826 and screen member 884 are formed from the same white plastic material.

Figure 52:
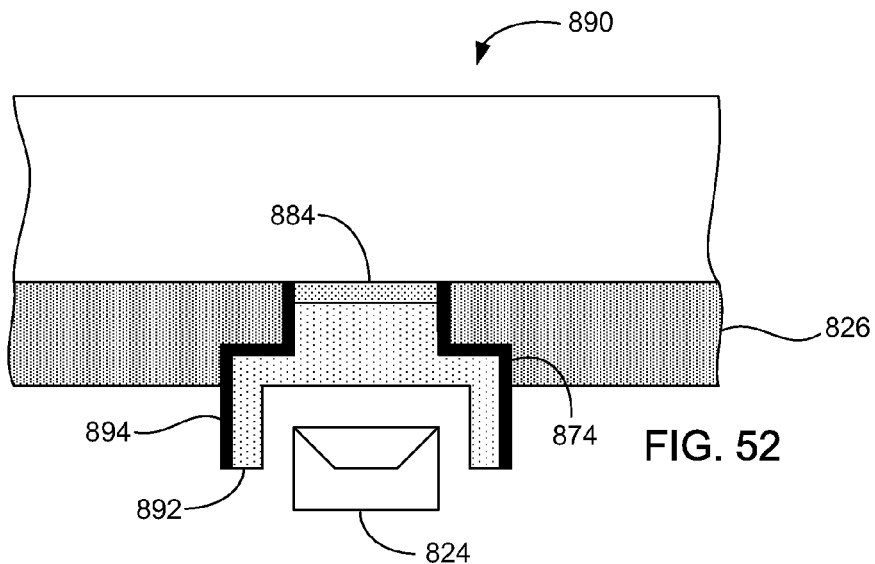
FIG. 52 is a diagram of a housing indicator system, in accordance with one embodiment of the present invention.

FIG. 52 is a diagram of a housing indicator system 890, in accordance with one embodiment of the present invention. In this embodiment, the housing indicator system 890 includes a illuminable plug 892 similar to FIG. 51, however, unlike FIG. 51, the illuminable plug 892 includes a light barrier 894 at its peripheral surface. Similar to the light barrier discussed in FIG. 49, the light barrier 894 is configured to prevent light from emanating out of the sides of the illuminable plug 892 thereby reflecting more of the light through the screen member 884. In this particular implementation, it is generally preferable to use a light barrier 894 with minimal thickness in order to prevent a visible joint at the light plug/bezel interface. As should be appreciated, a substantial thickness may appear as a line at the outer surface of the inner bezel 826 when the light plug 892 is positioned within the opening 874. In some cases, it may be only desirable to extend the light barrier 894 to the inner surface of the screen member 884. In this manner, the screen member 884 can hide any lines created by the light barrier 894.

The methods of manufacturing the arrangements discussed above may be widely varied. By way of example, the bezels may be produced via molding, machining or the like and may be attached using any suitable means (e.g., fasteners, adhesives, molding, etc.). Similar to the bezels, the light plugs may be produced by molding, machining and the like. Furthermore, the light plug may attached to the bezel using any suitable means as for example press fitting, molding, adhesives, etc. Moreover, the light barrier formed on the surface of the light plug may be formed by plating, deposition, painting, etc. In addition, the screen member may formed on the surface of the light plug via molding, adhesives, etc.

Several examples of manufacturing steps will now be discussed. In one implementation, the light plug and inner bezel including the recess or opening are molded separately. After molding, the light plug is press fit into the recess or opening of the bezel. After press fitting, the outer bezel is molded over the inner bezel and light plug. In another implementation, the light plug is molded. After molding the light plug, the inner bezel is molded around the light plug. After molding the inner bezel, the outer bezel is molded over the inner bezel and light plug. In yet another implementation, the light plug is produced by first molding the light plug, thereafter molding the screen member over the light plug, and thereafter plating a light barrier on the outer peripheral surface of the light plug.

Figure 53:
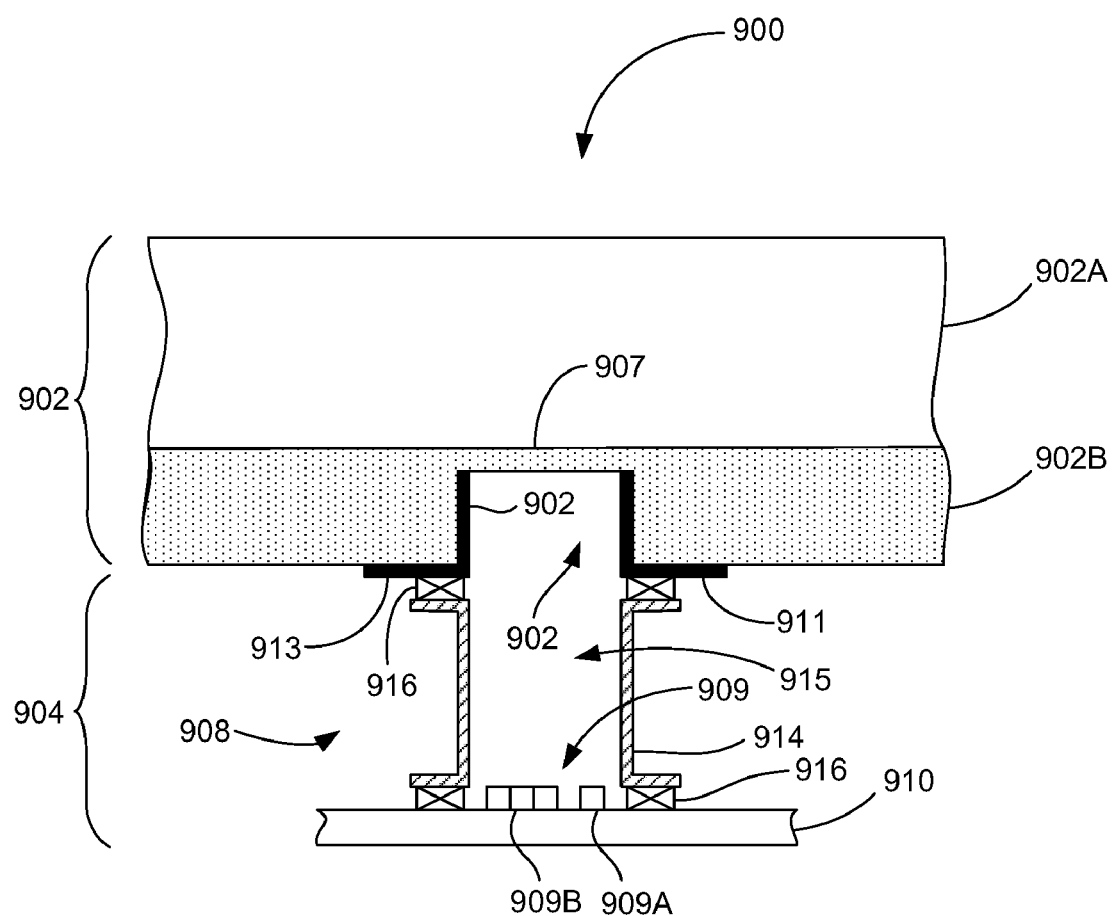
FIG. 53 is a diagram of a housing indicator system, in accordance with one embodiment of the present invention.

FIG. 53 is a diagram of a housing indicator system 900, in accordance with one embodiment of the present invention. The housing indicator system 900 includes a housing 902 and an indicator assembly 904. The housing 902 includes a clear layer 902A and a translucent layer 902B. Both layers are typically formed from plastic materials. The layers 902 may be attached using any suitable means. In the illustrated embodiment, the two layers 902 are molded together. As shown, the translucent layer 902B includes a light receiving recess 906 that forms a reduced thickness portion 907. The reduced thickness portion 907 represents that area of the translucent layer 902B that is illuminated in order to indicate that an event has occurred.

The indicator assembly 904, on the other hand, includes a light directing system 908 and a light source 909. The light source 909 is configured to provide light to the reduced thickness portion 908. The light source 909 may for example include a RGB LED 909A and a white LED 909B, both of which are attached to a printed circuit board 910. The light directing system 908 is configured to direct the light from the light source 909 to the reduced thickness portion 907.

The light directing system 908 includes a light barrier 911 configured to prevent light from entering the translucent layer 902B except at the reduced thickness portion 907. The light barrier 911 in particular covers the sides of the recess 906 and a portion of the inner surface of the translucent layer 902B that surrounds the recess 906. The light barrier 911 may be widely varied. In the illustrated embodiment, the light barrier 911 is a thin metal disk, which is positioned within the recess 906 and over a portion of the translucent layer 902B. More particularly, the thin metal disk includes a tube portion 912 that inserts into the recess 906 and a flange portion 913 that covers an inner surface of the translucent layer 902B. The thin metal disk may for example be press fit into the recess 906.

The light directing system 908 also includes a light guide 914 for directing the light from the light source 909 to the reduced thickness portion 907. The light guide 914 is positioned within the space provided between the translucent layer 902B and the printed circuit board 910. The light guide 914 may be attached to the light barrier 911, translucent layer 902B, light source 909, and/or the printed circuit board 910. The light guide 914 may be widely varied. In the illustrated embodiment, the light guide 914 is a light tube formed from opaque white plastic. The opaque white plastic helps to mix and distribute the light evenly. The light tube generally includes an opening 915 that has a shape and dimension that coincides with the shape and dimension of the recess 906. In order to seal the interfaces, gaskets 916 may be provided between the light tube and the translucent layer 902B and between the tube and the printed circuit board 910. The gaskets 916 help prevent light from escaping out of the light directing system 908 while providing some manufacturing tolerance. The light tube may be attached to the light barrier/translucent layer and/or the light source/printed circuit board using any suitable means. In some cases, the light tube is not directly attached, but rather sandwiched between the printed circuit board 910 and the translucent layer 902B.

Figure 54:
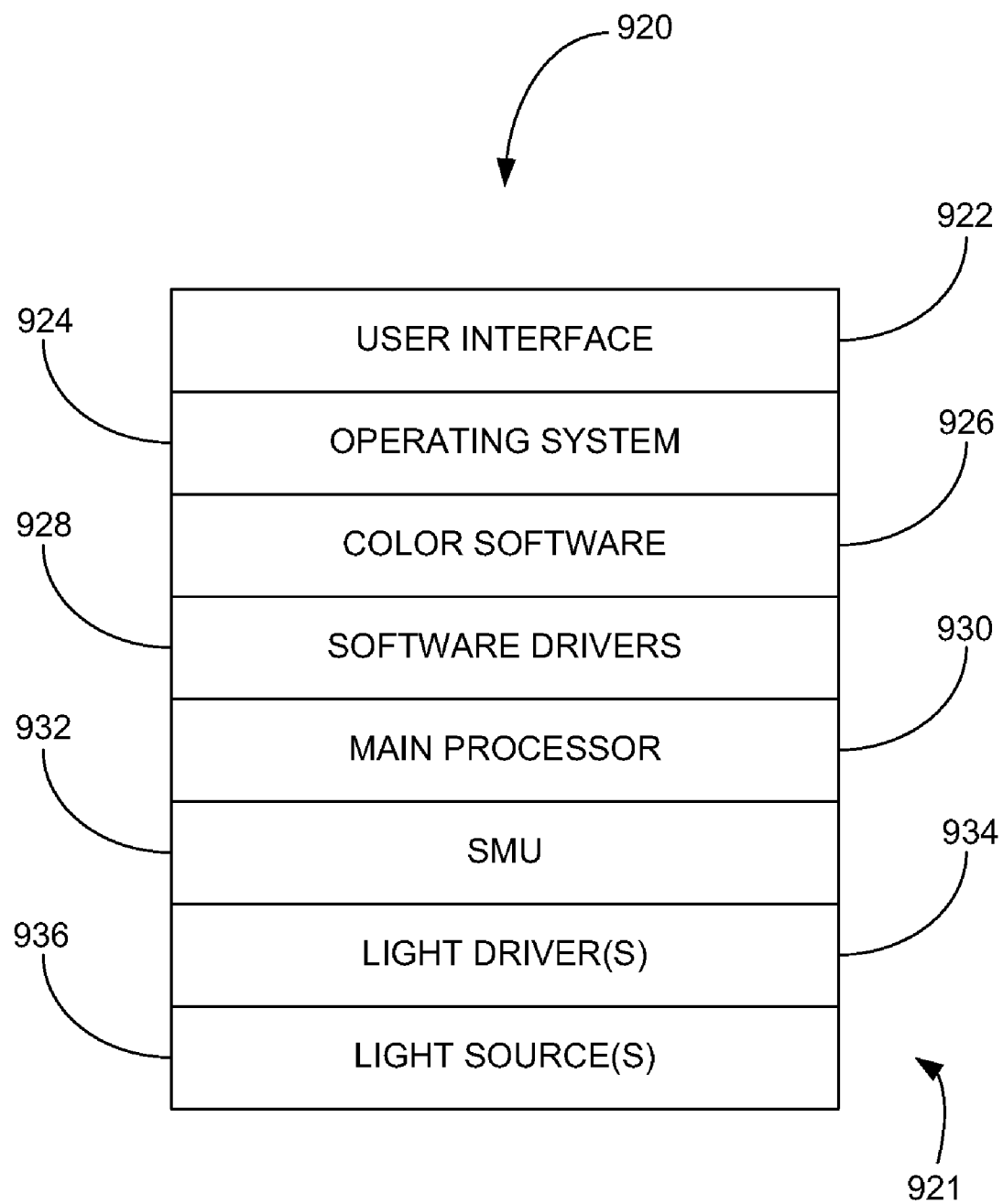
FIG. 54 is a diagram of the various layers of a computer system with a light feature, in accordance with one embodiment of the present invention.

FIG. 54 is a diagram of the various layers of a computer system 920 with a light feature 921, in accordance with one embodiment of the present invention. By way of example, the light feature 921 may be used in a manner to illuminate a portion of an entire enclosure of the computing system 920 or another component coupled to the computing system 920. The computing system 920 generally includes a user interface 922. The user interface 922 allows a user to input and receive data. For example, the user may input data via a keyboard or mouse and may receive data through a graphical user interface located on a display. The computing system 920 also includes an operating system 924. The operating system 924 is software that controls the computing system 920 and its peripheral devices. The operating system 924 also serves as a bridge between the computing system 920 and the software running on it as for example color software 926. Operating systems are generally well known and will not be described in greater detail. By way of example, the operating system may correspond to OS/2, DOS, Unix, Linux and the like.

The color software 926 is software that includes a set of instructions that tell the computer system 920 what to do with the light feature 921. The color software 926 may be application software that enables a user to perform and accomplish specific tasks in the computer system 920 or it may be part of the operating software 924 that controls the overall activity of the computing system 920. The color software 926 may be broken up into several components. Each component may be associated with a particular program such as a music program, movie video editing program, sleep behavior program, enclosure illumination program or the like.

The computer system also includes software drivers 928 for enabling communication between the software 926 and a main processor 930.

The main processor 930 is configured to control the computing system 920. The main processor 930 is typically responsible for interpreting instructions gathered from input devices and transmitting the results to output devices. The main processor 930 typically takes the form of an integrated circuit although it may include other circuitry. The computing system 920 may additionally include a special management unit (SMU) 932, which can assist the main processor 930 or perform special tasks in the computing system 900. By way of example, the SMU 932 may be an auxiliary integrated circuit that continuously receives power so as to provide operations when the main processor 930 is in sleep mode. Although shown as a separate component, the SMU 932 may be integral with the main processor 930 in some circumstances.

The computer system 920 also includes one or more light drivers 934 that are configured to drive one or more light sources 936. There is generally one light driver 934 for each light source 936. The light drivers 934 are configured convert control signals as for example from the main processor 930 or SMU 932 into a form that can be used to illuminate the light sources 936 in a manner desired by the computing system 930. By way of example, the control signal, which may be a duty cycle signal, may be converted into a voltage signal and/or current signal that drive the intensity of the light sources 936.

In one embodiment, the light drivers 934 are configured to convert a duty cycle signal into a voltage and further into a stable continuous current that is driven through the light sources 936. By continuous, it is generally meant that the voltage or the current passing through the light source 916 is not switched on and off. One advantage of driving the light sources 936 with a continuous current is that the connection between the light drivers 934 and light sources 936 can traverse a large distance. The light sources 936 can therefore be placed at remote locations relative to the light drivers 934. In most products, it is not conceivable to place the light source 936 in close proximity to the light drivers 914 since the location of the two mechanisms is controlled by different considerations. For example, the location of the light source 936 is controlled by industrial design and the location of the light drivers 934 are constrained by routing considerations relative to other chips and circuitry.

To elaborate, significant problems arise when the current is switched on and off and the current line, which connects the light sources 936 to the light drivers 934, traverses some degree of distance. As the current gets switched on and off, it emits radiation (e.g., capacitive coupling, magnetic coupling) that causes interference. The interference is most notable in audio microphone input amplifiers as it produces a hum through the speakers. The interference may also be noticeable in other low level inputs such as sensor inputs. By providing a continuous current, the system 920 no longer has an undesirable periodic current or voltage being switched and therefore the light source connection can traverse a long distance without causing interference.

Although continuous, the voltage or current level may be adjusted to achieve various levels of light intensity at each of the light sources 936. For example, the current level may be made low to produce low intensity light and the current level can be made high to produce a high intensity current. By varying the light intensity, one or more light effects whether static or dynamic may be formed.

In one embodiment, the light feature 921 includes a plurality of light sources 936, each of which is capable of emitting a different color of light. The intensity of each of the plural light sources 936 can be adjusted between low and high to produce different light effects. In one implementation, the light feature 921 includes at least a red, green and blue light source so that almost any color in the color spectrum can be produced. (e.g., color mixing). By way of example, in order to produce bright red, the red light can be placed at a high level and the other lights can be placed at a low level (off). In order to produce pink, the red light can be placed at a medium level and the other lights can be placed at a low level (off). In order to produce a deep purple, the red and blue light can be placed at a high level and the green light can be placed at a low level (off).

Furthermore, although white light can be produced by mixing red, blue and green light together, it is typically not an accurate white. In order to get a real accurate white, the light feature 921 may further include a white light source. The white light can be used alone to produce white or in combination with the other colors to effect hue. For example, in order to produce pink, the white light can be place at a high level and the red light can be placed at a moderate level while keeping the other lights at a very low level. The light sources may be any of those described previously (e.g., LED), and further may be configured to illuminate a translucent housing in any of the manners previously described (e.g., enclosure, indicator, etc.).

Figure 55:
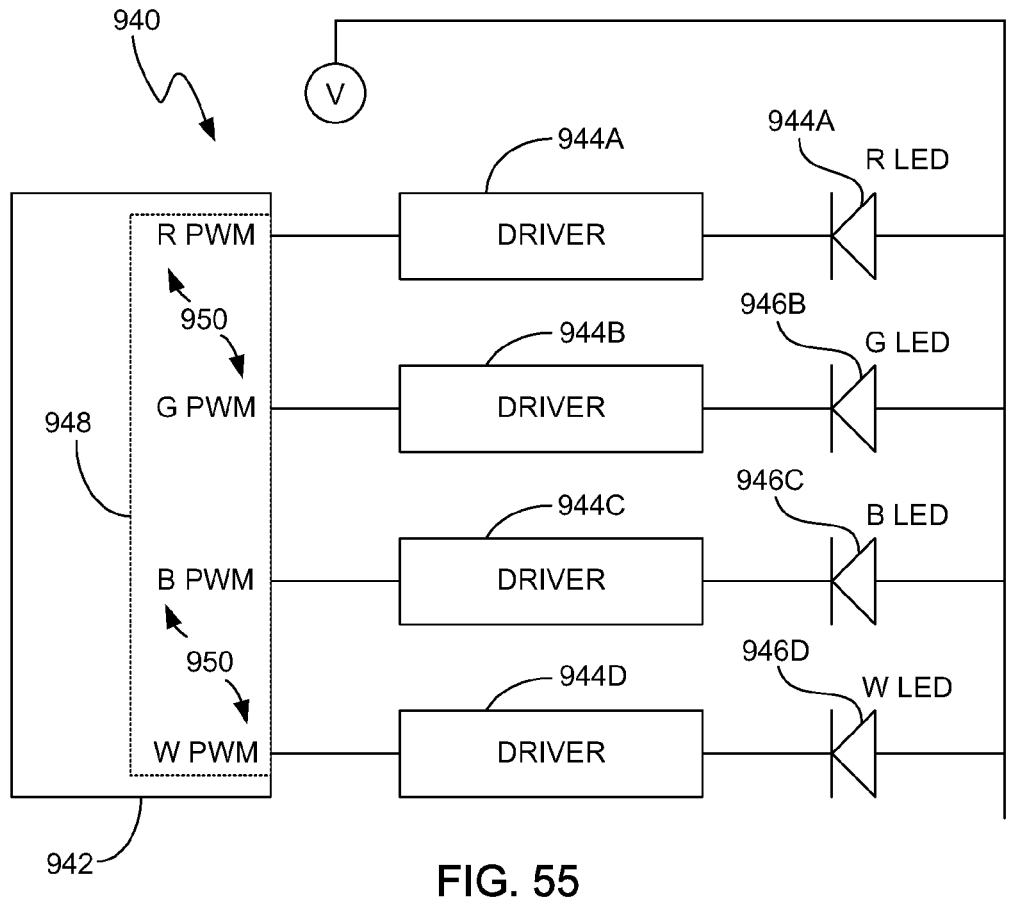
FIG. 55 is a diagram of light assembly, in accordance with one embodiment of the present invention.

FIG. 55 is a diagram of light assembly 940, in accordance with one embodiment of the present invention. The light assembly 940 generally includes a processor 942, a plurality of light drivers 944 and a plurality of LEDs 946. By way of example, these components may generally correspond to the SMU, light drivers and light sources discussed in FIG. 54. In this embodiment, the processor 942 includes a pulse width modulation (PWM) unit 948 having multiple channels 950 with a programmable duty cycle that controls the light intensity at each of the LEDs 946. The number of channels typically varies according to the number of LEDs used, i.e., there is a channel for each LED 946. In the illustrated embodiment, the light assembly 940 includes at least a red, green, blue and white LED and therefore there are four channels 950 each corresponding to a different color. There is also a light driver 944 for each LED 946. The light driver 944 is positioned between the processor 942 and the LED 946. The light driver 944 is configured to convert the PWM signal into a steady continuous current capable of driving the LEDs 946. In one embodiment, the light driver 944 includes a PWM to voltage converter and a voltage to current converter.

In the illustrated embodiment, the light assembly 940 includes four light drivers 944A-D, each of which is configured to drive a different LED 946A-D. A first light driver 944A is configured to drive a red LED 946A, a second light driver 944B is configured to drive a green LED 946B, a third light driver 944C is configured drive a blue LED 946C and a fourth light driver 944D is configured to drive a white LED 943D. Although the red, green and blue LEDs 946A-C may be separate components they are typically grouped together as part of an LED system. By way of example, they may be mounted to the same structural base. The white LED, on the other hand, includes its own structural base. In one particular embodiment, the RGB LED system is formed as part of a first packaged device and the white LED system is formed as part of a second packaged device. By way of example, the packaged device may be surface mount device that attached to a printed circuit board. Although separate components, the RGB LED system is typically positioned in close proximity to the white LED so as to provide color mixing. By way of example, they may be mounted in a similar location within a housing of an electronic device.

In an alternate embodiment to the ones shown above, the processor may include a digital to analog converter (DAC) that allows the processor to output voltages rather than PWM signals. In this embodiment, the processor includes multiple channels, each of which outputs a voltage and each of which corresponds to a distinct LED. Furthermore, because voltage is being outputted, the light drivers would only include a voltage to current converter that receivers the voltage from the processor and outputs a current to the LED. Also alternatively, the processor may include a digital to analog converter (DAC) that allows the processor to output currents rather than PWM signals or voltages. In this embodiment, the processor includes multiple channels, each of which outputs a current and each of which corresponds to a distinct LED. Furthermore, because current is being outputted, the light drivers can be eliminated, i.e., the current from the processor is outputted directly to the LED.

Figure 56:
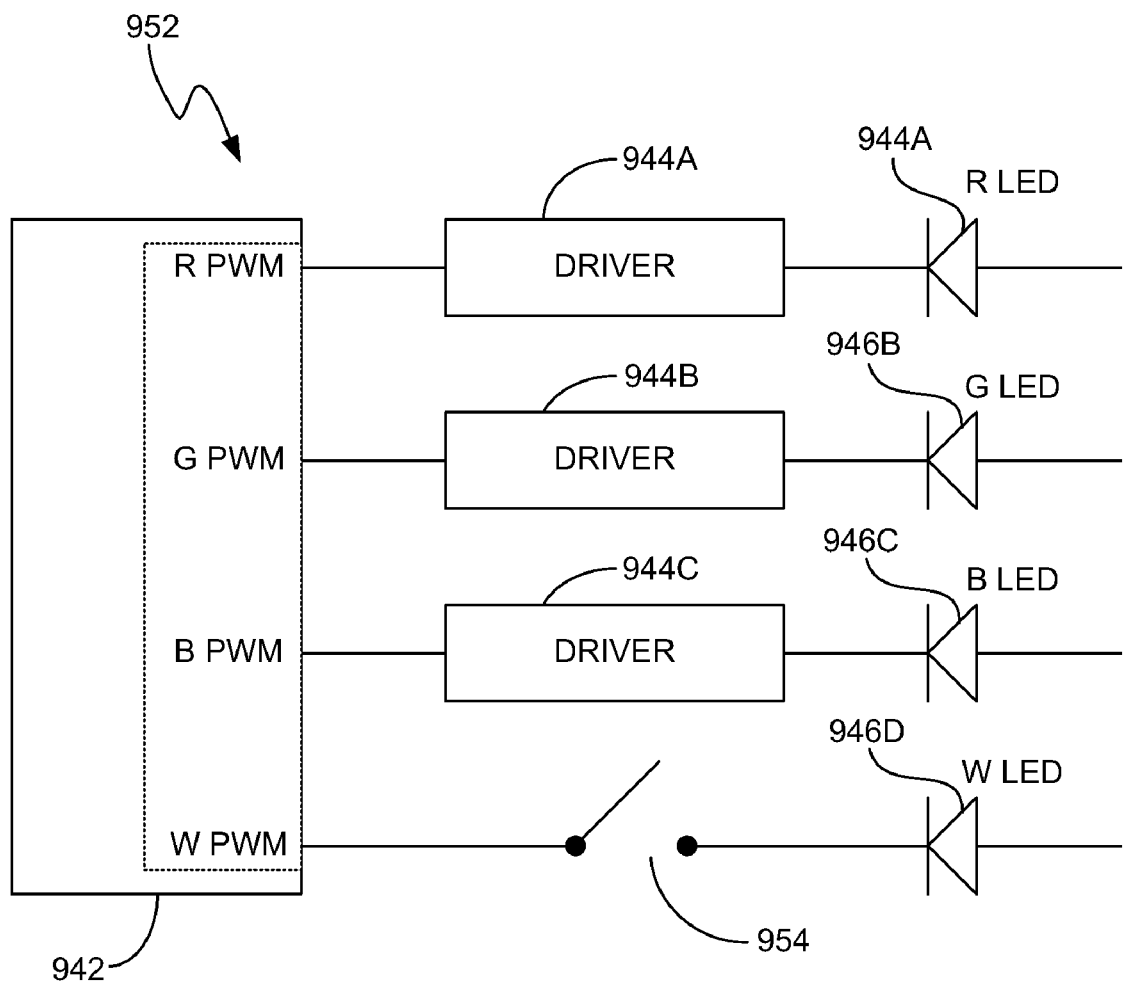
FIG. 56 is a diagram of light assembly, in accordance with one embodiment of the present invention.

Although steady and continuous current output is generally desired for the aforementioned reasons, in some cases it may not be possible for each light source. That is, at least one light source may be required to use a different control circuit. For example, in some cases, a light assembly 952 may include a light switch 954 instead of a light driver as shown in FIG. 56. In the circuit that includes the light switch 954, the current is left at a constant level, i.e., does not vary as with the light drivers 944. The light switch 954, which has two states (on and off), is controlled by the PWM output. The PWM output effects the duration at any one state. The duration that the switch 954 stays at any one state is used to vary the intensity at the light source 946 associated with the light switch 954. For example, in order to produce bright illumination, the switch 954 may be left on for 99 ms and turned off for 1 ms. In order to produce dim illumination, the switch 954 may be left on for 1 ms and turned off for 99 ms. In the illustrated embodiment, the light switch 954 is used to drive the white LED 946D while light drivers 944A-C are used to drive the red, green and blue LEDs 946A-C.

Figure 57:
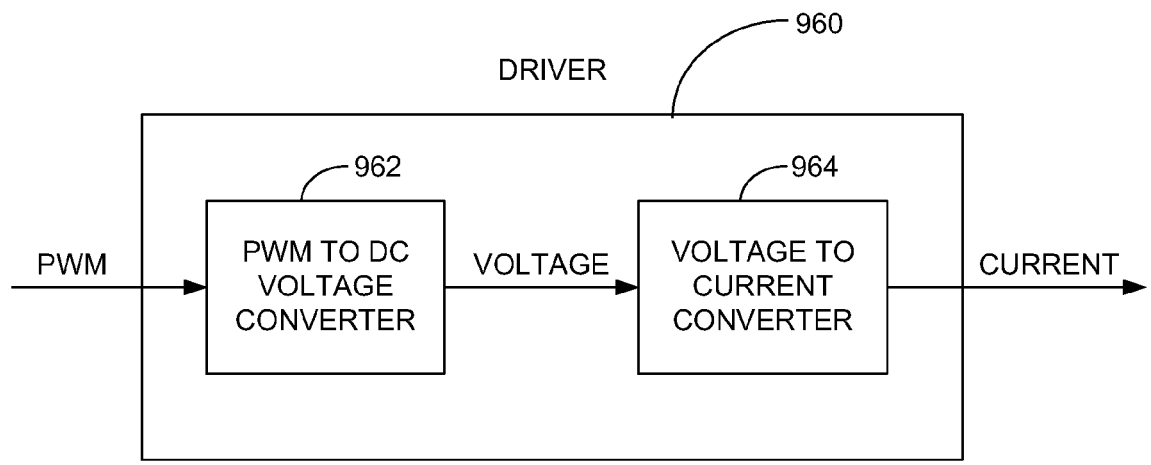
FIG. 57 is a simplified diagram of a light driver, in accordance with one embodiment of the present invention.

FIG. 57 is a simplified diagram of a light driver 960, in accordance with one embodiment of the present invention. By way of example, the light driver 960 may correspond to the light driver 944 shown in FIGS. 55 and 56. The light driver 960 generally includes a pair of converters 962 and 964. The first converter 962 is configured to convert a PWM signal to DC voltage. The first converter 962 receives the PWM signal from the processor for example, and outputs a voltage signal to the second converter 964. The second converter 964, on the other hand, is configured to convert the voltage signal into a current signal. The second converter 964 receives the voltage signal from the first converter 962, for example, and outputs a current signal to the associated light source.

In operation, the PWM signal has a duty cycle that is proportional to the desired intensity of an associated light source. Like the duty cycle, the voltage is also proportional to the desired intensity of the associated light source. In one particular embodiment, the voltage is between about 0 mV to about 500 mV. The lower half of this range generally corresponds to the lower half of the duty cycle while the upper half of this range generally corresponds to the upper half of the duty cycle. Like the voltage, the current is also proportional to the intensity of the desired light source. In one particular embodiment, the current is between about 0 mA to about 20 mA milliamperes. The lower half of this range generally corresponds to the lower half of the voltage while the upper half of this range generally corresponds to the upper half of the voltage. By way of example, the voltage to current converter may correspond to a transimpendance amplifier or gm stage.

Figure 58:
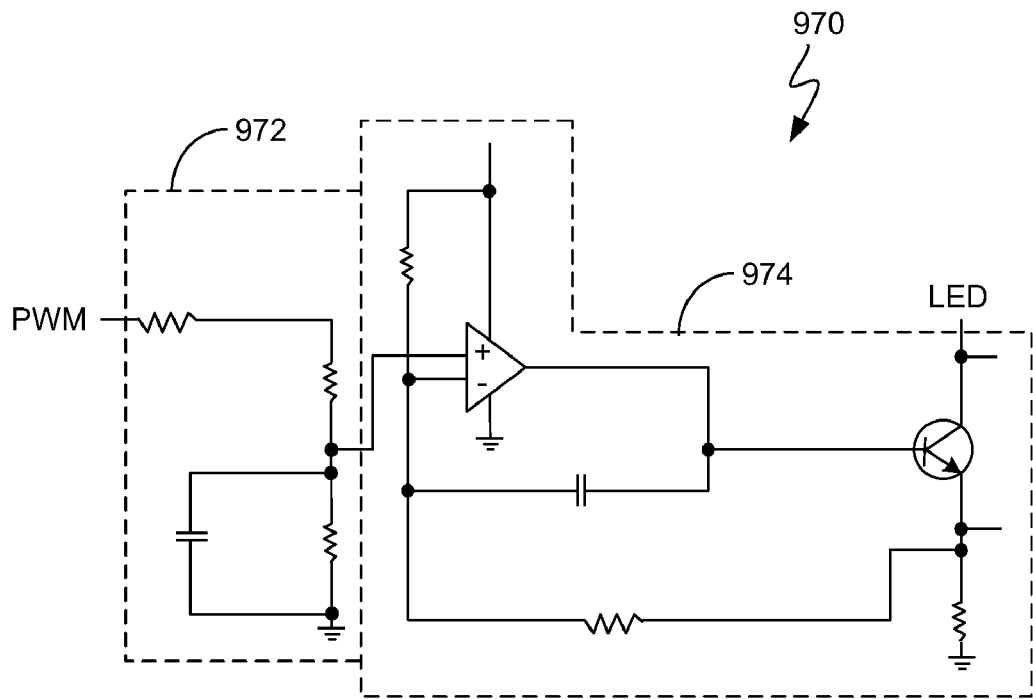
FIG. 58 is an exemplary circuit diagram of light driver, in accordance with one embodiment of the present invention.

FIG. 58 is an exemplary circuit diagram of light driver 970, in accordance with one embodiment of the present invention. The circuit diagram may represent the light drivers shown in the previous Figures. The light driver 970 is configured to receive PWM input from an SMU and to output a steady continuous current to an LED based on the PWM input. The light driver 970 is generally placed in close proximity to the SMU and may be placed remotely from the LED. This can be done for the aforementioned reasons, i.e., the light drivers output a continuous current and therefore they don't create interference when they a placed a far distance from the light driver 970.

As shown in FIG. 58, each of the light drivers 970 includes a PWM to DC voltage converter 972 and a voltage to current converter 974. Each of the PWM to DC voltage converters 972 is configured to receive a PWM input signal from the SMU. The PWM to DC voltage converter 972 is also configured to convert the PWM signal into a DC voltage. The DC voltage is based on the received PWM signal. The voltage to current converters 974 is configured to receive the outputted voltage from the PWM to DC voltage converter 972. The voltage to current converters 974 is also configured to convert the DC voltage into a steady and continuous current. The current is based on the received DC voltage. The current outputted from the voltage to current converter 974 is received by an associated LED in order to illuminate the LED.

Figure 59:
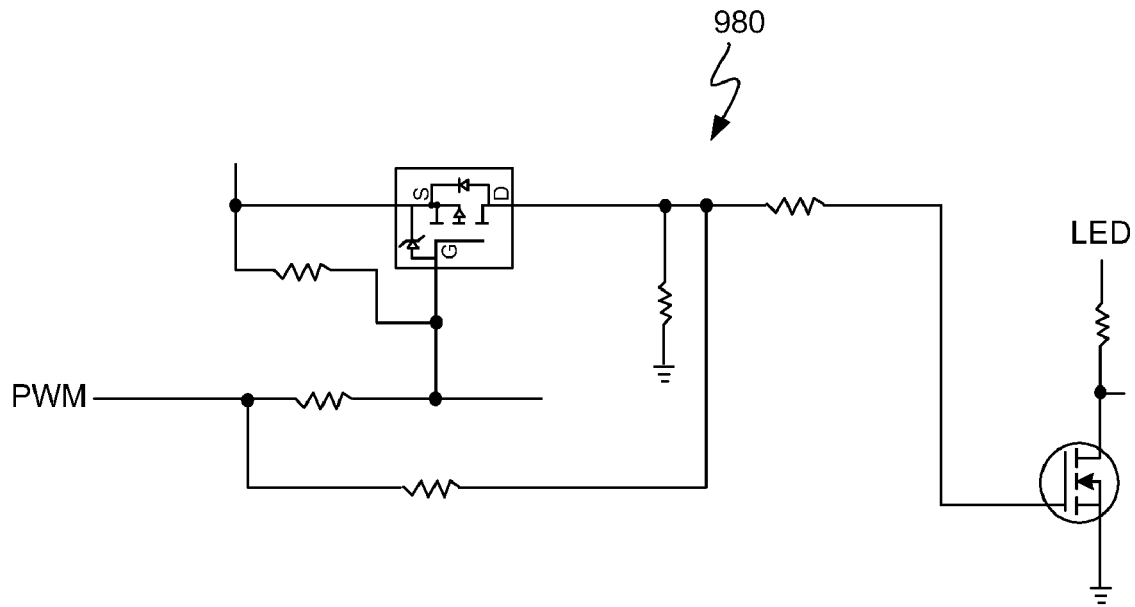
FIG. 59 is an exemplary circuit diagram of light switch, in accordance with one embodiment of the present invention. T

FIG. 59 is an exemplary circuit diagram of light switch 980, in accordance with one embodiment of the present invention. The circuit diagram may represent the light switch shown in the previous Figure. The light switch 980 is configured to receive PWM input from an SMU and to output a time multiplexed signal to an LED based on the PWM input. The light switch is generally placed in close proximity to the SMU and the LED.

Figure 60:
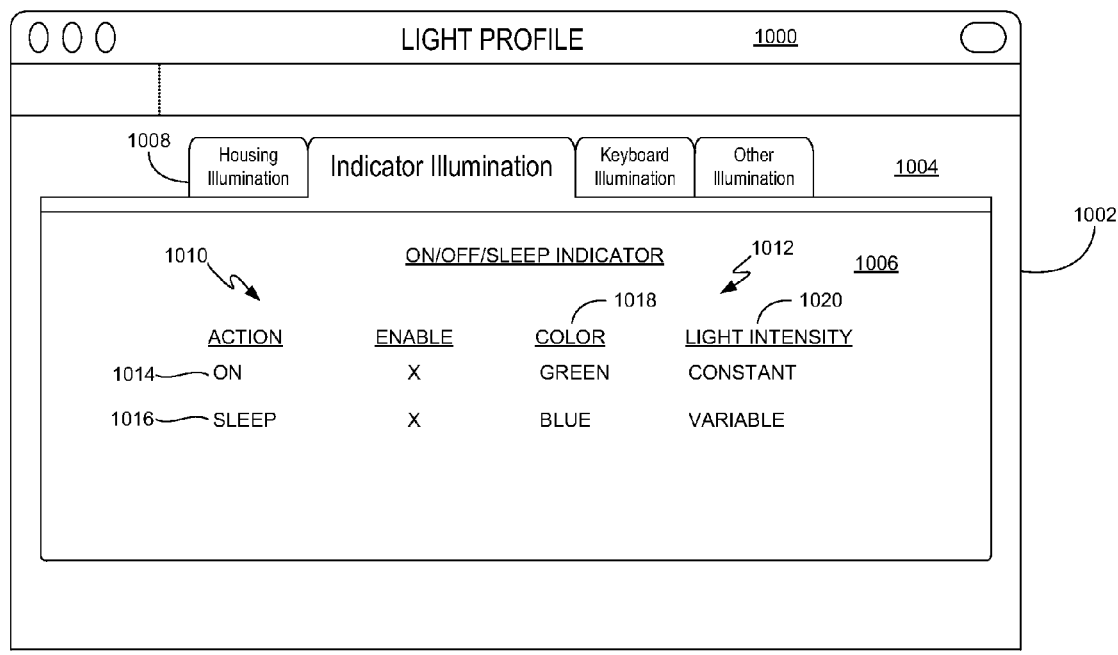
FIG. 60 is a diagram of a graphical user interface, in accordance with one embodiment of the present invention.

FIG. 60 is a diagram of a graphical user interface 1000, in accordance with one embodiment of the present invention. The GUI 1000 represents the visual display panel for displaying the light profiles of one or more light sources on a computer display screen. Through the GUI 1000, the user may quickly and conveniently review the light settings associated with the light source(s) and make changes thereto. The GUI 1000 serves as a control panel for reviewing and/or customizing the light options associated with the various light sources.

As shown, the GUI 1000 includes a window frame 1002 that defines a window 1004. The window 1004 generally contains one or more illumination fields 1006 including but not limited to housing illumination, indicator illumination, keyboard illumination and the like. The illumination fields 1006 are generally opened via a field button 1008, i.e., by selecting the field button the corresponding illumination field is presented to the user. The contents of the illumination fields may be widely varied. The contents may include one or more on screen options, switches, labels, warnings and the like. In the illustrated embodiment, the field 1006 includes one or more illumination actions 1010, and one or more illumination attributes 1012.

The illumination actions 1010 include the various actions that may be taken by a particular illumination component, i.e., housing, indicator, keyboard, etc. In the illustrated embodiment, the field 1004 is dedicated to indicator illumination, and more particularly an on/off sleep indicator. Thus, the illumination actions 1010 may include "on" action 1014 and "sleep" action 1016. The "on" action 1014, if it is enabled, instructs a computer system to illuminate a light source associated with an indicator when the computer hardware is turned on. The "sleep" action 1016, if it is enabled, instructs a computer system to illuminate the light source when the computer hardware is in a sleep mode (not in use but still on).

The illumination attributes 1012, on the other hand, gives the user the ability to designate an attribute of the illumination provided for each illumination action 1010. The attributes may be widely varied. In the illustrated embodiment, illumination attributes 1012 include a color option 1018 and an intensity option 1020. The color option 1018 gives the user the ability to designate the color of the illumination provided for each action. The color option 1018 may come in various forms including a color palette menu that includes a plurality of basic colors that may be selected. The color option 1018 may also come in a color wheel menu that includes a much larger number of colors formed by the basic colors. The color option 1018 may also come in a color spectrum menu including all the colors in the color spectrum as for example using standard RGB color mixing. When a user selects a particular color in one of these menus, the color is typically indicated as a word (as shown) or visually in a color box, i.e., if a user selects red, then the color box is filled with red.

The light intensity option 1020 gives the user the ability to designate a particular light intensity of the illumination provided for each action. The light intensity may be set at one particular intensity or it may be variable or dynamic. When set at one intensity (static), the light source maintains a constant light intensity during operation. The user may be able to select the intensity via a slider bar. For example, by moving the slider, the user may increase or decrease the intensity. When intensity is variable, the light intensity is configured to vary or fluctuate during operation (e.g., blinking on and off). The light intensity of sleep indicators, for example, is generally designed to fade in and out between a minimum and maximum value so as to indicate that the computer system is in a sleep mode. As should be appreciated, the variable light intensity may be time dependent and thus it may include a menu for selecting how the light intensity varies over time.

It should be noted that the GUI configuration shown in FIG. 60 is not a limitation and that the configuration may vary according to the specific needs of each light source. For example, each light source may have different light requirements and therefore the GUI may need to be modified.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer system, comprising:
a processor configured to generate pulse width modulation (PWM) signals; and
a light feature operatively coupled to the processor, the light feature comprising:
one or more light emitting diodes capable of emitting light in order to illuminate an illuminable housing of the computer system; and
a light driver disposed between the processor and at least one of the light emitting diodes, the light driver being configured to convert light control signals into a stable continuous current for driving the light emitting diode, the magnitude of the current being based at least in part on the light control signal, the magnitude of the current being proportional to a light intensity of the light emitting diode, wherein the light driver includes a PWM signal to voltage converter and a voltage to current converter.

2. The computer system as recited in claim 1, wherein the PWM signal has a duty cycle that changes in accordance with the desired light intensity of the LEDs, wherein the voltage changes in accordance with the duty cycle, and wherein the current changes in accordance with the voltage.

3. The computer system as recited in claim 2, wherein the voltage is between 0 mV to about 500 mV, and wherein the current is between about 0 mA to about 20 mA.

4. The computer system as recited in claim 2, wherein each of the light emitting diodes is capable of producing a different color of light, an intensity of each of the light emitting diodes being adjusted in order to produce different light effects.

5. The computer system as recited in claim 4, wherein the light emitting diodes are selected from red, green, blue and white light emitting diodes, the intensity of each of the light emitting diodes being adjusted in order to produce a different color.

6. The computer system as recited in claim 5, wherein the light feature includes at least a red, green, blue and white light emitting diode.

7. The computer system as recited in claim 1, wherein the light feature includes a light driver for each light emitting diode.

8. The computer system as recited in claim 7, wherein the light feature includes four light drivers, each of which is configured to drive a different light emitting diode, a first light driver is configured to drive a red light emitting diode, a second light driver is configured to drive a green light emitting diode, a third light driver is configured to drive a blue light emitting diode and a fourth light driver is configured to drive a white light emitting diode.

9. The computer system as recited in claim 1, wherein the light feature includes a light driver for at least one light emitting diode and a light switch for at least one light emitting diode.

10. The computer system as recited in claim 9, wherein the light feature includes three light drivers and a light switch, each of which is configured to drive a different light emitting diode, a first light driver is configured to drive a red light emitting diode, a second light driver is configured to drive a green light emitting diode, a third light driver is configured to drive a blue light emitting diode, and the light switch is configured to drive a white light emitting diode.

11. The computer system as recited in claim 1, wherein the processor includes a pulse width modulation unit having at least one channel with a programmable duty cycle that helps control the light intensity of the light emitting diode.

12. A method of illuminating a housing, comprising:
generating a light control signal associated with a desired light intensity;
converting the light control signal into a voltage representative of the desired light intensity;
converting the voltage into a current representative of the desired light intensity, the current driving a light emitting diode so as to produce light; and
directing the light from the light emitting diode through the housing such that an image is created at an outer surface of the housing.

13. The method as recited in claim 12, wherein the voltage is converted to a stable continuous current.

14. The method as recited in claim 12, wherein the light control signal is a pulse width modulation (PWM) signal.

15. The method as recited in claim 14, wherein the PWM signal has a duty cycle that changes in accordance with the desired light intensity of the light emitting diode, wherein the voltage changes in accordance with the duty cycle, and wherein the current changes in accordance with the voltage.

16. The method as recited in claim 14, wherein the light intensity of the light emitting diode is controlled by a PWM unit having at least one channel with a programmable duty cycle.

17. The method as recited in claim 12, wherein the current drives a plurality of light emitting diodes, each of which is capable of producing a different color of light, the intensity of each of the light emitting diodes being adjusted in order to produce different light effects.

18. The method as recited in claim 17, wherein the light emitting diodes are selected from red, green, blue and white light emitting diodes, the intensity of each of the light emitting diodes being adjusted in order to produce a different color.

* * * * *